United States Patent
Choi et al.

(10) Patent No.: US 12,301,788 B2
(45) Date of Patent: May 13, 2025

(54) INTRA PREDICTION-BASED IMAGE CODING IN IMAGE CODING SYSTEM

(71) Applicant: LG Electronics Inc., Seoul (KR)

(72) Inventors: Jangwon Choi, Seoul (KR); Jin Heo, Seoul (KR); Seunghwan Kim, Seoul (KR); Jaehyun Lim, Seoul (KR); Ling Li, Seoul (KR)

(73) Assignee: LG Electronics Inc., Seoul (KR)

( * ) Notice: Subject to any disclaimer, the term of this patent is extended or adjusted under 35 U.S.C. 154(b) by 124 days.

(21) Appl. No.: 17/442,270

(22) PCT Filed: Mar. 23, 2020

(86) PCT No.: PCT/KR2020/003955
§ 371 (c)(1),
(2) Date: Sep. 23, 2021

(87) PCT Pub. No.: WO2020/197223
PCT Pub. Date: Oct. 1, 2020

(65) Prior Publication Data
US 2022/0159239 A1    May 19, 2022

Related U.S. Application Data

(60) Provisional application No. 62/822,876, filed on Mar. 23, 2019.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 11,368,690 B2 *  6/2022  Lee ................ H04N 19/176
2017/0332084 A1* 11/2017  Seregin ........... H04N 9/8045
(Continued)

FOREIGN PATENT DOCUMENTS

KR    20180123674    11/2018
KR    20180131571    12/2018
(Continued)

OTHER PUBLICATIONS

Wang et al., "CE3-3.1.1: Unified MPM list generation," JVET-N0184-r1, Presented at Joint Video Experts Team (JVET) of ITU-T SG 16 WP 3 and ISO/IEC JTC 1/SC 29/WG 11, 14th Meeting: Geneva, CH, Mar. 19-27, 2019, 4 pages.

*Primary Examiner* — Reza Aghevli
(74) *Attorney, Agent, or Firm* — Fish & Richardson P.C.

(57) ABSTRACT

An image decoding method performed by a decoding device according to the present document comprises the steps of: deriving an intra prediction type for a current block from intra prediction types; deriving a first intra prediction mode for a neighboring block to the left of the current block; deriving a second intra prediction mode for a neighboring block above the current block; constructing an intra prediction mode candidate list of the current block on the basis of the first intra prediction mode and the second intra prediction mode; deriving an intra prediction mode of the current block on the basis of the intra prediction mode candidate list; and generating prediction samples of the current block on the basis of the intra prediction type and the intra prediction mode.

4 Claims, 22 Drawing Sheets

(51) Int. Cl.
  *H04N 19/159* (2014.01)
  *H04N 19/176* (2014.01)

(56) References Cited

U.S. PATENT DOCUMENTS

| | | | | |
|---|---|---|---|---|
| 2020/0296418 | A1* | 9/2020 | Zhao | H04N 19/593 |
| 2021/0076028 | A1* | 3/2021 | Heo | H04N 19/593 |
| 2021/0243429 | A1* | 8/2021 | Lee | H04N 19/107 |
| 2021/0289229 | A1* | 9/2021 | Ahn | H04N 19/11 |
| 2021/0344933 | A1* | 11/2021 | Jeon | H04N 19/176 |
| 2021/0368162 | A1* | 11/2021 | Heo | H04N 19/176 |
| 2021/0392371 | A1* | 12/2021 | Lee | H04N 19/12 |
| 2022/0070452 | A1* | 3/2022 | Lee | H04N 19/11 |
| 2022/0070457 | A1* | 3/2022 | Bae Keun Lee | H04N 19/182 |
| 2022/0116613 | A1* | 4/2022 | Choi | H04N 19/159 |
| 2022/0124309 | A1* | 4/2022 | Heo | H04N 19/593 |
| 2022/0132102 | A1* | 4/2022 | Heo | H04N 19/176 |
| 2022/0150537 | A1* | 5/2022 | Heo | H04N 19/70 |
| 2022/0191530 | A1* | 6/2022 | Sim | H04N 19/593 |

FOREIGN PATENT DOCUMENTS

| | | | |
|---|---|---|---|
| KR | 20190006043 | 1/2019 | |
| KR | 20190007427 | 1/2019 | |
| WO | WO-2021118309 A1 * | 6/2021 | H04N 19/159 |

\* cited by examiner

INTRA PREDICTION-BASED IMAGE CODING IN IMAGE CODING SYSTEM

CROSS-REFERENCE TO RELATED APPLICATIONS

This application is a National Stage application under 35 U.S.C. § 371 of International Application No. PCT/KR2020/003955, filed on Mar. 23, 2020, which claims the benefit of U.S. Provisional Application No. 62/822,876, filed on Mar. 23, 2019. The disclosures of the prior applications are incorporated by reference in their entirety.

TECHNICAL FIELD

The present disclosure relates an image coding based on intra prediction in an image coding system.

BACKGROUND

Demands for high-resolution and high-quality images, such as High Definition (HD) images and Ultra High Definition (UHD) images, have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

According to an embodiment of the present document, a method and apparatus which increase image coding efficiency is provided.

According to an embodiment of the present document, a method and apparatus for using intra prediction in image coding are provided.

According to an embodiment of the present document, a method and apparatus are provided for deriving an intra prediction mode of a neighboring block to which a CIIP is applied as a specific intra prediction mode in intra prediction.

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

According to the present disclosure, it is possible to increase overall image/video compression efficiency.

According to the present disclosure, hardware and software implementation complexity can be reduced by using a unified intra prediction mode list configuration process for intra prediction types.

According to the present disclosure, coding efficiency of intra prediction can be improved by reducing dependencies according to intra prediction types by using a unified intra prediction mode list configuration process for intra prediction types.

According to the present disclosure, coding efficiency of intra prediction can be improved by deriving reference samples, which are used when an MRL is applied and a DC intra prediction mode is derived as the intra prediction mode, based on the reference picture index,.

DESCRIPTION OF EXEMPLARY EMBODIMENTS

Figure 1:
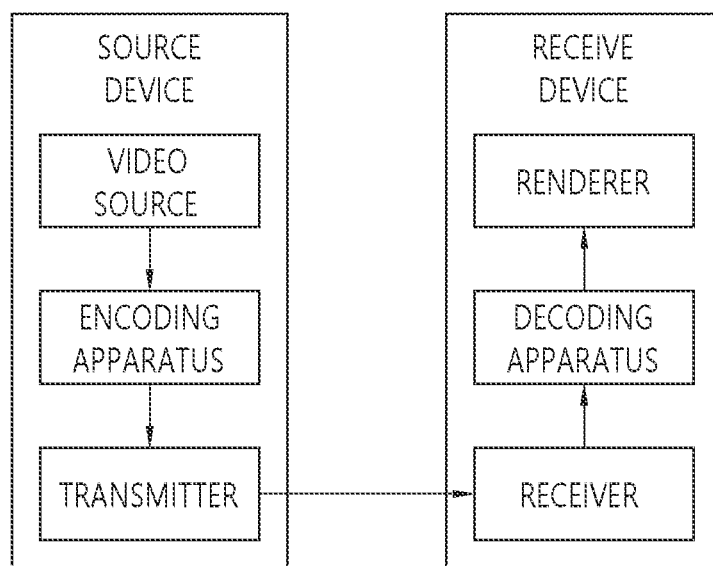
FIG. 1 schematically represents an example of a video/image coding system to which embodiments of the present disclosure may be applied.

This document can be modified in various forms, and specific embodiments thereof will be described and shown in the drawings. However, the specific embodiments are not intended for limiting the embodiments of this document. The terms used in the following description are used to merely describe specific embodiments, but are not intended to limit this document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this document are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this document without departing from the spirit of this document.

Hereinafter, exemplary embodiments of this document will be described in detail with reference to the accompanying drawings. Hereinafter, the same reference numerals are used for the same components in the drawings, and redundant description of the same components may be omitted.

FIG. 1 is schematically illustrating a video/image coding system to which the embodiments of this document may be applied.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either the number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the document, "A or B (A or B)" may mean "only A", "only B" or "both A and B". In other words, in the present document, "A or B (A or B)" may be interpreted as "A and/or B (A and/or B)". For example, "A, B or C (A, B or C)" herein may be interpreted "only A", "only B", "only C", or "any and any combination of A, B and C (any combination of A, B and C)".

A slash (/) or a comma (comma) used in the present document may mean "and/or". For example, "A/B" may mean "A and/or B". Accordingly, "A/B" may mean "only A", "only B", or "both A and B". For example, "A, B, C" may mean "A, B, or C".

In the present document, "at least one of A and B" may mean "only A", "only B" or "both A and B". In addition, in the present specification, the expression "at least one of A or B" or "at least one of A and/or B" can be interpreted the same as "at least one of A and B".

Further, in the present document, "at least one of A, B and C" may mean "only A", "only B", "only C", or "any and any combination of A, B and C" (any combination of A, B and C)". Also, "at least one of A, B or C" or "at least one of A, B and/or C" may mean "at least one of A, B and C".

In addition, parentheses used in the present document may mean "for example". Specifically, when "prediction (intra prediction)" is indicated, "intra prediction" may be proposed as an example of "prediction". In other words, "prediction" in the present specification is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in this specification may be implemented individually or may be implemented at the same time.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 2:
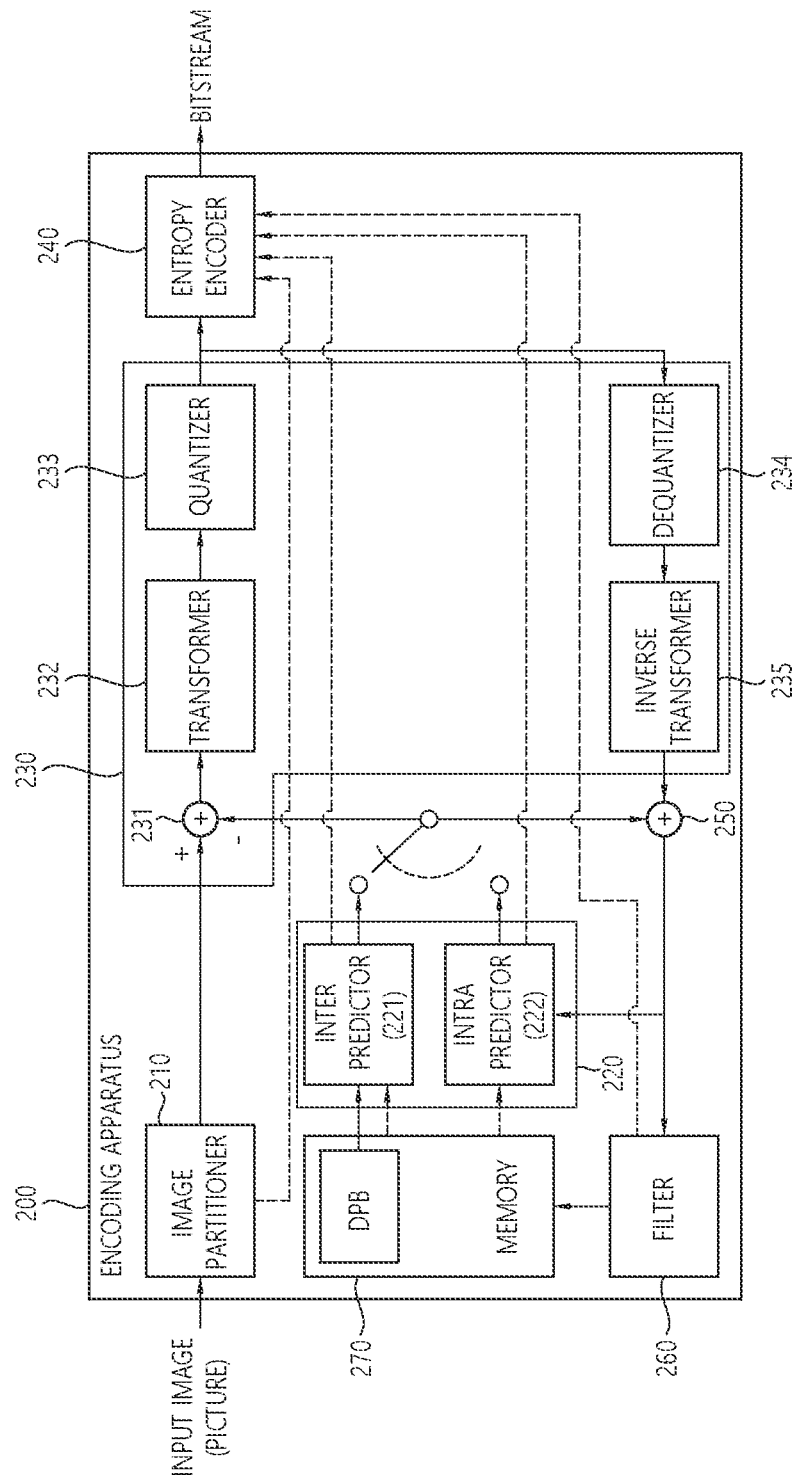
FIG. 2 is a diagram schematically describing a configuration of a video/image encoding apparatus to which embodiments of the present disclosure may be applied.

FIG. 2 is a schematic diagram illustrating a configuration of a video/image encoding apparatus to which the embodiments of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
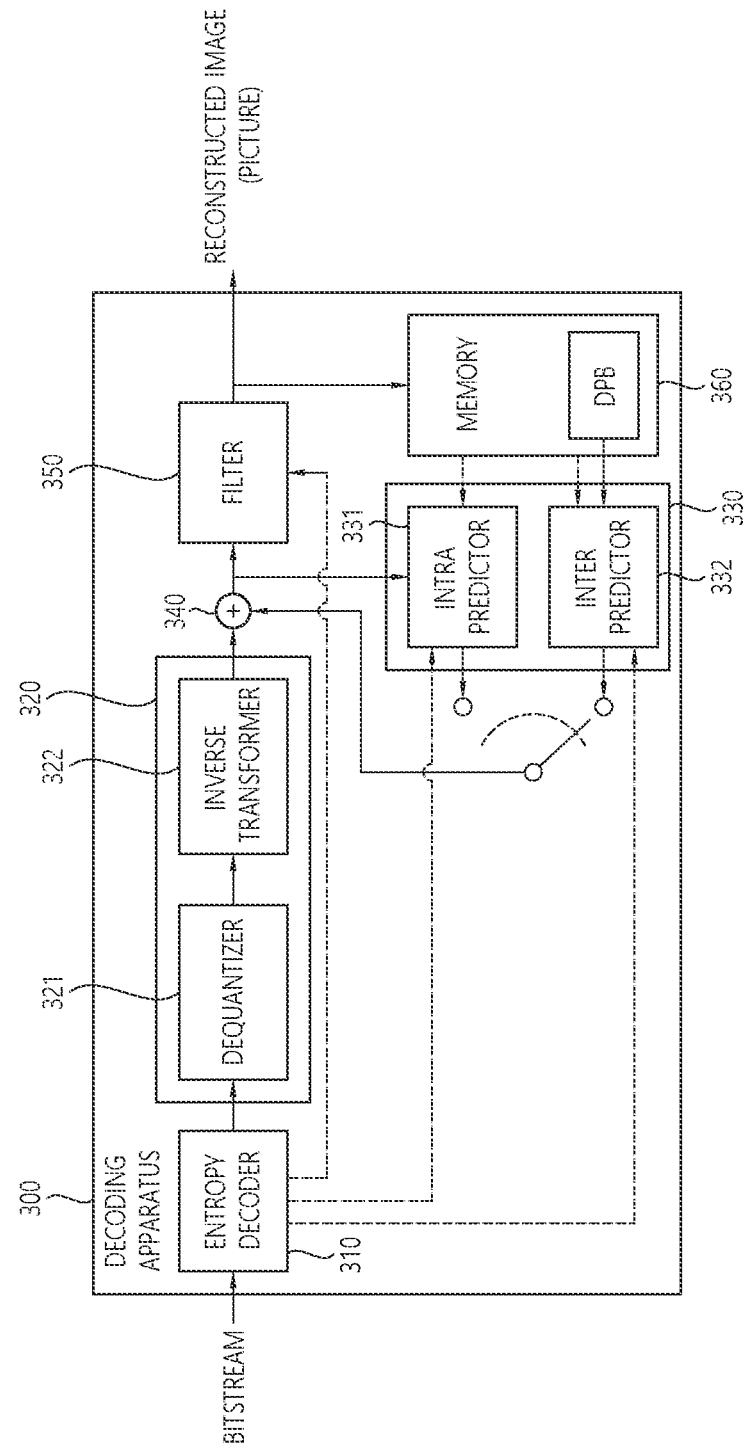
FIG. 3 is a diagram schematically describing a configuration of a video/image decoding apparatus to which embodiments of the present disclosure may be applied.

FIG. 3 is a schematic diagram illustrating a configuration of a video/image decoding apparatus to which the present document may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Meanwhile, as described above, in image coding, prediction is performed to increase compression efficiency. Through this, it is possible to generate a predicted block including prediction samples for a current block, which is a block to be coded. For example, when the above-described intra prediction is performed, a correlation between samples may be used and a difference between an original block and a prediction block, that is, a residual may be obtained. The above-described transform and quantization can be applied to the residual, and through this, spatial redundancy can be removed. Specifically, an encoding method and a decoding method using intra prediction may be described later.

Figure 4:
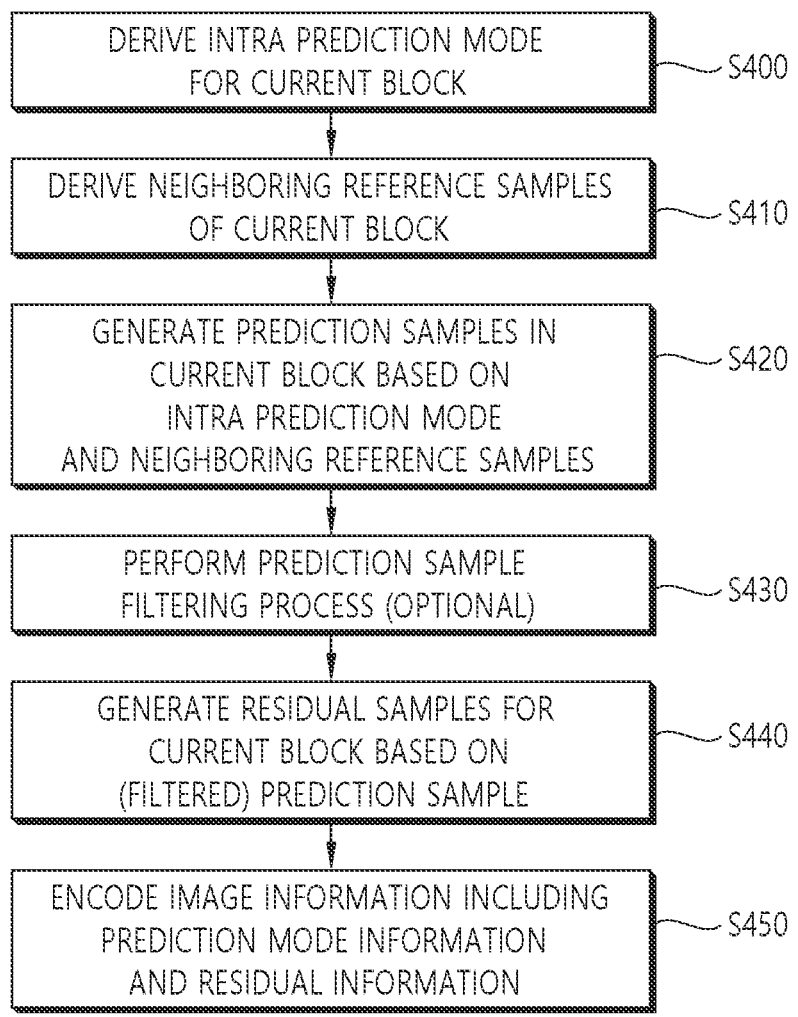
FIG. 4 is a flowchart showing an example of an image encoding method based on an intra prediction.

FIG. 4 shows an example of an intra prediction-based image encoding method. Referring to FIG. 4, the encoding apparatus may derive an intra prediction mode for the current block (S400), and may derive neighboring reference samples of the current block (S410). The encoding apparatus may determine the best intra prediction mode in which a bit rate and distortion are optimized for the current block. The encoding apparatus may generate prediction samples in the current block based on the intra prediction mode and the neighboring reference samples (S420). In this case, the encoding apparatus may perform a prediction sample filtering process (S430). Prediction sample filtering may be referred to as post filtering. Some or all of the prediction samples may be filtered by the prediction sample filtering process. In some cases, the S430 process may be omitted.

The encoding apparatus may generate residual samples for the current block based on the (filtered) prediction samples (S440). The encoding apparatus may encode image information including prediction mode information indicating the intra prediction mode and residual information on the residual samples (S450). The encoded image information may be output in the form of the bitstream. The output bitstream may be transmitted to a decoding apparatus through a storage medium or a network.

Figure 5:
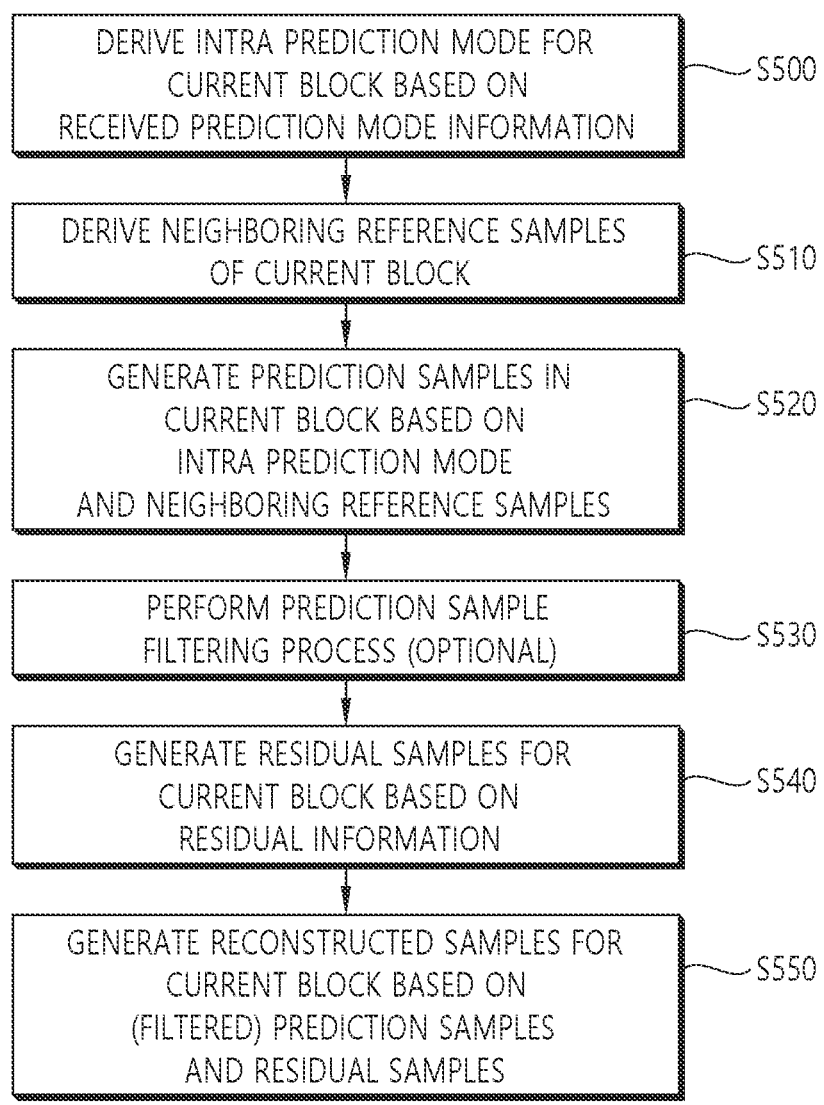
FIG. 5 is a flowchart showing an example of an image encoding method based on an intra prediction FIG. 6 illustratively represents intra directional modes of 65 prediction directions.

FIG. 5 shows an example of an intra prediction-based image decoding method. Referring to FIG. 5, the decoding apparatus may perform an operation corresponding to the operation performed by the encoding apparatus. For example, the decoding apparatus may derive an intra prediction mode for the current block based on the received prediction mode information (S500). The decoding apparatus may derive neighboring reference samples of the current block (S510). The decoding apparatus may generate prediction samples in the current block based on the intra prediction mode and the neighboring reference samples (S520). In this case, the decoding apparatus may perform a prediction sample filtering process (S530). Prediction sample filtering may be referred to as post filtering. Some or all of the prediction samples may be filtered by the prediction sample filtering process. In some cases, the S530 procedure may be omitted.

The decoding apparatus may generate residual samples for the current block based on the received residual information (S540). The decoding apparatus may generate reconstructed samples for the current block based on the (filtered) prediction samples and the residual samples, and generate a reconstructed picture based thereon (S550).

Meanwhile, when intra prediction is applied to the current block, as described above, the encoding apparatus/decoding apparatus may derive an intra prediction mode for the current block and a prediction sample of the current block based on the intra prediction mode. That is, the encoding apparatus/decoding apparatus may derive the prediction sample of the current block by applying a directional mode or a non-directional mode based on the neighboring reference samples of the current block.

For reference, for example, the intra prediction mode may include two non-directional (or non-angular) intra prediction modes and 65 directional (or angular) intra prediction modes. The non-directional intra prediction modes may include a planar intra prediction mode of No. 0 and a DC intra prediction mode of No. 1, and the directional intra prediction modes may include 65 intra prediction modes of Nos. 2 to 66. However, this is an example, and this document may be applied even when the number of intra prediction modes is different. Meanwhile, in some cases, intra-prediction mode 67 may be further used, and the intra-prediction mode 67 may represent a linear model (LM) mode.

Figure 6:
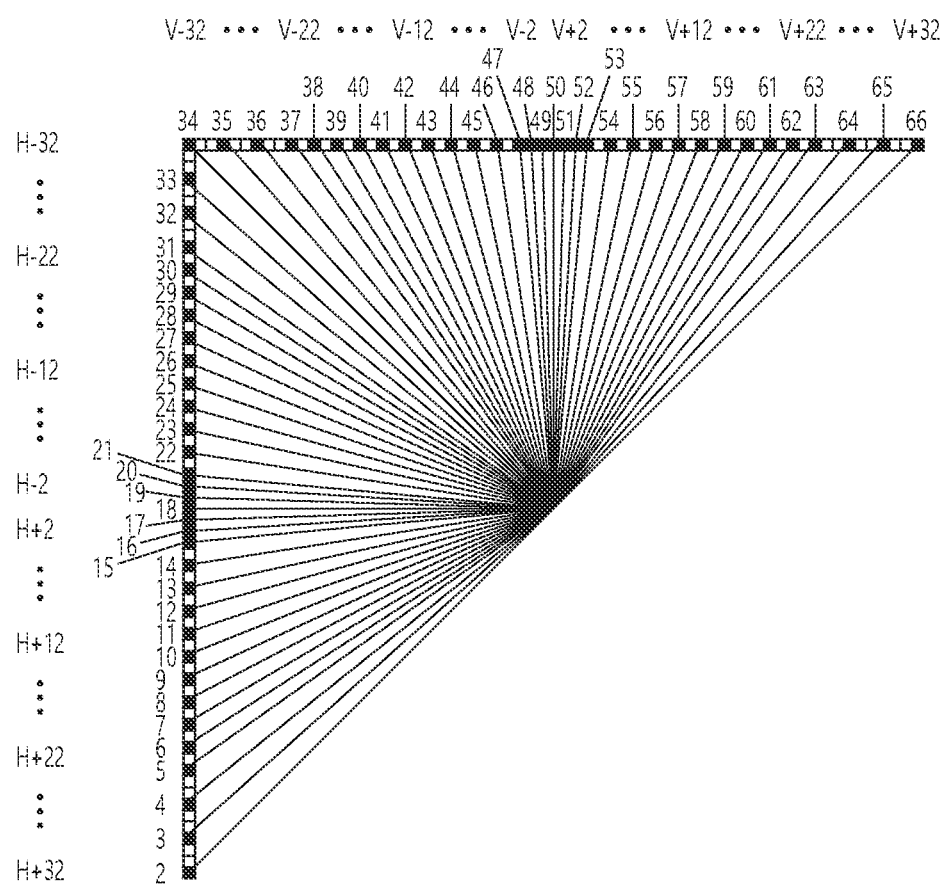

FIG. 4 illustrates an example of 67 intra prediction modes. Referring to FIG. 6, an intra prediction mode having a horizontal directionality and an intra prediction mode having a vertical directionality may be distinguished based on the intra prediction mode No. 34 having an upward-left diagonal prediction direction. In FIG. 6, H and V indicate the horizontal directionality and the vertical directionality, respectively, and numerals of −32 to 32 represent displacements in the unit of 1/32 on a sample grid position. No. 2 to No. 33 intra prediction modes have the horizontal directionality, and No. 34 to No. 66 intra prediction modes have the vertical directionality. No. 18 intra prediction mode and No. 50 intra prediction mode represent a horizontal intra prediction mode and a vertical intra prediction mode, respectively. No. 2 intra prediction mode may be called a bottom-left diagonal intra prediction mode, No. 34 intra prediction mode may be called a top-left diagonal intra prediction mode, and No. 66 intra prediction mode may be called a top-right diagonal intra prediction mode.

Meanwhile, as an embodiment of intra prediction, a method of selecting a reference sample line having the highest prediction accuracy among a plurality of reference sample lines of a current block and deriving a prediction sample by using a reference sample located in a prediction direction in the selected reference sample line may be proposed. The above-described method may be referred to as multi-reference line intra prediction (MRL) or an intra prediction based multi-reference line (MRL).

Specifically, in the existing intra prediction, only the neighboring samples of the first top line and the neighboring samples of the first left line of the current block may be used as reference samples for intra prediction. However, in the MRL, intra prediction may be performed using, as reference samples, neighboring samples located on a sample line separated by 1, 2, or 3 sample distances from top and/or left of the current block.

Figure 7:
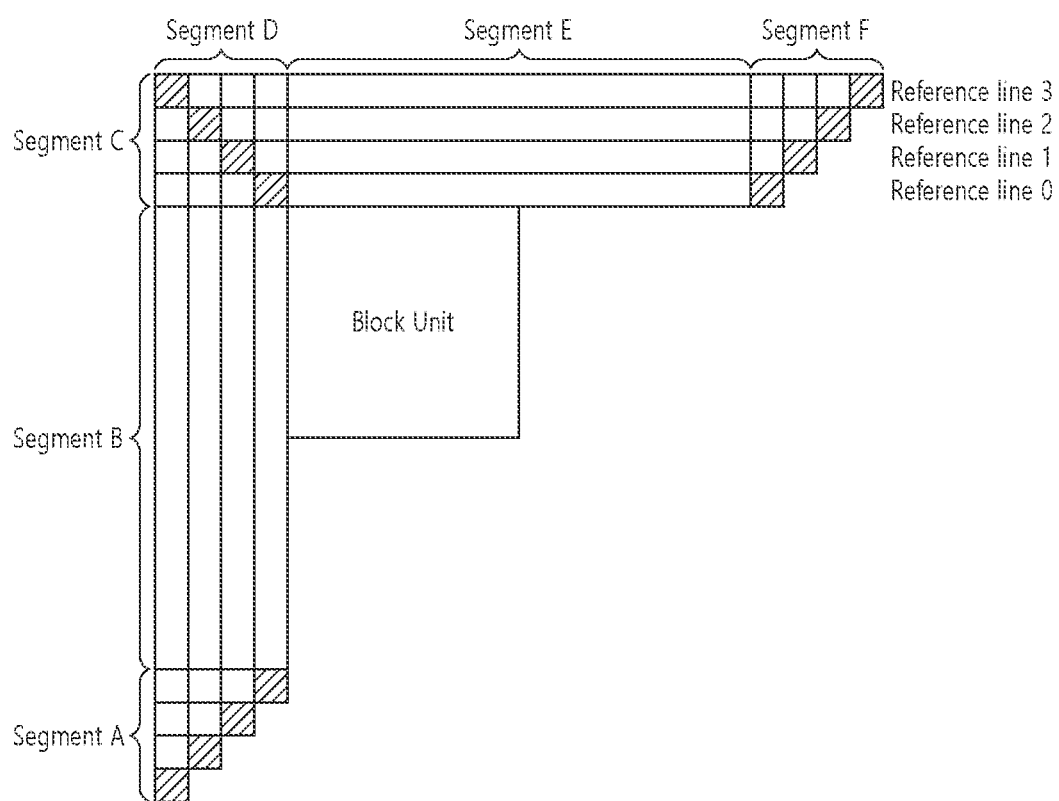
FIG. 7 illustratively represents multiple reference lines used in MRL.

FIG. 7 exemplarily shows multiple reference lines that can be used in the MRL. When the MRL is performed, the decoding apparatus may receive a reference line index. The reference line index may indicate one reference line among a plurality of reference lines. The decoding apparatus may perform intra prediction based on reference samples in the reference line indicated by the reference line index. The syntax element of the reference line index may be intra_luma_ref_idx. In addition, the MRL may not be disable for blocks of the first line (ie, the first row) in the CTU.

Also, as an embodiment of intra prediction, a method of dividing a current block in a horizontal direction or a vertical direction and performing intra prediction in units of the divided blocks may be proposed. That is, sub-blocks may be derived by dividing the current block in a horizontal direction or a vertical direction, and a method of performing intra prediction on each of the sub-blocks may be proposed. In this case, a reconstructed block may be generated by performing encoding/decoding in units of divided sub-blocks, and the reconstructed block may be used as a reference block of the next divided sub-block. The above-described method may be called intra sub-partitions prediction (ISP prediction), intra sub-partitions mode (ISP), or prediction based intra sub-partitions (ISP). Alternatively, the above-described method may be called ISP-based intra prediction. In addition, the sub-block may be referred to as an intra sub-partition. In addition, the sub-blocks (or sub-partitions) divided according to the ISP may be referred to as TUs (Transform Units).

According to the ISP, the current block may be divided into two or four sub-partitions in a vertical or horizontal direction based on the size of the current block. For example, when the ISP is performed, the current block may be partitioned into the same number of sub-blocks according to size of the current block as shown in the following table.

TABLE 1

| Block Size (CU) | Number of Patition |
|---|---|
| 4 × 4 | Nor paritioned |
| 4 × 8, 8 × 4 | 2 |
| otherwise | 4 |

Referring to Table 1, if the size of the current block is 4×4, the ISP may not be available. In addition, when the size of the current block is 4×8 or 8×4, the current block may be divided into two sub-blocks, and when the size of the current block is a size other than 4×4, 4×8, and 8×4 (that is, larger than 4×8 or 8×4 size), the current block may be divided into 4 sub-blocks.

Figure 8A:
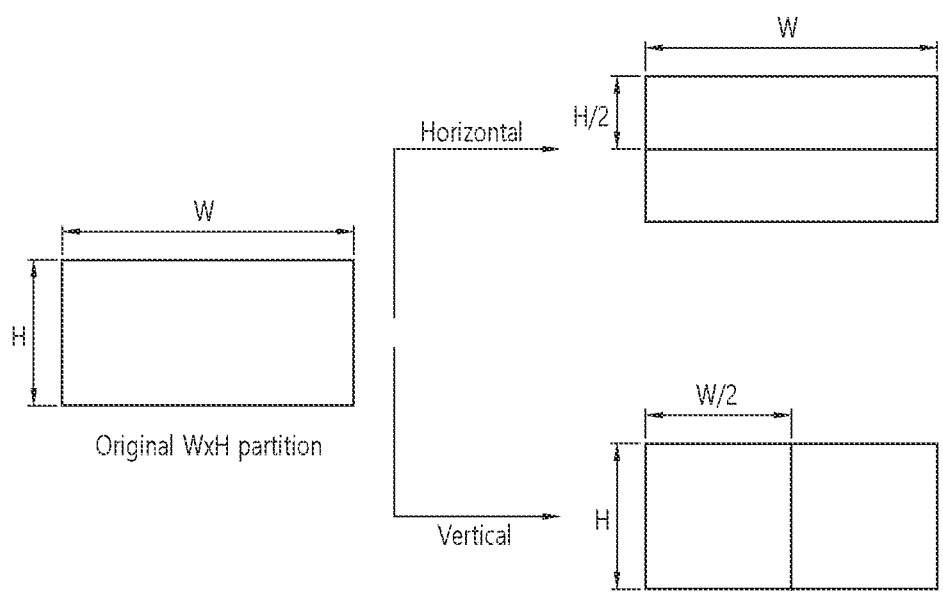
FIG. 8A and FIG. 8B illustratively represent an example in which a block to which ISP is applied is divided into sub-blocks based on the size of the block.
Figure 8B:
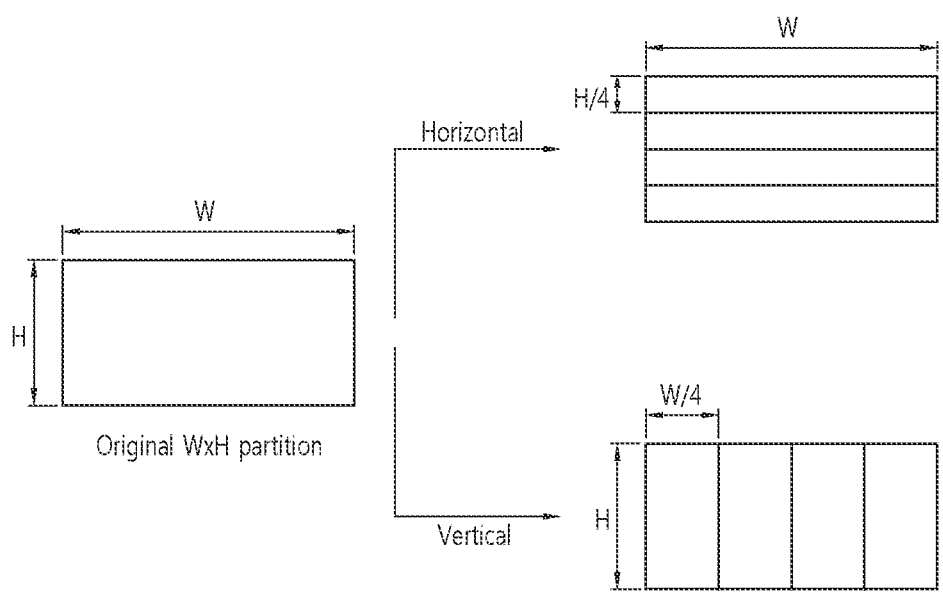

FIG. 8A and FIG. 8B show an example in which a block to which the ISP is applied is divided into sub-blocks based on the size of the block. Referring to FIG. 8A, when the size of the current block is 4×8 or 8×4, the current block may be divided into two sub-blocks. In addition, referring to FIG. 8B, when the size of the current block is a size other than 4×4, 4×8, and 8×4 (i.e., larger than the 4×8 or 8×4 size), the current block may be divided into 4 sub-blocks.

Meanwhile, Mx128 size (M≤64) and 128xN (N≤64) ISP blocks (ie, intra sub-partitions) may cause potential problems for 64×64 VDPUs. For example, a CU of size Mx128 in a single tree may have a luma TB of size Mx128 and two chroma TBs of size M/2×64 corresponding to the luma TBs. When the ISP is applied to the CU, the luma TB may be divided into 4 Mx32 TBs, that is, 4 Mx32 sub-blocks (only horizontal division is possible), and each of the TBs is smaller than a 64×64 block. However, in this case, the chroma block to which the ISP is applied may not be divided in the design according to the current video standard. Accordingly, the size of the TBs of the two chroma components with respect to the TBs of the luma component is larger than a 32×32 block. Similarly, a situation similar to the above-described situation may occur in a CU having a size of 128xN to which the ISP is applied. Therefore, the above two cases may be problematic for the 64×64 decoder pipeline. For this reason, the maximum size of a CU that can use the ISP may be limited to a size of 64×64.

When the ISP is applied, the encoding apparatus may generate an MPM list according to each division method (e.g., horizontal division or vertical division) in order to reduce coding complexity, and derive an optimal intra prediction mode by comparing the intra prediction modes in the generated MPM list in terms of rate-distortion optimization (RDO). On the other hand, when the above-described MRL is used, the ISP cannot be used. That is, the ISP can be applied only when the 0th reference line is used for intra prediction (i.e., when the value of intra_luma_ref_idx is 0). In addition, when the ISP is used, position dependent intra prediction (PDPC) cannot be used.

On the other hand, the flag indicating whether the ISP is applied may be transmitted in block units, and when the ISP is applied to the current block, a flag indicating whether the division type is horizontal or vertical, that is, whether the division direction is a horizontal direction or a vertical direction, may be encoded/decoded. The flag indicating whether the ISP is applied may be called an ISP flag, and a syntax element of the ISP flag may be intra_subpartitions_mode_flag. Also, the flag indicating the splitting type may be called an ISP split flag, and a syntax element of the ISP split flag may be intra_subpartitions_split_flag.

The syntax elements related to the ISP may be represented as shown in the following table.

TABLE 2

```
if( CuPredMode[ x0 ][ y0 ]  = =  MODE_INTRA ) {
    if( pcm_enabled_flag &&
        cbWidth >= MinIpcmCbSizeY   &&   cbWidth <= MaxIpcmCbSizeY &&
        cbHeight >= MinIpcmCbSizeY   &&   cbHeight <= MaxIpcmCbSizeY )
    pcm_flag[ x0 ][ y0 ]                                                              ae(v)
```

TABLE 2-continued

```
if( pcm_flag[ x0 ][ y0 ] ) {
    while( !byte_aligned( ) )
        pcm_alignment_zero_bit                                              f(1)
    pcm_sample( cbWidth, cbHeight, treeType)
} else {
    if( treeType = = SINGLE_TREE  | |  treeType = = DUAL_TREE_LUMA ) {
        if( ( y0% CtbSizeY ) > 0 )
            intra_luma_ref_idx[ x0 ][ y0 ]                                  ae(v)
        if (intra_luma_ref_idx[ x0 ][ y0 ] = = 0   &&
            ( cbWidth <= MaxTbSizeY  | | cbHeight <= MaxTbSizeY )   &&
            ( cbWidth * cbHeight > MinTbSizeY * MinTbSizeY ))
            intra_subpartitions_mode_flag[ x0 ][ y0 ]                       ae(v)
        if( intra_subpartitions_mode_flag[ x0 ][ y0 ] = = 1   &&
            cbWidth <= MaxTbSizeY  &&   cbHeight <= MaxTbSizeY )
            intra_subpartitions_split_flag[ x0 ][ y0 ]                      ae(v)
        if (intra_luma_ref_idx[ x0 ][ y0 ] = = 0   &&
            intra_subpartitions_mode_flag[ x0 ][ y0 ] = = 0 )
            intra_luma_mpm_flag[ x0 ][ y0 ]                                 ae(v)
        if( intra_luma_mpm_flag[ x0 ][ y0 ] )
            intra_luma_mpm_idx[ x0 ][ y0 ]                                  ae(v)
        else
            intra_luma_mpm_remainder[ x0 ][ y0 ]                            ae(v)
    }
    if( treeType = = SINGLE_TREE  | |  treeType = = DUAL_TREE_CHROMA )
        intra_chroma_pred_mode[ x0 ][ y0 ]                                  ae(v)
}
} else if( treeType != DUAL_TREE_CHROMA ) { /* MODE_INTER */
```

Intra_luma_ref_idx shown in Table 2 may be a syntax element of the reference line index. When the ISP is applied, the intra prediction mode for the current block may be equally applied to sub-partitions of the current block, and intra prediction may be performed by deriving neighboring reference samples in units of the sub-partitions, so that intra prediction performance can be improved. That is, when the ISP is applied, the residual sample processing procedure may be performed in units of sub-partitions. In other words, intra prediction is performed on each sub-partition to derive prediction samples, and reconstructed samples may be derived by adding a residual signal (residual samples) for each sub-partition and prediction samples for each sub-partition. The residual signal (residual samples) may be derived through an inverse quantization/inverse transformation process or the like based on the above-described residual information (quantized transform coefficient information or residual coding syntax) in the bitstream. Intra prediction for the subpartitions may be performed in the order of the leftmost subpartition to the rightmost subpartition if the partition type is vertical partitioning, and intra prediction for the subpartitions may be performed in the order of the topmost subpartition to the lowermost subpartition if the partition type is horizontal partitioning.

For example, prediction samples may be derived by performing intra prediction on the first subpartition of the current block, and residual samples for the first subpartition may be derived based on residual information on the first subpartition and reconstructed samples for the first subpartition may be derived based on the prediction samples and the residual samples. Here, when the partition type for the current block to which the ISP is applied is vertical partitioning, the first subpartition may be the leftmost subblock, and when the partition type for the current block to which the ISP is applied is horizontal partitioning, the first subpartition may be a topmost sub-block.

Thereafter, in the process of deriving prediction samples for the second subpartition, some of the reconstructed samples in the first subpartition are used to neighboring reference samples for the second subpartition (for example, left or top neighboring reference samples of the second subpartition). Specifically, prediction samples may be derived by performing intra prediction on the second subpartition of the current block, and residual samples for the second subpartition are derived based on residual information on the second subpartition, and reconstructed samples for the second subpartition may be derived based on the prediction samples and the residual samples. Also, similarly, when the process of deriving prediction samples for the third subpartition is performed, some of the reconstructed samples in the second subpartition are used to neighboring reference samples for the third subpartition (e.g., the left or top neighboring reference samples of the third subpartition). Also, similarly, when the process of deriving prediction samples for the fourth subpartition is performed, some of the reconstructed samples in the third subpartition used to neighboring reference samples for the fourth subpartition (e.g., the left or top neighboring reference samples of the fourth subpartition).

On the other hand, as another embodiment of intra prediction, CIIP (Combined Inter and Intra Prediction, CIIP) may be proposed. The CIIP may represent a process of deriving a prediction sample of the current block based on inter prediction and intra prediction. For example, when the CIIP is applied to the current block, an intra prediction mode of the current block may be derived, and a first prediction sample of the current block may be derived based on the intra prediction mode. Thereafter, a second prediction sample of the current block may be derived by performing inter prediction on the current block, and a prediction sample of the current block may be derived by weighted summing the first prediction sample and the second prediction sample (i.e., weighted averaging). Here, the first prediction sample may be referred to as an intra prediction sample, and the second prediction sample may be referred to as an inter prediction sample. Also, for example, inter prediction for the current block may be inter prediction according to a general merge mode. Specifically, for example, a merge candidate list for the current block may be configured based on motion information of neighboring blocks of the current block, the motion information of the current block may be derived based on a merge candidate in the merge candidate list indicated by the merge index for the current block, and the second prediction sample of the current block may be derived based on the motion information.

Also, for example, a CIIP flag indicating whether the CIIP is applied to the current block may be signaled, and whether the CIIP is applied to the current block may be determined based on the CIIP flag. For example, the CIIP flag may be signaled when the current block is coded in merge mode and the current block includes at least 64 luma samples (that is, when the product of the width and height of the current block is 64 or more).

Also, for example, when the CIIP is applied, the intra prediction mode of the current block may be derived based on two syntax elements. For example, one of up to four intra prediction modes may be used as the intra prediction mode. The four intra prediction modes may include a DC intra prediction mode, the planar intra prediction mode, the horizontal intra prediction mode, and/or the vertical intra prediction mode.

For example, in the CIIP for the luma component, up to four intra prediction modes including the DC intra prediction mode, the planar intra prediction mode, the horizontal intra prediction mode, and the vertical intra prediction mode may be used. Also, for example, when the width of the current block is more than twice the height, the vertical intra prediction mode may not be available. In this case, only three intra prediction modes are available. Also, for example, when the height of the current block is more than twice the width, the vertical intra prediction mode may not be available. In this case, only three intra prediction modes are available.

Specifically, for example, when the CIIP of the current block is applied, the intra prediction mode of the current block may be derived as follows. For example, the MPM list including most probable mode (MPM) candidates for the current block may be configured as follows. For example, the MPM list may include three MPM candidates.

For example, a left neighboring block of the current block may be set to A, and a top neighboring block may be set to B. Thereafter, intra prediction modes of the left neighboring block A and the top neighboring block B indicated by intraModeA and intraModeB may be derived as follows.

set X to A or B
1) when block X is not available, 2) when block X is not predicted using CIIP or intra prediction mode, 3) when block B is located outside the current CTU, intraModeX is set to DC intra prediction mode. Here, the current CTU may mean a CTU including the current block.

If none of the above cases apply, 1) If the intra prediction mode of block X is the DC intra prediction mode or the planar intra prediction mode, intraModeX may be set to the intra prediction mode of the block X, that is, the DC intra prediction mode or the planar intra prediction mode, or 2) when the intra prediction mode of block X is a vertical-like directional intra prediction mode (that is, intra prediction mode No. 35 to intra prediction mode No. 66), intraModeX may be set to the vertical intra prediction mode, or 3) when the intra prediction mode of block X is a horizontal-like directional intra prediction mode (i.e., intra prediction mode No. 2 to intra prediction mode No. 34), intraModeX may be set as the horizontal intra prediction mode.

Thereafter, the MPM candidates may be derived based on the derived intraModeA and intraModeB.

For example, if intraModeA and intraModeB are the same:
When intraModeA is the planar intra prediction mode or the DC intra prediction mode, three MPM candidates may be sequentially set to {planar intra prediction mode, DC intra prediction mode, and vertical intra prediction mode}.

or, otherwise, that is, when intraModeA is not the planar intra prediction mode and the DC intra prediction mode, the three MPM candidates may be sequentially set to {intraModeA, planar intra prediction mode, DC intra prediction mode}.

otherwise, that is, if intraModeA and intraModeB are not the same:

The first two MPM candidates may be set to {intraModeA, intraModeB}.

Afterwards, it is checked whether it is included in the previously derived MPM candidates in the order of the planar intra prediction mode, the DC intra prediction mode, and the vertical intra prediction mod and if it is confirmed that the intra prediction mode is not the derived MPM candidate, it may be added as a third MPM candidate.

Meanwhile, for example, when the width of the current block is more than twice the height or the height of the current block is more than twice the width, an MPM flag may be inferred to be 1 without signaling. Otherwise, the MPM flag for the current block may be signaled.

For example, when the value of the MPM flag is 1, an MPM index indicating one of the MPM candidates of the MPM list may be signaled, the MPM candidate indicated by the MPM index may be derived in the intra prediction mode of the current block. Also, for example, when the value of the MPM flag is 0, the intra prediction mode of the current block may be set to a "missing" mode. Here, the missing mode may indicate an intra prediction mode not included in the MPM list among four intra prediction modes available in the CIIP. For example, when the planar intra prediction mode is not included in the MPM list, the missing mode may be the planar intra prediction mode. When the value of the MPM flag is 0, the intra prediction mode of the current block may be derived as the planar intra prediction mode, which is the missing mode. Meanwhile, for example, the intra prediction mode of the CU coded with the CIIP may be stored and used for prediction of neighboring CUs coded after the CU.

Meanwhile, as described above, the first prediction sample and the second prediction sample may be weighted averaged. Here, for example, weights for the first prediction sample and the second prediction sample may be derived based on the intra prediction mode of the current block and/or the position of the current sample in the current block.

Specifically, for example, when the intra prediction mode of the current block is the DC intra prediction mode or the planar intra prediction mode, or the width or height of the current block is smaller than 4, the same weight may be applied to the first prediction sample and the second prediction sample. In other words, when the intra prediction mode of the current block is the DC intra prediction mode or the planar intra prediction mode, or the width or height of the current block is less than 4, weights for the first prediction sample and the second prediction sample may be derived as the same value.

In addition, in cases other than the above cases, weights for the first prediction sample and the second prediction sample may be derived based on the intra prediction mode of the current block and the current sample position in the current block. For example, when the intra prediction mode of the current block is the horizontal intra prediction mode, the current block may be divided into partitions of (W/4)×H size, and the current sample is located in the closest partition to the intra prediction reference sample of the current block, the weight for the first prediction sample of the current sample may be set to 6, and the weight for the second prediction sample may be set to 2. If the current sample is located in the second closest partition to the intra prediction reference sample of the current block, the weight for the first prediction sample of the current sample may be set to 5, and the weight for the second prediction sample may be set to 3, if the current sample is located in the third closest partition to the intra prediction reference sample of the current block, the weight for the first prediction sample of the current sample may be set to 3, and the weight for the second prediction sample may be set to 5, and when the current sample is located in the partition furthest from the intra prediction reference sample of the current block, the weight for the first prediction sample of the current sample may be set to 2, and the weight for the second prediction sample may be set to 6. Here, the size of the current block may be W×H, W may represent the width of the current block, and H may represent the height of the current block.

Also, for example, when the intra prediction mode of the current block is the vertical intra prediction mode, the current block may be divided into partitions of size W×(H/4), and the current sample is located in the closest partition to the intra prediction reference sample of the current block, the weight for the first prediction sample of the current sample may be set to 6, and the weight for the second prediction sample may be set to 2. If the current sample is located in the second closest partition to the intra prediction reference sample of the current block, the weight for the first prediction sample of the current sample may be set to 5, and the weight for the second prediction sample may be set to 3, if the current sample is located in the third closest partition to the intra prediction reference sample of the current block, the weight for the first prediction sample of the current sample may be set to 3, and the weight for the second prediction sample may be set to 5, and if the current sample is located in the partition furthest from the intra prediction reference sample of the current block, the weight for the first prediction sample of the current sample may be set to 2, and the weight for the second prediction sample may be set to 6.

Thereafter, the prediction sample of the current sample may be derived by averaging the first prediction sample and the second prediction sample based on the weights. For example, the prediction sample may be derived by the following equation.

$$P_{CHIP} = ((8-wt)*P_{inter} + wt*P_{intra} + 4) >> 3 \quad \text{[Equation 1]}$$

Here, $P_{CHIP}$ is a prediction sample, $P_{intra}$ is a first prediction sample, $P_{inter}$ is a second prediction sample, wt is a weight for the first prediction sample, and (8-wt) may indicate a weight for the second prediction sample.

Meanwhile, when intra prediction is performed as described above, general intra prediction, the MRL and/or the ISP may be applied. Here, the general intra prediction, the MRL, and MPM list generation methods in each of the ISP may be different. In the general intra prediction, 67 intra prediction modes may be used, and in the MRL-based intra prediction, 65 intra prediction modes excluding the planar intra prediction mode and the DC intra prediction mode are used, in the ISP, 66 intra prediction modes except for the DC intra prediction mode may be used. Since encoding/decoding of all three intra predictions (the general intra prediction, the MRL-based intra prediction, the ISP) is performed by intra prediction using a different number of intra prediction modes, the method for generating the MPM list for each intra prediction may be different.

Specifically, when general intra prediction is performed, the MPM list including 6 MPM candidates may be configured using all 67 intra prediction modes. In addition, when the MRL-based intra prediction is performed, the MPM list including 6 MPM candidates may be configured using 65 intra prediction modes except for the planar intra prediction mode and the DC intra prediction mode. In addition, when the ISP is performed, the MPM list including 6 MPM candidates may be configured using 66 intra prediction modes except for the DC intra prediction mode. Here, the MPM list may be configured in different ways depending on whether an ISP partition type is horizontal partitioning or vertical partitioning.

Figure 9:
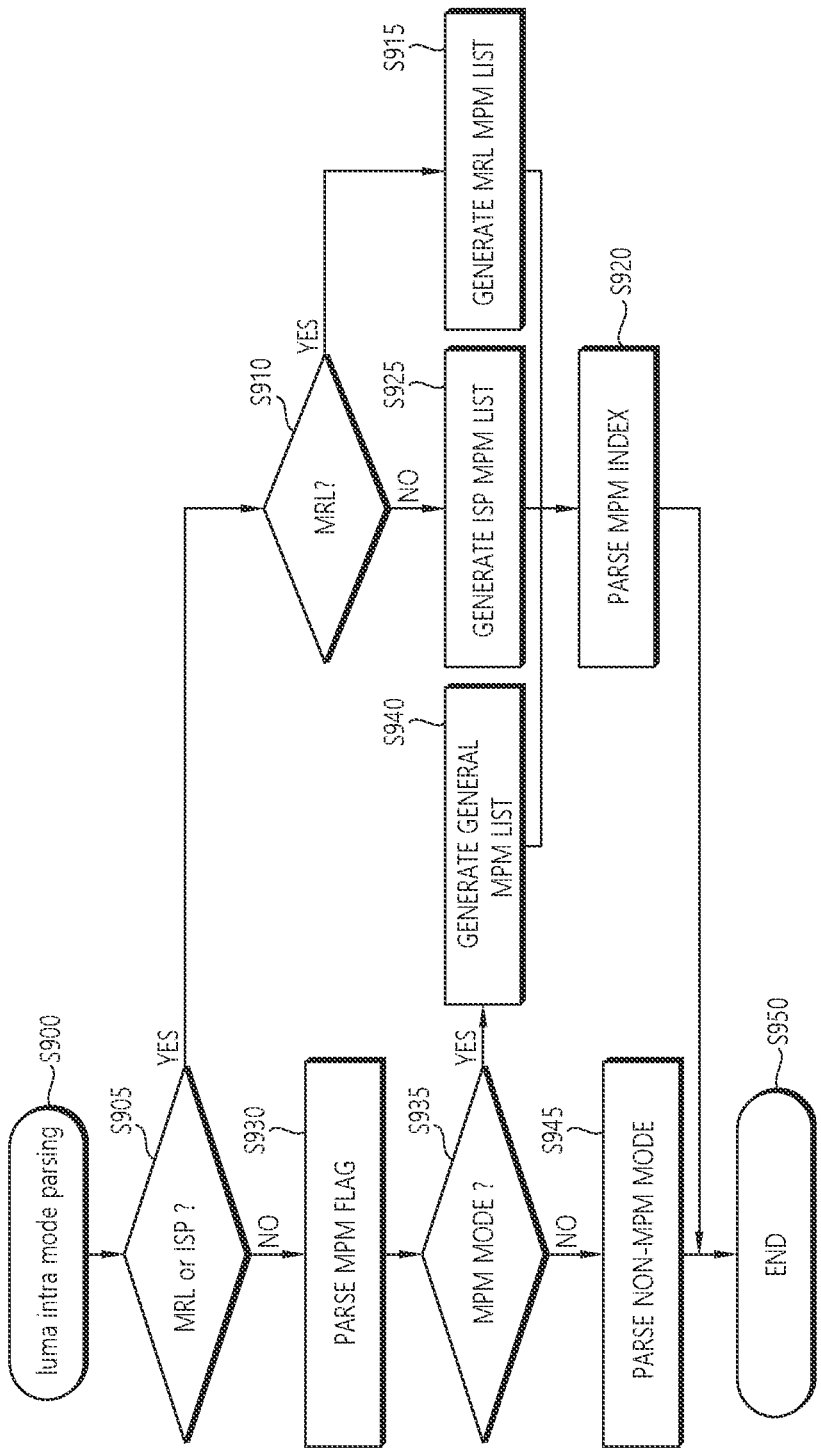
FIG. 9 is a flowchart showing an example of deriving an MPM list according to applied intra prediction.

FIG. 9 shows an example of deriving an MPM list according to applied intra prediction. Referring to FIG. 9, the decoding apparatus may determine whether the MRL or the ISP is applied to the current block (S905). When the MRL or the ISP is applied to the current block, the decoding apparatus may determine whether the MRL is applied to the current block (S910). When the MRL is applied to the current block, the decoding apparatus may generate an MRL MPM list for the current block (S915). Here, the MRL MPM list may indicate the MPM list generated according to the MPM list generation method when applied to the above-described MRL. Thereafter, the decoding apparatus may parse the MPM index (S920). The MPM index may indicate an MPM candidate derived from the intra prediction mode of the current block among the MPM candidates. The decoding apparatus may derive the MPM candidate indicated by the MPM index among the MPM candidates of the MRL MPM list as the intra prediction mode of the current block.

Also, when the MRL is not applied to the current block and the ISP is applied, the decoding apparatus may generate an ISP MPM list for the current block (S925). Here, the ISP MPM list may indicate the MPM list generated according to the MPM list generation method when applied to the above-described ISP. Thereafter, the decoding apparatus may parse the MPM index (S920). The decoding apparatus may derive the MPM candidate indicated by the MPM index among the MPM candidates of the ISP MPM list as the intra prediction mode of the current block.

Meanwhile, when the MRL and the ISP are not applied to the current block, the decoding apparatus may parse the MPM flag for the current block (S930). Thereafter, the decoding apparatus determines whether the intra prediction mode in the current block is the MPM mode based on the MPM flag, that is, whether the intra prediction mode in the current block is an MPM candidate included in the MPM list based on the MPM flag (S935). Here, the MPM flag may indicate whether the intra prediction mode of the current block is included in the MPM list.

When the intra prediction mode of the current block is the MPM mode, the decoding apparatus may generate the MPM list in general intra prediction (S940) and parse the MPM index for the current block (S920). The decoding apparatus may derive the MPM candidate indicated by the MPM index among the MPM candidates of the MPM list as the intra prediction mode of the current block.

On the other hand, when the intra prediction mode of the current block is not the MPM mode, when the intra prediction mode of the current block does not belong to the MPM candidates, the decoding apparatus may parse maintaining intra prediction mode information indicating one intra prediction mode among remaining intra prediction modes not included in the MPM candidates of the MPM list (S945). The decoding apparatus may derive the intra prediction mode indicated by remaining intra prediction mode information among the remaining intra prediction modes as the intra prediction mode for the current block.

As described above, the MPM list including the 6 MPM candidates may be configured using different methods according to intra prediction. However, if the MPM list generation method is different according to the intra prediction method, coding complexity may be increased and coding efficiency may also be reduced.

Accordingly, this document proposes a method of changing the MPM list generation methods used in the existing general intra prediction, the MRL-based intra prediction and the ISP into one generalized method. That is, this document proposes a method for generating the MPM list using one generalized method. By using the generalized MPM list generation method, the intra prediction encoding/decoding structure can be simplified, and the image coding efficiency can be improved by increasing the efficiency of encoding/decoding using the intra prediction mode.

In one embodiment, after generating the MPM list using one generalized method, a method of applying an MPM candidate in the MPM list to an intra prediction mode in the existing general intra prediction, the MRL-based intra prediction, and the ISP intra prediction is proposed.

For example, the MPM list generation method including the 6 MPM candidates used in the existing general intra prediction may be equally applied as the MPM list generation method of the MRL-based intra prediction and the ISP-based intra prediction. Here, the MPM list generation method may be a conventional MPM list generation method or an improved method of the conventional MPM list generation method. The above-described method for generating the MPM list including the 6 MPM candidates used in the existing intra prediction is a method of generating the MPM list in consideration of all 67 intra prediction modes, the MPM list may include the planar intra prediction mode and/or the DC intra prediction mode as the MPM candidates. However, since the MRL-based intra prediction does not use the planar intra prediction mode and the DC intra prediction mode, and the ISP-based intra prediction does not use the DC intra prediction mode, a different MPM list configuration method may be required.

Figure 10:
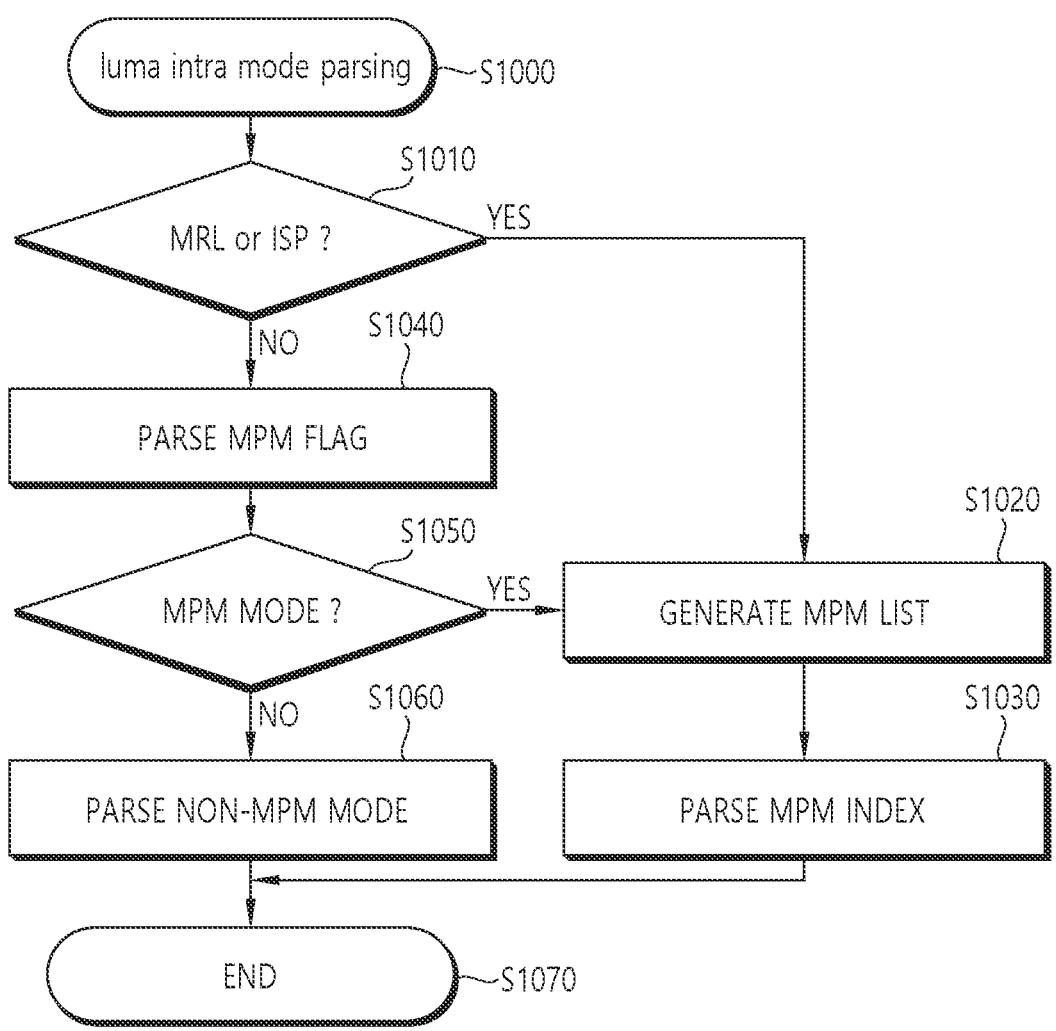
FIG. 10 is a flowchart showing an example of configuring the MPM list of the current block and deriving an intra prediction mode according to an example of the present disclosure.

FIG. 10 shows an example of configuring an MPM list of the current block and deriving an intra prediction mode according to the present embodiment. Referring to FIG. 10, the decoding apparatus may determine whether the MRL or the ISP is applied to the current block (S1010). When the MRL or the ISP is applied to the current block, the decoding apparatus may generate the MPM list of the current block (S1020) and parse the MPM index for the current block (S1030). The decoding apparatus may derive the MPM candidate indicated by the MPM index among the MPM candidates of the MPM list as the intra prediction mode of the current block.

In addition, when the MRL and the ISP are not applied to the current block, the decoding apparatus may parse the MPM flag for the current block (S1040), and may determine whether the intra prediction mode of the current block is included in the MPM list based on the MPM flag (S1050). The MPM flag may indicate whether the intra prediction mode of the current block is included in the MPM candidates of the MPM list.

When the intra prediction mode of the current block is the MPM mode, that is, when the MPM flag indicates that the intra prediction mode of the current block is included in the MPM candidates of the MPM list (eg, the value of the MPM flag is 1), the decoding apparatus may generate the MPM list of the current block (S1020). Here, the MPM list may be generated in the same way as the MPM list generated when the MRL or the ISP is applied to the current block. Thereafter, the decoding apparatus may parse the MPM index for the current block (S1030), and may derive the MPM candidate indicated by the MPM index among the MPM candidates of the MPM list as the intra prediction mode of the current block.

On the other hand, when the intra prediction mode of the current block is not the MPM mode, that is, when the MPM flag indicates that the intra prediction mode of the current block is not included in the MPM candidates of the MPM list (eg, the When the value of the MPM flag is 0), the decoding apparatus may parse the remaining intra prediction mode information of the current block (S1060). The decoding apparatus may derive the intra prediction mode indicated by the remaining intra prediction mode information among the remaining intra prediction modes as the intra prediction mode for the current block.

Meanwhile, this document proposes a method of more efficiently performing intra prediction performed based on the DC intra prediction mode when the MRL is applied. For example, in the present embodiment, when the DC intra prediction mode is applied in the MRL-based intra prediction (that is, when the intra prediction type of the current block is the MRL and the intra prediction mode of the current block is the DC intra prediction mode), a method for calculating a DC value is proposed.

Figure 11A:
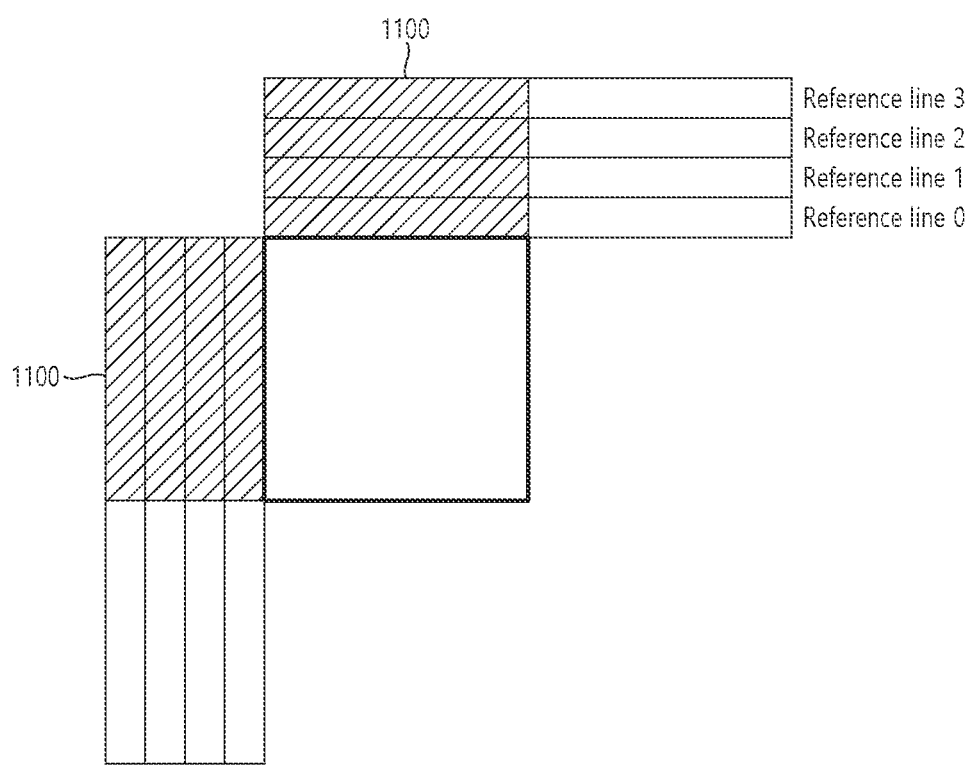
FIG. 11A and FIG. 11B exemplarily represent reference samples used for deriving a DC value in case which the intra prediction type of the current block is MRL and an intra prediction mode of the current block is a DC intra prediction mode.
Figure 11B:
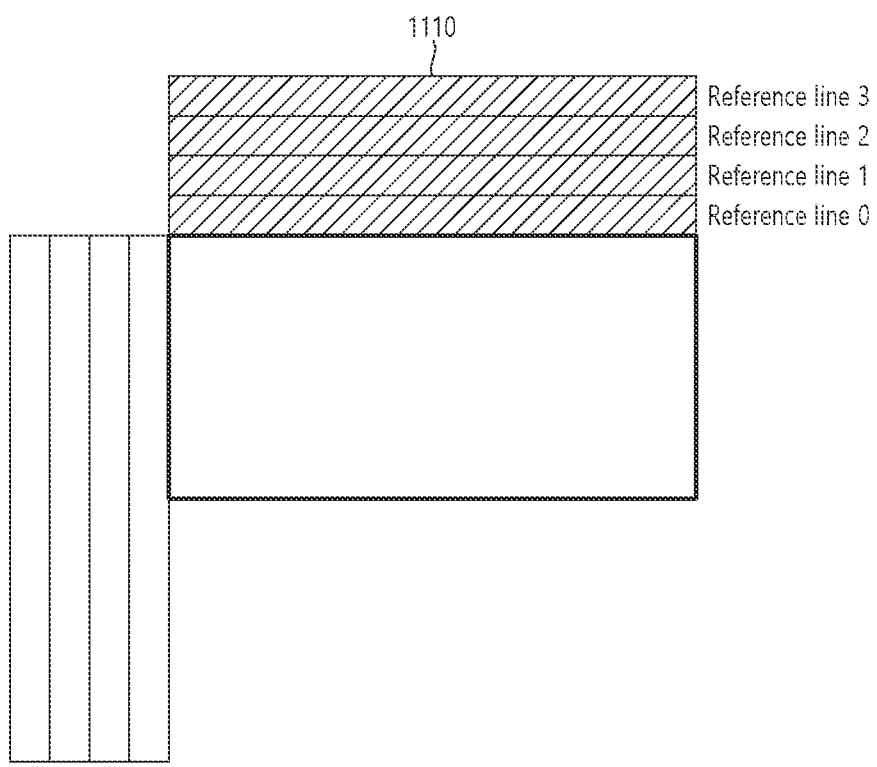

FIG. 11A and FIG. 11B exemplarily show reference samples used to derive a DC value when the intra prediction type of the current block is the MRL and the intra prediction mode of the current block is the DC intra prediction mode.

FIG. 11A may represent reference samples used to derive a DC value when the current block is a square block. For example, when the reference line indicated by the reference line index is the reference line 0, the reference line 1, the reference line 2, or the reference line 3, the DC value may be derived based on the reference samples in the area 1100 shown in FIG. 11A. That is, the DC value may be derived based on reference samples of which number is equal to a width and started from the left end reference sample in a top reference line of the current block and reference samples of which number is equal to a height and started from the top end reference sample in a left reference line of the current block. In other words, when the size of the current block is WxH and the x component and y component of the top-left position of the current block are 0, the DC value may be derived based on reference samples of from (0, −refIdx−1) to (W-1,−refIdx−1) in the top reference line indicated by the reference line index and reference samples of from (−refIdx−1, 0) to (−refIdx−1, H-1) in the left reference line indicated by the reference line index.

For example, the DC value may be derived as follows $$dcVal=(\Sigma_{x'=0}^{nTbW-1}p[x'][-1-\text{refidx}]+\Sigma_{y'=0}^{nTbH-1}p[-1-\text{refIdx}][y']+nTbw)>>(\text{Log}2(nTbw)+1)$$ [Equation 2]

Here, deVal may indicate a DC value, nTbW may indicate the width of the current block, and refIdx may indicate a reference line indicated by the reference line index.

Also, FIG. 11B may represent a reference sample used to derive a DC value when the current block is a non-square block. In the present embodiment, when the current block is the non-square block, the DC value may be derived based on reference samples in a reference line of a longer one of a width and a height of the current block. For example, when the reference line specified by the reference line index is reference line 0, reference line 1, reference line 2, or reference line 3, the DC value may be derived based on reference samples in the area 1110 of the reference line on the longer side among the width and the height of the current block. For example, when the width of the current block is longer than the height, the DC value may be derived based on reference samples of which number is equal to the width and started from the left end reference sample in the top reference line of the current block. In other words, when the size of the current block is W×H and the x component and y component of the top-left position of the current block are 0, the DC value may be derived based on reference samples from (0, −refIdx−1) to (W−1, −refIdx−1) in the top reference line indicated by the reference line index. The DC value may be derived by the following equation.

$$dcVal = (\Sigma_{x'=0}^{nTbW-1} p[x'][-1-refIdx] + (nTbW>>1))>>Log\ 2(nTbW)$$ [Equation 3]

Here, dcVal may indicate a DC value, nTbW may indicate the width of the current block, and refIdx may indicate a reference line indicated by the reference line index.

Also, for example, when the width of the current block is shorter than the height, the DC value may be derived based on reference samples of which number is equal to the height and started from the top end reference sample in the left reference line of the current block. In other words, when the size of the current block is W×H and the x component and y component of the top-left position of the current block are 0, the DC value may be derived based on reference samples from (−refIdx−1, 0) to (−refIdx−1, H-1) in the left reference line indicated by the reference line index. The DC value may be derived as follows.

$$dcVal = (\Sigma_{y'=0}^{nTbH-1} p[-1-refIdx][y'] + (nTbH>>1))>>Log\ 2(nTbH)$$ [Equation 4]

Here, dcVal may indicate a DC value, nTbH may indicate a height of the current block, and refIdx may indicate a reference line indicated by the reference line index.

Then, the prediction sample of the current block may be derived as the DC value.

Meanwhile, this document proposes a method of more efficiently performing intra prediction performed based on the planar intra prediction mode when the MRL is applied. For example, in the present embodiment, when the planar intra prediction mode is applied in the MRL-based intra prediction (that is, when the intra prediction type of the current block is the MRL and the intra prediction mode of the current block is the planar intra prediction mode), a method for determining reference samples for a planar prediction is proposed.

Figure 12:
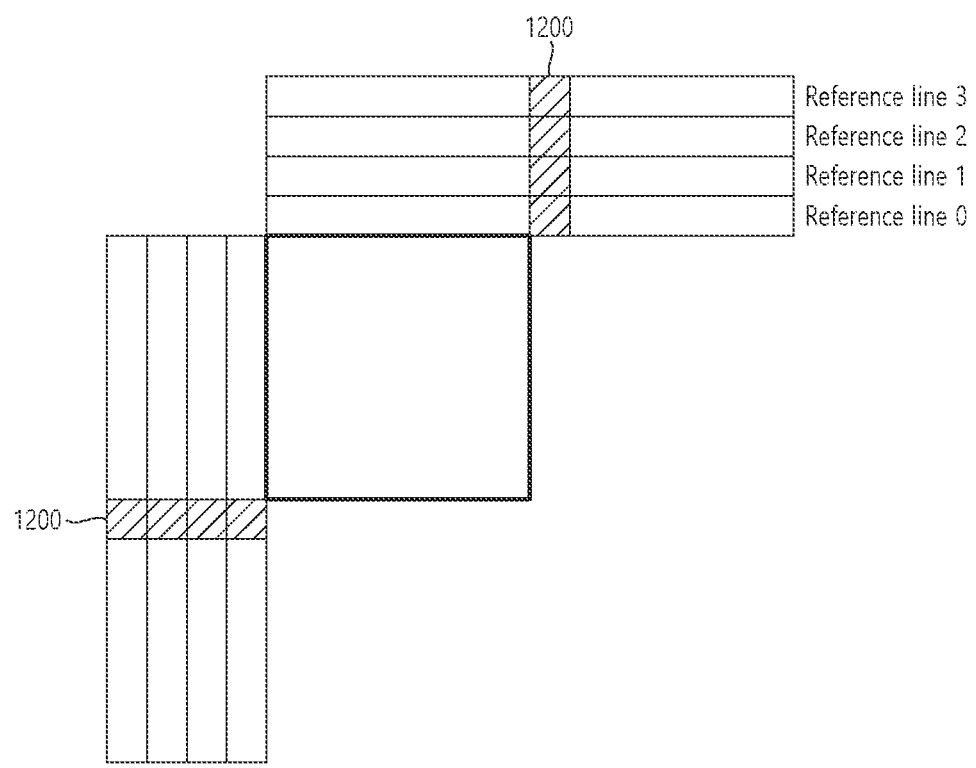
FIG. 12 exemplarily represents reference samples used in case which the intra prediction type of the current block is MRL and an intra prediction mode of the current block is a planar intra prediction mode.

FIG. 12 exemplarily shows reference samples used when the intra prediction type of the current block is the MRL and the intra prediction mode of the current block is the planar intra prediction mode.

Referring to FIG. 12, when the reference line indicated by the reference line index is the reference line 0, the reference line 1, the reference line 2, or the reference line 3, a planner prediction may be performed based on the reference samples in the area 1200 of the reference line illustrated in FIG. 12. According to the present embodiment, the planar prediction may be performed based on the sample of 'the end of the width/height of the current block' +1, regardless of the reference line index. That is, according to the present embodiment, when the x component and the y component of the top-left position of the current block are 0, the intra prediction type of the current block is the MRL, and the intra prediction mode of the current block is the planar intra prediction mode, the planar prediction for the current block may be performed based on a reference sample of (W, −refIdx−1) in the top reference line and a reference sample of (−refIdx−1, H) in the left reference line.

Referring to this embodiment, the PLANAR intra prediction is performed using the reference samples of the reference line indicated by the reference line index, and the PLANAR intra prediction is performed based on the left reference sample in the same row (i.e., the same y-coordinate) as the current sample position in the current block, the top reference sample in the same column (i.e., the same x-coordinate) as the current sample position, a reference sample at (W, −refIdx−1) in the top reference line and a reference sample of (−refIdx−1, H) in the left reference line among the reference samples of the reference line. In this case, the prediction sample value of the current sample may be derived by performing bidirectional linear interpolation based on the values of the above-described four reference samples. Here, the bidirectional linear interpolation may be performed on the assumption that the bottom left reference sample is located below the current sample and the top right reference sample is located at the right side of the current sample.

Meanwhile, an embodiment different from the embodiments of the MPM list generation method commonly used in the aforementioned general intra prediction, the MRL, and the ISP may be used. That is, this document proposes another example of a method for generating the MPM list commonly used in general intra prediction, the MRL, and the ISP. Another example of the method for generating the MPM list may be as shown in the following table.

TABLE 3

| Generalized MPM configuration method (6 MPM) |
|---|
| leftIntraDir : intra direction of left PU |
| aboveIntraDir : intra direction of above PU |
| 1.     Default mode |
|         mpm[0] = PLANAR_IDX |
|         mpm[1] = DC_IDX |
|         mpm[2] = VER_IDX |
|         mpm[3] = HOR_IDX |
|         mpm[4] = VER_IDX−4 |
|         mpm[5] = VER_IDX+4 |
| 2.     If two neighboring modes are same and two neighboring modes are greater than DC. |
|         mpm[0] = PLANAR_IDX |
|         mpm[1] = leftIntraDir |
|         mpm[2] = 2 + ( (leftIntraDir + 61) % 64) |
|         mpm[3] = 2 + ( (leftIntraDir − 1 ) % 64) |
|         mpm[4] = DC_IDX |
|         mpm[5] = 2 + ( (leftIntraDir + 60) % 64) |
| 3.     If (leftIntraDir > DC_IDX) && (aboveIntraDir > DC_IDX) |
|         mpm[0] = PLANAR_IDX |
|         mpm[1] = leftIntraDir |
|         mpm[2] = aboveIntraDir |
|         mpm[3] = DC_IDX |
|         maxCandModeIdx = mpm[1] > mpm[2] ? 1 : 2; |
|         minCandModeidx = mpm[1] > mpm[2] ? 2 : 1; |
|           if ((mpm[maxCandModeIdx] − mpm[minCandModeidx] < 63) && (mpm[maxCandModeIdx] − mpm[minCandModeidx] > 1)) |
|         mpm[4] = 2 + ( (maxAB + 61) % 64) |
|           mpm[5] = 2 + ( (maxAB − 1 ) % 64) |
|         otherwise |
|           mpm[4] = 2 + ( (maxAB + 60) % 64) |
|           mpm[5] = 2 + ( maxAB % 64) |

TABLE 3-continued

Generalized MPM configuration method (6 MPM)

4. If leftIntraDir + aboveIntraDir >= 2.
   mpm[0] = PLANAR_IDX
   mpm[1] = (leftIntraDir < aboveIntraDir) ? aboveIntraDir : leftIntraDir;
   mpm[2] = DC_IDX
   mpm[3] = 2 + ( (maxAB + 61) % 64)
   mpm[4] = 2 + ( (maxAB − 1 ) % 64)
   mpm[5] = 2 + ( (maxAB + 60) % 64)

According to an example of the MPM list generating method shown in Table 3, the encoding apparatus/decoding apparatus may derive the intra prediction mode of the left neighboring block and the intra prediction mode of the top neighboring block of the current block. The intra prediction mode of the left neighboring block may be expressed as leftIntraDir, and the intra prediction mode of the top neighboring block may be expressed as aboveIntraDir.

For example, when generating the MPM list, the intra mode of the neighboring CIIP may not be referenced. In other words, when configuring the MPM list, as described above, the intra prediction mode for the neighboring block (the left neighboring block or the top neighboring block) is derived, and the intra prediction mode (leftIntraDir or aboveIntraDir) can be used as a candidate mode of the MPM list. However, when the neighboring block is coded with CIIP, the neighboring block is coded in the intra prediction mode, but the intra prediction mode does not indicate the direction/trend of the image, but rather performs a role for smoothing the inter prediction result. That is, the intra prediction mode of the CIIP-coded neighboring block may have low correlation with the intra prediction mode of the non-CIIP block. Therefore, according to this embodiment, the intra prediction mode of the neighboring block coded with CIIP is not derived as a candidate mode for configuring the MPM list, and for the CIIP-coded neighboring block, a predefined specific mode (the planar mode or the DC mode) may be used as a candidate mode for configuring the MPM list of the current block instead of the intra prediction mode of the neighboring block.

Also, for example, the encoding apparatus/decoding apparatus may derive a default MPM list. For example, the encoding apparatus/decoding apparatus may derive MPM candidate 0 of the default MPM list as the planar intra prediction mode, MPM candidate 1 as the DC intra prediction mode, MPM candidate 2 as the vertical intra prediction mode, MPM candidate 3 as the horizontal intra prediction mode, MPM candidate 4 as the intra prediction mode of the mode number obtained by subtracting 4 from the mode number of the vertical intra prediction mode, that is, intra prediction mode No. 46, and MPM candidate 5 as the intra prediction mode of the mode number obtained by adding 4 to the mode number of the vertical intra prediction mode, that is, the intra prediction mode No. 54.

Thereafter, the encoding apparatus/decoding apparatus may determine whether the intra prediction mode of the left neighboring block and the intra prediction mode of the top neighboring block of the current block are the same and the mode number of the intra prediction mode of the left neighboring block is greater than the mode number of the DC intra prediction mode.

For example, when the intra prediction mode of the left neighboring block and the intra prediction mode of the top neighboring block are the same, and the mode number of the intra prediction mode of the left neighboring block is greater than the mode number of the DC intra prediction mode, the encoding apparatus/decoding apparatus may derive the MPM list of the current block including the derived MPM candidates 0 to 5 as described below.
  mpm[0]=PLANAR_IDX
  mpm[1]=leftIntraDir
  mpm[2]=2+((leftIntraDir+61) % 64)
  mpm[3]=2+((leftIntraDir−1) % 64)
  mpm[4]=DC_IDX
  mpm[5]=2+((leftIntraDir+60) % 64)

That is, MPM candidate 0 of the MPM list may be derived in the planar intra prediction mode, and MPM candidate 1 of the MPM list may be derived as the intra prediction mode of the left neighboring block, the MPM candidate 2 of the MPM list may be derived as an intra prediction mode having a mode number of 2+((leftIntraDir+61) % 64), that is, the intra prediction mode with the mode number of a value obtained by adding 61 to the mode number of the intra prediction mode of the left neighboring block, calculating modular arithmetic by 64 and adding 2, the MPM candidate 3 of the MPM list may be derived as an intra prediction mode having a mode number of 2+((leftIntraDir−1) % 64), that is, the intra prediction mode with the mode number of a value obtained by subtracting 1 from the mode number of the intra prediction mode of the left neighboring block, calculating modular arithmetic by 64 and adding 2, the MPM candidate 4 of the MPM list may be derived as the DC intra prediction mode, and the MPM candidate 5 of the MPM list may be derived as an intra prediction mode with a mode number of 2+((leftIntraDir+60) % 64), that is, the intra prediction mode with the mode number of a value obtained by adding 60 to the mode number of the intra prediction mode of the left neighboring block, calculating modular arithmetic by 64 and adding 2.

On the other hand, when the intra prediction mode of the left neighboring block of the current block and the intra prediction mode of the top neighboring block are not the same, the encoding apparatus/decoding apparatus determines whether the mode number of the intra prediction mode of the left neighboring block is greater than the mode number of the DC intra prediction mode, and the mode number of the intra prediction mode of the top neighboring block is greater than the mode number of the DC intra prediction mode.

When the mode number of the intra prediction mode of the left neighboring block is greater than the mode number of the DC intra prediction mode and the mode number of the intra prediction mode of the top neighboring block is greater than the mode number of the DC intra prediction mode, the encoding apparatus/decoding apparatus may derive the planar intra prediction mode as MPM candidate 0 of the MPM list, may derive the intra prediction mode of the left neighboring block as MPM candidate 1 of the MPM list, may derive the intra prediction mode of the top neighboring block as MPM candidate 2 of the MPM list, and may derive the DC intra prediction mode as MPM candidate 3 of the MPM list. In addition, the encoding apparatus/decoding apparatus may derive maxCandModeIdx as 1 when the mode number of the MPM candidate 1 is greater than the mode number of the MPM candidate 2, and may derive maxCandModeIdx as 2 when the mode number of the MPM candidate 1 is not greater than the mode number of the MPM candidate 2. In addition, the encoding apparatus/decoding apparatus may derive minCandModeIdx as 2 when the mode number of the MPM candidate 1 is greater than the mode number of the MPM candidate 2, and may derive minCandModeIdx as 1 when the mode number of the MPM candidate 1 is not greater than the mode number of the MPM candidate 2.

Then, if the value obtained by subtracting the mode number of mpm[minCandModeidx] from the mode number of mpm[maxCandModeIdx] is less than 63 and greater than 1, the encoding apparatus/decoding apparatus may derive an intra prediction mode with a mode number of 2+ ((maxAB+61) % 64) as the MPM candidate 4 of the MPM list, an intra prediction mode with a mode number of 2+((maxAB−1) % 64) as the MPM candidate 5 of the MPM list. Here, if the maxCandModeIdx is 1, then mpm[maxCandModeIdx] may be MPM candidate 1, if the maxCandModeIdx is 2, then mpm[maxCandModeIdx] may be MPM candidate 2, if the minCandModeidx is 1, then mpm[minCandModeIdx] may be MPM candidate 1, if the minCandModeidx is 2, then [minCandModeidx] may be MPM candidate 2. Also, here, maxAB may be a greater value of the mode number of the intra prediction mode of the left neighboring block and the mode number of the intra prediction mode of the top neighboring block.

Alternatively, if the value obtained by subtracting the mode number of mpm[minCandModeidx] from the mode number of mpm[maxCandModeIdx] is greater than or equal to 63 or less than or equal to 1, the encoding apparatus/decoding apparatus may derive an intra prediction mode with a mode number of 2+((maxAB+60) % 64) as the MPM candidate 4 of the MPM list, and an intra prediction mode with a mode number of 2+(maxAB % 64) as the MPM candidate 5 of the MPM list.

Meanwhile, when the intra prediction mode of the left neighboring block and the intra prediction mode of the top neighboring block of the current block are not the same or when at least one of the mode numbers of the intra prediction mode of the left neighboring block and the intra prediction mode of the top neighboring block is smaller than the mode number of the DC intra prediction mode, the encoding apparatus/decoding apparatus may determine whether the sum of the mode number of the intra prediction mode of the left neighboring block and the mode number of the intra prediction mode of the top neighboring block is equal to or greater than the mode number of the DC intra prediction mode.

When the sum of the mode number of the intra prediction mode of the left neighboring block and the mode number of the intra prediction mode of the top neighboring block is equal to or greater than the mode number of the DC intra prediction mode, the encoding apparatus/decoding apparatus may derive the MPM list of the current block including the derived MPM candidates 0 to 5 as described below.

mpm[0]=PLANAR_IDX
mpm[1]=(leftIntraDir<aboveIntraDir)? aboveIntraDir: leftIntraDir
mpm[2]=DC_IDX
mpm[3]=2+((maxAB+61) % 64)
mpm[4]=2+((maxAB−1) % 64)
mpm[5]=2+((maxAB+60) % 64)

That is, MPM candidate 0 of the MPM list may be derived as the planar intra prediction mode, and MPM candidate 1 may be derived as the intra prediction mode of the top neighboring block when the mode number of the intra prediction mode of the left neighboring block is smaller than the mode number of the intra prediction mode of the top neighboring block and may be derived as the intra prediction mode of the left neighboring block when the mode number of the intra prediction mode of the left neighboring block is greater than or equal to the mode number of the intra prediction mode of the top neighboring block. The MPM candidate 2 of the MPM list may be derived as the DC intra prediction mode. The MPM candidate 3 of the MPM list may be derived as an intra prediction mode with a mode number of 2+((maxAB+61) % 64), that is, the intra prediction mode with the mode number of a value obtained by adding 61 to the larger value of the mode number of the intra-prediction mode of the left neighboring block and the mode number of the intra-prediction mode of the top neighboring block, calculating modular arithmetic by 64 and adding 2. The MPM candidate 4 of the MPM list may be derived as an intra prediction mode with a mode number of 2+((maxAB−1) % 64), that is, the intra prediction mode with the mode number of a value obtained by substracting 1 from the larger value of the mode number of the intra-prediction mode of the left neighboring block and the mode number of the intra-prediction mode of the top neighboring block, calculating modular arithmetic by 64 and adding 2. The MPM candidate 5 of the MPM list may be derived as an intra prediction mode with a mode number of 2+((maxAB+60) % 64), that is, the intra prediction mode with the mode number of a value obtained by adding 60 to the larger value of the mode number of the intra-prediction mode of the left neighboring block and the mode number of the intra-prediction mode of the top neighboring block, calculating modular arithmetic by 64 and adding 2.

On the other hand, if the above-described embodiment of the MPM list generation method is shown as a source code, it may be as shown in the following table.

TABLE 4

Generalized MPM configuration method
I (6 MPM) source code version

```
const int numMPMs = NUM_MOST_PROBABLE_MODES:
int numCand =     −1;
int leftIntraDir = PLANAR_IDX, aboveIntraDir = PLANAR_IDX;
const CompArea &area =
pu.block(getFirstComponentOfChannel(channelType));
const Postion posRT = area.topRight( );
const Postion posLB = area.bottomLeft( );
       // Get intra direction of left PU
const PredictionUnit +puLeft =
pu..cs->getPURestricted(posLB.offset(−1, 0), pu, channelType);
if (puLeft && CU::IsIntra(+puLeft->cu))
{
       leftIntraDir = puLeft->IntraDir[channelType];
}
// Get intra direction of above PU
const PredictionUnit +puAbove =
pu.cs->getPURestricted(posRT.offset(0, −1), pu, channelType);
if (puAbove && CU::IsIntra(+puAbove->cu) &&
CU::IsSameCtu(+pu.cu, puAbove-cu))
{
    aboveIntraDir = puAbove->IntraDir[channelType];
}
const int offset = (int)NUM_LUMA_MODE − 6;
const int mod = offset + 3;
mpm[0] = PLANAR_IDX;
mpm[1] = DC_IDX;
mpm[2] = VER_IDX;
mpm[3] = HOR_IDX;
mpm[4] = VER_IDX − 4;
mpm[5] = VER_IDX + 4;
if (leftIntraDir == aboveIntraDir)
{
       numCand = 1;
       if (leftIntraDir > DC_IDX)
       {
             mpm[0] = PLANAR_IDX;
             mpm[1] = leftIntraDir;
                mpm[2] = ((leftIntraDir + offset) % mod) + 2;
                mpm[3] = ((leftIntraDir − 1) % mod) + 2;
                mpm[4] = DC_IDX;
                mpm[5] = ((leftIntraDir + offset − 1) % mod) + 2;
       }
}
else //L1=A
{
       numCand = 2;
       int maxCandModeIdx = mpm[0] > mpm[1] ? 0 : 1;
       if ((leftIntraDir > DC_IDX) && (aboveIntraDir > DC_IDX))
```

TABLE 5

```
{
        mpm[0] = PLANAR_IDX;
        mpm[1] = leftIntraDir;
        mpm[2] = aboveIntraDir;
        maxCandModeIdx = mpm[1] > mpm[2] ? 1 : 2;
        int minCandModeidx = mpm[1] > mpm[2] ? 2 : 1;
        mpm[3] = DC_IDX;
        if ((mpm[maxCandModeIdx] - mpm[minCandModeidx] < 63) (mpm[maxCandModeIdx] - mpm[minCandModeidx] > 1))
        {
          mpm[4] = ((mpm[maxCandModeIdx] + offset) % mod) + 2;
          mpm[5] = ((mpm[maxCandModeIdx] - 1) % mod) + 2;
        }
        else
        {
          mpm[4] = ((mpm[maxCandModeIdx] + offset - 1) % mod) + 2;
          mpm[5] = ((mpm[maxCandModeIdx]) % mod) + 2;
        }
    }
    else if (leftIntraDir + aboveIntraDir >= 2)
    {
        mpm[0] = PLANAR_IDX;
      mpm[1] = (leftIntraDir < aboveIntraDir) ? aboveIntraDir : leftIntraDir;
      maxCandModeIdx = 1;
    mpm[2] = DC_IDX;
        mpm[3] = ((mpm[maxCandModeIdx] + offset) % mod) + 2;
      mpm[4] = ((mpm[maxCandModeIdx] - 1) % mod) + 2;
      mpm[5] = ((mpm[maxCandModeIdx] + offset - 1) % mod) + 2;
    }
  }
}
```

The above Tables 4 to 5 may be examples shown as one continuous source code.

In addition, if the above-described embodiment of the MPM list generation method is shown in a standard format, it may be as shown in the following table.

[Table 6]

| Generalized MPM Configuration Method 1 (6 MPM) spec version |
|---|
| 8.4.2 of VVC spec <br><br> Derivation process for luma intra prediction mode <br> Input to this process are: <br><br> – a luma location ( xCb , yCb ) specifying the top-left sample of the current luma coding block relative to the top-left luma sample of the current picture, <br><br> – a variable cbWidth specifying the width of the current coding block in luma samples, <br><br> – a variable cbHeight specifying the height of the current coding block in luma samples. <br><br> In this process, the luma intra prediction mode IntraPredModeY[ xCb ][ yCb ] is derived. <br><br> Table 8-1 specifies the value for the intra prediction mode IntraPredModeY[ xCb ][ yCb ] and the associated names. <br><br> Table 8-1 – Specification of intra prediction mode and associated names <br><br> <table><tr><th>Intra prediction mode</th><th>Associated name</th></tr></table> |

| 0 | INTRA_PLANAR |
|---|---|
| 1 | INTRA_DC |
| 2..66 | INTRA_ANGULAR2..INTRA_ANGULAR66 |
| 81..83 | INTRA_LT_CCLM, INTRA_L_CCLM, INTRA_T_CCLM |

NOTE – : The intra prediction modes INTRA_LT_CCLM, INTRA_L_CCLM and INTRA_T_CCLM are only applicable to chroma components.

IntraPredModeY[ xCb ][ yCb ] is derived by the following ordered steps:

1. The neighbouring locations ( xNbA, yNbA ) and ( xNbB, yNbB ) are set equal to ( xCb − 1, yCb + cbHeight − 1 ) and ( xCb + cbWidth − 1, yCb − 1 ), respectively.

1. For X being replaced by either A or B, the variables candIntraPredModeX are derived as follows:

- The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availableX.

- The candidate intra prediction mode candIntraPredModeX is derived as follows:

–If one or more of the following conditions are true, candIntraPredModeX is set equal to INTRA_PLANAR.

- The variable availableX is equal to FALSE.

- CuPredMode[ xNbX ][ yNbX ] is not equal to MODE_INTRA

- pcm_flag[ xNbX ][ yNbX ] is equal to 1.

- X is equal to B and yCb − 1 is less than ( ( yCb >> CtbLog2SizeY ) << CtbLog2SizeY ).

–Otherwise, candIntraPredModeX is set equal to IntraPredModeY[ xNbX ][ yNbX ].

2. The candModeList[ x ] with x = 0..5 is derived as follows:

–If candIntraPredModeB is equal to candIntraPredModeA and candIntraPredModeA is greater than INTRA_DC, candModeList[ x ] with x = 0..5 is derived as follows:

$$candModeList[\ 0\ ] = INTRA\_PLANAR \qquad (8\text{-}9)$$

$$candModeList[\ 1\ ] = candIntraPredModeA \qquad (8\text{-}10)$$

TABLE 7

| | |
|---|---|
| candModeList[ 2 ] = 2 + ( ( candIntraPredModeA + 61 ) % 64 ) | (8-12) |
| candModeList[ 3 ] = 2 + ( ( candIntraPredModeA − 1 ) % 64 ) | (8-13) |
| candModeList[ 4 ] = INTRA_DC | (8-11) |
| candModeList[ 5 ] = 2 + ( ( candIntraPredModeA + 60 ) % 64 ) | (8-14) |

-Otherwise if candIntraPredModeB is not equal to candIntraPredModeA and candIntraPredModeA or candIntraPredModeB is greater than INTRA_DC, the following applies:
  -The variables minAB and maxAB are derived as follows:

| | |
|---|---|
| minAB = Min( candIntraPredModeA, candIntraPredModeB ) | (8-24) |
| maxAB = Max( candIntraPredModeA, candIntraPredModeB ) | (8-25) |

-If candIntraPredModeA and candIntraPredModeB are both greater than INTRA_DC, candModeList[ x ] with x = 0..5 is derived as follows:

| | |
|---|---|
| candModeList[ 0 ] = INTRA_PLANAR | (8-26) |
| candModeList[ 1 ] = candIntraPredModeA | (8-27) |
| candModeList[ 2 ] = candIntraPredModeB | |
| candModeList[ 3 ] = INTRA_DC | (8-29) |

- If maxAB − minAB is in the range of 2 to 62, inclusive, the following applies:

| | |
|---|---|
| candModeList[ 4 ] = 2 + ( ( maxAB + 61 ) % 64 ) | (8-30) |
| candModeList[ 5 ] = 2 + ( ( maxAB − 1 ) % 64 ) | (8-31) |

- Otherwise, the following applies:

| | |
|---|---|
| candModeList[ 4 ] = 2 + ( ( maxAB + 60 ) % 64 ) | (8-32) |
| candModeList[ 5 ] = 2 + ( ( maxAB ) % 64 ) | (8-33) |

-Otherwise (candIntraPredModeA or candIntraPredModeB is greater than INTRA_DC), candModeList[ x ] with x = 0..5 is derived as follows:

| | |
|---|---|
| candModeList[ 0 ] = INTRA_PLANAR | (8-64) |
| candModeList[ 1 ] = maxAB | (8-65) |
| candModeList[ 2 ] = INTRA_IDC | (8-66) |
| candModeList[ 3 ] = 2 + ( ( maxAB + 61 ) % 64 ) | (8-66) |
| candModeList[ 4 ] = 2 + ( ( maxAB − 1 ) % 64 ) | (8-67) |
| candModeList[ 5 ] = 2 + ( ( maxAB + 60 ) % 64 ) | (8-68) |

-Otherwise, the following applies:

| | |
|---|---|
| candModeList[ 0 ] = INTRA_PLANAR | (8-70) |
| candModeList[ 1 ] = INTRA_DC (8-71) | |

TABLE 8

| | |
|---|---|
| candModeList[ 2 ] = INTRA_ANGULAR50 | (8-72) |
| candModeList[ 3 ] = INTRA_ANGULAR18 | (8-73) |
| candModeList[ 4 ] = INTRA_ANGULAR46 | (8-74) |
| candModeList[ 5 ] = INTRA_ANGULAR54 | (8-75) |
| (8-81) | |

3.   IntraPredModeY[ xCb ][ yCb ] is derived by applying the following procedure:
- If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].
- Otherwise, IntraPredModeY[ xCb ][ yCb ] is derived by applying the following ordered steps:
  1. When candModeList[ i ] is greater than candModeList[ j ] for i = 0..4 and for each i, j = ( i + 1 )..5, both values are swapped as follows:
    ( candModeList[ i ], candModeList[ j ] ) = Swap( candModeList[ i ], candModeList[ j ] )   (8-94)
  2. IntraPredModeY[ xCb ][ yCb ] is derived by the following ordered steps:
    i. IntraPredModeY[ xCb ][ yCb ] is set equal to intra_luma_mpm_remainder[ xCb ][ yCb ].
    ii. For i equal to 0 to 5, inclusive, when IntraPredModeY[ xCb ][ yCb ] is greater than or equal to candModeList[ i ], the value of IntraPredModeY[ xCb ][ yCb ] is incremented by one.

The variable IntraPredModeY[ x ][ y ] with x = xCb..xCb + cbWidth − 1 and y = yCb..yCb + cbHeight − 1 is set to be equal to IntraPredModeY[ xCb ][ yCb ].

Tables 6 to 8 may be examples shown in one continuous standard format.

On the other hand, if intra prediction according to the intra prediction mode of the current block is expressed in a standard format, it may be as shown in the following table.

TABLE 9

8.4.4.2.1 of VVC spec

The intra sample prediction process according to predModeIntra applies as follows:
- If predModeIntra is equal to INTRA_PLANAR, the corresponding intra prediction mode process specified in clause 8.4.4.2.5 is invoked with the transform block width nTbW, and the transform block height nTbH, the intra prediction reference line index refIdx, and the reference sample array p as inputs, and the output is the predicted sample array predSamples.

TABLE 9-continued

8.4.4.2.1 of VVC spec

- Otherwise, if predModeIntra is equal to INTRA_DC, the corresponding intra prediction mode process specified in clause 8.4.4.2.6 is invoked with the transform block width nTbW, the transform block height nTbH, the intra prediction reference line index refIdx, and the reference sample array p as inputs, and the output is the predicted sample array predSamples.
- Otherwise, if predModeIntra is equal to INTRA_LT_CCLM, INTRA_L_CCLM or INTRA_T_CCLM, the corresponding intra prediction mode process specified in clause 8.4.4.2.8 is invoked with the intra prediction mode predModeIntra, the sample location ( xTbC, yTbC ) set equal to ( xTbCmp, yTbCmp ), the transform block width nTbW and height nTbH, and the reference sample array p as inputs, and the output is the predicted sample array predSamples.
- Otherwise, the corresponding intra prediction mode process specified in clause 8.4.4.2.7 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the colour component index cIdx, and the reference sample array p as inputs, and the modified intra prediction mode predModeIntra and the predicted sample array predSamples as outputs.

In addition, in the above-described document, an embodiment of the planar intra prediction mode-based intra prediction performed when the MRL is applied is shown in the following table in a standard format.

TABLE 10

8.4.4.2.5 of VVC spec
Specification of INTRA_PLANAR intra prediction mode Inputs to this process are:
- a variable nTbW specifying the transform block width,
- a variable nTbH specifying the transform block height,
- a variable refIdx specifying the intra prediction reference line index,
- the neighbouring samples p[ x ][ y ], with x = −1−refIdx, y = −1−refIdx..nTbH and x = −refIdx..nTbW, y = −1−refIdx.

Outputs of this process are the predicted samples predSamples[ x ][ y ], with x= 0..nTbW − 1, y = 0..nTbH − 1.
The variables nW and nH are derived as follows:
nW = Max( nTbW, 2 )             (8-116)
nH = Max( nTbH, 2 )             (8-117)
The values of the prediction samples predSamples[ x ][ y ], with x = 0..nTbW − 1 and y = 0..nTbH − 1, are derived as follows:predV[ x ][ y ] = ( ( nH − 1 − y ) * p[ x ][ −1 −refIdx] + ( y + 1 ) * p[ −1−refIdx][ nTbH ] ) << Log2 ( nW )       (8-118)
predH[ x ][ y ] = ( ( nW − 1 − x ) * p[ −1− refIdx ][ y ] + ( x + 1 ) * p[ nTbW ][ −1−refIdx ] ) << Log2 ( nH )              (8-119)
predSamples[ x ][ y ] = ( predV[ x ][ y ] + predH[ x ][ y ] + nW * nH ) >> (Log2 ( nW ) + Log2 ( nH ) + 1 )              (8-120)

In addition, in the above-described document, an embodiment of DC intra prediction mode-based intra prediction performed when the MRL is applied is shown in the following table in a standard format.

TABLE 11

8.4.4.2.6 of VVC spec
Specification of INTRADC intra prediction mode

Inputs to this process are:
- a variable nTbW specifying the transform block width,
- a variable nTbH specifying the transform block height,
- a variable refIdx specifying the intra prediction reference line index,
- the neighbouring samples p[x][y], with x = −1−refIdx, y = −1−refIdx..nTbH − 1 and x = −refIdx..nTbW − 1, y = −1−refIdx.

Outputs of this process are the predicted samples predSamples[ x ][ y ], with x = 0..nTbW − 1, y = 0..nTbH − 1.
The values of the prediction samples predSamples[ x ][ y ], withx = 0..nTbW − 1, y = 0..nTbH − 1, are derived by the following ordered steps:
1.  A variable dcVal is derived as follows:
    - When nTbW is equal to nTbH:
        dcVal = ($\Sigma_{x'=0}^{nTbW-1}$ p[x'][−1 − refIdx] + $\Sigma_{y'=0}^{nTbH-1}$ p[−1 − refIdx][y'] + nTbw) >> (Log2(nTbW) + 1)
        (8-121)

TABLE 11-continued

8.4.4.2.6 of VVC spec
Specification of INTRADC intra prediction mode

- When nTbW is greater than nTbH:
  dcVal = ($\Sigma_{x'=0}^{nTbW-1}$ p[x'][−1 − refIdx] + (nTbW >> 1)) >> Log2(nTbW)  (8-122)
- When nTbW is less than nTbH:
  dcVal = ($\Sigma_{y'=0}^{nTbH-1}$ p[−1 − refIdx][y'] + (nTbH >> 1)) >> Log2(nTbH)  (8-123)

2. The prediction samples predSamples[x][y] are derived as follows:
   predSamples[ x ][ y ] = dcVal, with x = 0.. nTbW − 1, y = 0.. nTbH − 1  (8-124)

In addition, a horizontal transform kernel and a vertical transform kernel derived according to the intra prediction mode may be as follows.

TABLE 12

8.7.4.1 of VVC spec
Table 8-15 - Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbH >= 4 && nTbH <= 16 ) ? 1 : 0 |
| INTRA_DC, INTRA_ANGULAR33, INTRA_ANGULAR35 | 0 | 0 |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5, . . . , INTRA_ANGULAR27, | 0 | ( nTbH >= 4 && nTbH <= 16 ) ? 1 : 0 |
| INTRA_ANGULAR29, INTRA_ANGULAR38, INTRA_ANGULAR40, . . . , INTRA_ANGULAR64, INTRA_ANGULAR66 | | |

For example, when the intra prediction mode of the current block is determined to be the DC intra prediction mode, DCT2 may be used as a vertical transform kernel and DCT2 may be used as the horizontal transform kernel for transform/inverse transform of the residual of the current block.

Meanwhile, according to this document, a first bin among bins of the bin string of the syntax element of the MPM index may be subjected to context-based regular coding, and the remaining bins of the bin string may be bypassed.

In this case, the context index increment ctxInc for indicating the context model of the first bin may be set differently based on at least one of the value of the ISP flag for the current block and/or the value of the reference line index for the current block, as follows.

TABLE 13

9.5.4.2.1 of VVC spec
Table 9-15 - Assignment of ctxInc to syntax elements with context coded bins

| Syntax element | binIdx | | | | | |
|---|---|---|---|---|---|---|
| | 0 | 1 | 2 | 3 | 4 | >=5 |
| end_of_tile_one_bit | terminate | na | na | na | na | na |
| alf_ctb_flag[ ][ ][ ] | 0 . . . 8 (clause 9.5.4.2.2) | na | na | na | na | na |
| sao_mergejeft_flag | 0 | na | na | na | na | na |
| sao_merge_up_flag | 0 | na | na | na | na | na |
| sao_type_idx_luma | 0 | bypass | na | na | na | na |
| sao_type_idx_chroma | 0 | bypass | na | na | na | na |
| sao_offset_abs[ ][ ][ ][ ] | bypass | bypass | bypass | bypass | bypass | na |
| sao_offset_sign[ ][ ][ ][ ] | bypass | na | na | na | na | na |
| sao_band_position[ ][ ][ ] | bypass | bypass | bypass | bypass | bypass | bypass |
| sao_eo_class_luma | bypass | bypass | na | na | na | na |
| sao_eo_class_chroma | bypass | bypass | na | na | na | na |
| split_cu_flag | 0 . . . 8 (clause 9.5.4.2.2) | na | na | na | na | na |
| split_qt_flag | 0 . . . 5 (clause 9.5.4.2.2) | na | na | na | na | na |
| mtt_split_cu_vertical_flag | 0 . . . 4 (clause 9.5.4.2.3) | na | na | na | na | na |
| mtt_split_cu_binary_flag | ( 2 * mtt_split_cu_vertical_flag ) + ( mttDepth <= 1 ? 1 : 0 ) | na | na | na | na | na |
| cu_skip_flag[ ][ ] | 0, 1, 2 (clause 9.5.4.2.2) | na | na | na | na | na |

TABLE 13-continued 9.5.4.2.1 of VVC spec
Table 9-15 - Assignment of ctxInc to syntax elements with context coded bins

| | binIdx | | | | | |
|---|---|---|---|---|---|---|
| Syntax element | 0 | 1 | 2 | 3 | 4 | >=5 |
| pred_mode_flag | 0, 1 (clause 9.5.4.2.2) | na | na | na | na | na |
| pred_mode_ibc_flag | 0, 1, 2 (clause 9.5.4.2.2) | na | na | na | na | na |
| pcm_flag[ ][ ] | terminate | na | na | na | na | na |
| intra_luma_ref_idx[ ][ ] | 0 | 1 | na | na | na | na |
| intra_subpartitions_mode_flag | 0 | na | na | na | na | na |
| intra_subpartition_split_flag | 0 | na | na | na | na | na |
| intra_luma_mpm_flag[ ][ ] | 0 | na | na | na | na | na |
| intra_luma_mpm_idx[ ][ ] | intra_luma_ref_idx!=0 ? 2: (intra_subpartitions_mode_flag? 0: 1) | bypass | bypass | bypass | bypass | na |
| intra_luma_mpm_remainder[ ][ ] | bypass | bypass | bypass | bypass | bypass | bypass |
| intra_chroma_pred_mode[ ][ ] sps_cclm_enabled_flag == 0 | 0 | bypass | bypass | na | na | na |

For example, referring to Table 13, when the value of the reference line index is not 0, the ctxInc may be derived as 2, and when the value of the reference line index is 0, if the value of the ISP flag is 1, the ctxInc may be derived as 0, and if the value of the ISP flag is not 1, the ctxInc may be derived as 1.

Meanwhile, this document proposes another embodiment of more efficiently performing intra prediction performed based on the DC intra prediction mode when the MRL is applied.

Figure 13A:
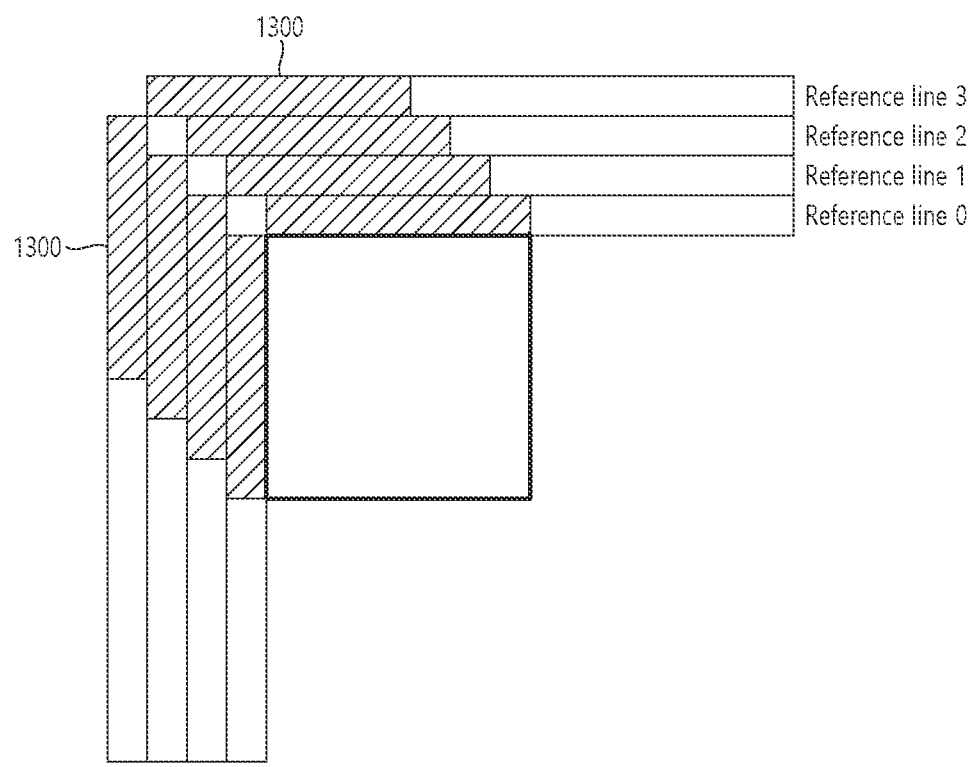
FIG. 13A and FIG. 13B exemplarily represent reference samples used for deriving a DC value in case which the intra prediction type of the current block is MRL and an intra prediction mode of the current block is a DC intra prediction mode.
Figure 13B:
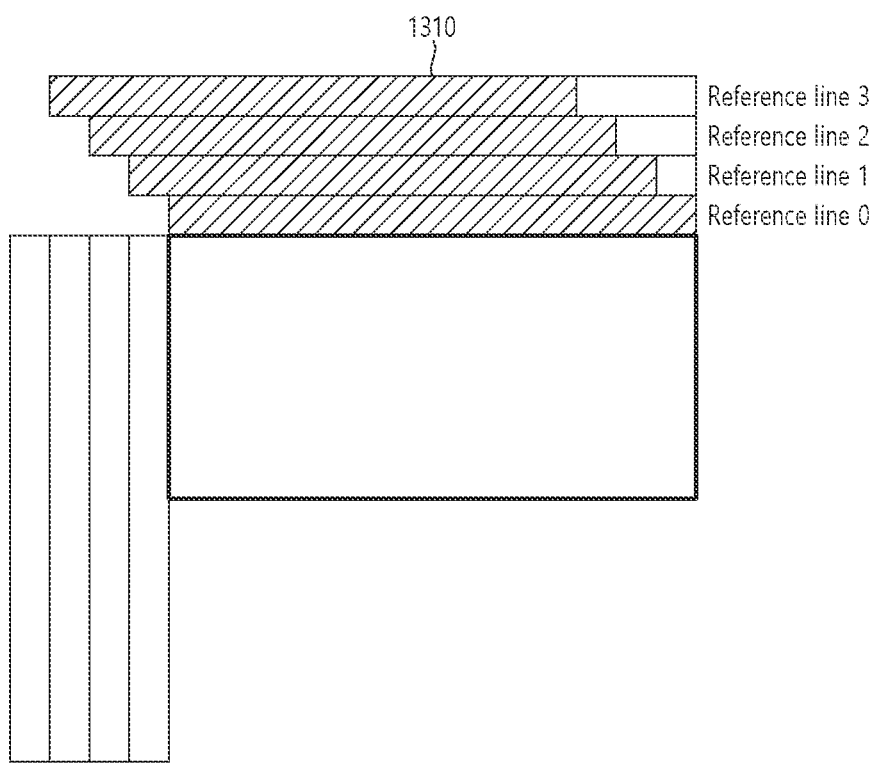

FIG. 13A and FIG. 13B exemplarily show reference samples used to derive a DC value when the intra prediction type of the current block is the MRL and the intra prediction mode of the current block is the DC intra prediction mode.

FIG. 13A may show reference samples used to derive a DC value when the current block is a square block. For example, if the reference line indicated by the reference line index is reference line 0, reference line 1, reference line 2, or reference line 3, the DC value may be derived based on reference samples in the area 1300 shown in FIG. 13B. That is, when the x component and the y component of the top-left position of the current block are 0, the DC value may be derived based on reference samples of which number is equal to a width and started from (−refIdx, −refIdx−1) in the top reference line of the current block and reference samples of which number is equal to a height and started from (−refIdx−1, −refIdx) in a left reference line of the current block. For example, when the value of the reference line index is 0, the DC value may be derived based on reference samples of which number is equal to the width and started from (0,−1) in the top reference line 0 of the current block and reference samples of which number is equal to the height and started from (−1, 0) in the left reference line 0 of the current block. When the value of the reference line index is 1, the DC value may be derived based on reference samples of which number is equal to the width and started from (−1, −2) in the top reference line 1 of the current block and reference samples of which number is equal to the height and started from (−2, −1) in the left reference line 1 of the current block. When the value of the reference line index is 2, the DC value may be derived based on reference samples of which number is equal to the width and started from (−2, −3) in the top reference line 2 of the current block and reference samples of which number is equal to the height and started from (−3, −2) in the left reference line 2 of the current block. When the value of the reference line index is 3, the DC value may be derived based on reference samples of which number is equal to the width and started from (−3, −4) in the top reference line 3 of the current block and reference samples of which number is equal to the height and started from (−4, −3) in the left reference line 3 of the current block.

Also, FIG. 13B may represent reference samples used to derive a DC value when the current block is a non-square block. In the present embodiment, when the current block is the non-square block, the DC value may be derived based on reference samples in a reference line of a longer one of a width and a height of the current block. For example, when the reference line pointed to by the reference line index is reference line 0, reference line 1, reference line 2, or reference line 3, the DC value may be derived based on reference samples in the area 1310 of the reference line on the longer side among the width and the height of the current block. For example, when the width of the current block is greater than the height, the DC value may be derived based on reference samples of which number is equal to the width and started from (−refIdx, −refIdx−1) in the top reference line of the current block. For example, when the value of the reference line index is 0, the DC value may be derived based on reference samples of which number is equal to the width and started (0, −1) in the top reference line 0 of the current block, when the value of the reference line index is 1, the DC value may be derived based on reference samples of which number is equal to the width and started from (−1, −2) in the top reference line 1 of the current block, when the value of the reference line index is 2, the DC value may be derived based on reference samples of which number is equal to the width and started from (−2, −3) in the top reference line 2 of the current block, and when the value of the reference line index is 3, the DC value may be derived based on reference samples of which number is equal to the width and started from (−3, −4) in the top reference line 3 of the current block.

Also, for example, when the width of the current block is smaller than the height, the DC value may be derived based on reference samples of which number is equal to the height and started from (−refIdx−1, −refIdx) in the left reference line of the current block. For example, when the value of the reference line index is 0, the DC value may be derived based on reference samples of which number is equal to the height and started from (−1, −0) in the left reference line 0 of the current block, when the value of the reference line index is 1, the DC value may be derived based on reference samples of which number is equal to the height and started from (−2, −1) in the left reference line 1 of the current block, when the value of the reference line index is 2, the DC value may be derived based on reference samples of which number is equal to the height and started from (−3, −2) in the left reference line 2 of the current block, and when the value of the reference line index is 3, the DC value may be derived based on reference samples of which number is equal to the height and started from (−4, −3) in the left reference line 3 of the current block.

Thereafter, the prediction sample of the current block may be derived as the DC value.

Meanwhile, this document proposes another embodiment of more efficiently performing intra prediction performed based on the planar intra prediction mode when the MRL is applied.

Figure 14:
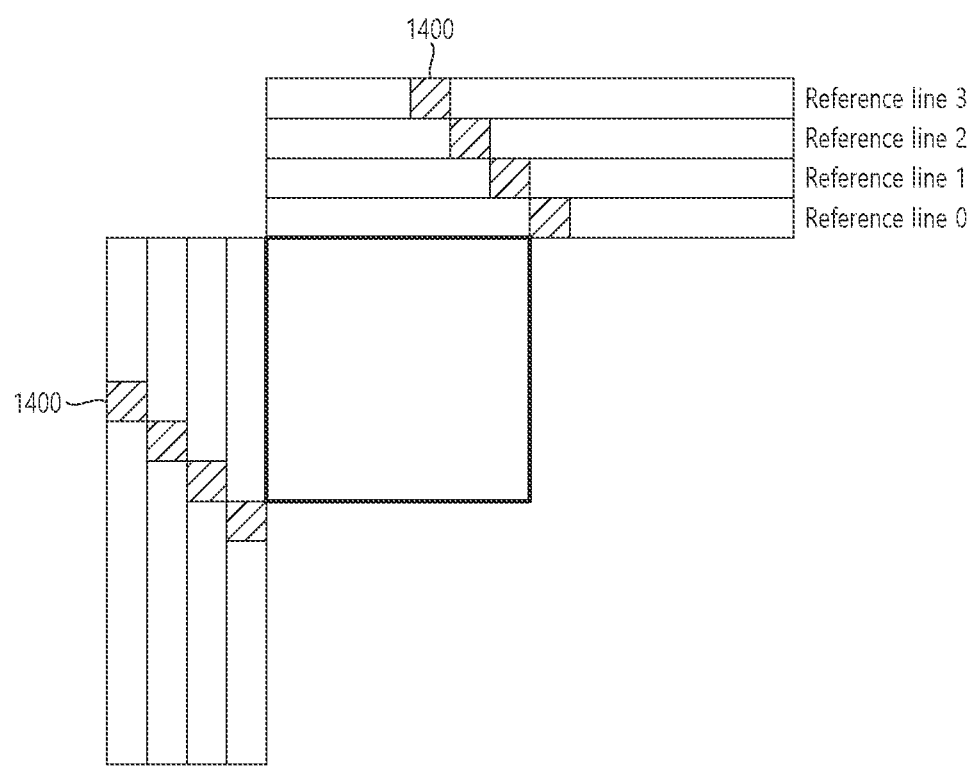
FIG. 14 exemplarily represents reference samples used in case which the intra prediction type of the current block is MRL and an intra prediction mode of the current block is a planar intra prediction mode.

FIG. 14 exemplarily shows reference samples used when the intra prediction type of the current block is the MRL and the intra prediction mode of the current block is the planar intra prediction mode.

Referring to FIG. 14, when the reference line indicated by the reference line index is the reference line 0, the reference line 1, the reference line 2, or the reference line 3, the planar prediction may be performed based on reference samples in the area 1400 of the reference line shown in FIG. 14. According to the present embodiment, the planar prediction may be performed based on a sample of 'the end of the width/height of the current block' +1-refIdx, regardless of the reference line index. That is, according to the present embodiment, when the x component and the y component of the top-left position of the current block are 0, the intra prediction type of the current block is the MRL, and the intra prediction mode of the current block is the planar intra prediction mode, the planner prediction for the current block may be performed based on a reference sample of (W−refIdx, −refIdx−1) in the top reference line and a reference sample of (−refIdx−1, H−refIdx) in the left reference line.

Referring to this embodiment, the PLANAR intra prediction is performed using the reference samples of the reference line indicated by the reference line index, and the PLANAR intra prediction is performed based on the left reference sample in the same row (ie, the same y-coordinate) as the current sample position in the current block, the top reference sample in the same column (i.e., the same x-coordinate) as the current sample position, a reference sample at (W−refIdx, −refIdx−1) in the top reference line and a reference sample of (−refIdx−1, H−refIdx) in the left reference line among the reference samples of the reference line. In this case, the prediction sample value of the current sample may be derived by performing bidirectional linear interpolation based on the values of the above-described four reference samples. Here, the bidirectional linear interpolation may be performed on the assumption that the bottom left reference sample is located below the current sample and the top right reference sample is located at the right side of the current sample.

Meanwhile, an embodiment different from the embodiments of the MPM list generation method commonly used in the aforementioned general intra prediction, the MRL, and the ISP may be used. That is, this document proposes another example of a method for generating the MPM list commonly used in general intra prediction, the MRL, and the ISP. Another example of the method for generating the MPM list may be as shown in the following table.

TABLE 14

Generalized MPM configuration method (6 MPM)

leftIntraDir    : intra direction of left PU
aboveIntraDir : intra direction of above PU
1.  Default mode
    mpm[0] = PLANAR_IDX
    mpm[1] = DC_IDX
    mpm[2] = VER_IDX
    mpm[3] = HOR_IDX
    mpm[4] = VER_IDX−4
    mpm[5] = VER_IDX+4
2.  If two neighboring modes are same and two neighboring modes
    are greater than DC.
    mpm[0] = PLANAR_IDX
    mpm[1] = leftIntraDir
    mpm[2] = 2 + ( (leftIntraDir + 61) % 64)
    mpm[3] = 2 + ( (leftIntraDir − 1 ) % 64)
    mpm[4] = DC_IDX
    mpm[5] = 2 + ( (leftIntraDir + 60) % 64)
3.  If (leftIntraDir > DC_IDX) && (aboveIntraDir > DC_IDX)
    mpm[0] = PLANAR_IDX
    mpm[1] = leftIntraDir
    mpm[2] = aboveIntraDir
    mpm[3] = DC_IDX
    maxCandModeIdx = mpm[1] > mpm[2] ? 1 : 2;
    minCandModeidx = mpm[1] > mpm[2] ? 2 : 1;
        if ((mpm[maxCandModeIdx] − mpm[minCandModeidx] < 63)
        && (mpm[maxCandModeIdx] − mpm[minCandModeidx] > 1))
    mpm[4] = 2 + ( (maxAB + 61) % 64)
        mpm[5] = 2 + ( (maxAB − 1 ) % 64)
    otherwise
        mpm[4] = 2 + ( (maxAB + 60) % 64)
        mpm[5] = 2 + ( maxAB % 64)
4.  If leftIntraDir + aboveIntraDir >= 2.
    mpm[0] = PLANAR_IDX
    mpm[1] = (leftIntraDir < aboveIntraDir) ?
    aboveIntraDir : leftIntraDir;
    mpm[2] = DC_IDX
    mpm[3] = 2 + ( (maxAB + 61) % 64)
    mpm[4] = 2 + ( (maxAB − 1 ) % 64)
    mpm[5] = 2 + ( (maxAB + 60) % 64)

According to an example of the MPM list generating method shown in Table 14, the encoding apparatus/decoding apparatus may derive the intra prediction mode of the left neighboring block and the intra prediction mode of the top neighboring block of the current block. The intra prediction mode of the left neighboring block may be expressed as leftIntraDir, and the intra prediction mode of the top neighboring block may be expressed as aboveIntraDir.

For example, when generating the MPM list, the intra mode of the neighboring CIIP may not be referenced. In other words, when configuring the MPM list, as described above, the intra prediction mode for the neighboring block (the left neighboring block or the top neighboring block) is derived, and the intra prediction mode (leftIntraDir or aboveIntraDir) can be used as a candidate mode of the MPM list. However, when the neighboring block is coded with CIIP, the neighboring block is coded in the intra prediction mode, but the intra prediction mode does not indicate the direction/trend of the image, but rather performs a role for smoothing the inter prediction result. That is, the intra prediction mode of the CIIP-coded neighboring block may have low correlation with the intra prediction mode of the non-CIIP block. Therefore, according to this embodiment, the intra prediction mode of the neighboring block coded with CIIP is not derived as a candidate mode for configuring the MPM list, and for the CIIP-coded neighboring block, a predefined specific mode (the planar mode or the DC mode) may be used as a candidate mode for configuring the MPM list of the current block instead of the intra prediction mode of the neighboring block.

Also, for example, the encoding apparatus/decoding apparatus may derive a default MPM list. For example, the encoding apparatus/decoding apparatus may derive MPM candidate 0 of the default MPM list as the planar intra prediction mode, MPM candidate 1 as the DC intra prediction mode, MPM candidate 2 as the vertical intra prediction mode, MPM candidate 3 as the horizontal intra prediction mode, MPM candidate 4 as the intra prediction mode of the mode number obtained by subtracting 4 from the mode number of the vertical intra prediction mode, that is, intra prediction mode No. 46, and MPM candidate 5 as the intra prediction mode of the mode number obtained by adding 4 to the mode number of the vertical intra prediction mode, that is, the intra prediction mode No. 54.

Thereafter, the encoding apparatus/decoding apparatus may determine whether the intra prediction mode of the left neighboring block and the intra prediction mode of the top neighboring block of the current block are the same and the mode number of the intra prediction mode of the left neighboring block is greater than the mode number of the DC intra prediction mode.

For example, when the intra prediction mode of the left neighboring block and the intra prediction mode of the top neighboring block are the same, and the mode number of the intra prediction mode of the left neighboring block is greater than the mode number of the DC intra prediction mode, the encoding apparatus/decoding apparatus may derive the MPM list of the current block including the derived MPM candidates 0 to 5 as described below.

mpm[0]=PLANAR_IDX
mpm[1]=leftIntraDir
mpm[2]=2+((leftIntraDir+61) % 64)
mpm[3]=2+((leftIntraDir−1) % 64)
mpm[4]=DC_IDX
mpm[5]=2+((leftIntraDir+60) % 64)

That is, MPM candidate 0 of the MPM list may be derived in the planar intra prediction mode, and MPM candidate 1 of the MPM list may be derived as the intra prediction mode of the left neighboring block, the MPM candidate 2 of the MPM list may be derived as an intra prediction mode having a mode number of 2+((leftIntraDir+61) % 64), that is, the intra prediction mode with the mode number of a value obtained by adding 61 to the mode number of the intra prediction mode of the left neighboring block, calculating modular arithmetic by 64 and adding 2, the MPM candidate 3 of the MPM list may be derived as an intra prediction mode having a mode number of 2+((leftIntraDir−1) % 64), that is, the intra prediction mode with the mode number of a value obtained by subtracting 1 from the mode number of the intra prediction mode of the left neighboring block, calculating modular arithmetic by 64 and adding 2, the MPM candidate 4 of the MPM list may be derived as the DC intra prediction mode, and the MPM candidate 5 of the MPM list may be derived as an intra prediction mode with a mode number of 2+((leftIntraDir+60) % 64), that is, the intra prediction mode with the mode number of a value obtained by adding 60 to the mode number of the intra prediction mode of the left neighboring block, calculating modular arithmetic by 64 and adding 2.

On the other hand, when the intra prediction mode of the left neighboring block of the current block and the intra prediction mode of the top neighboring block are not the same, the encoding apparatus/decoding apparatus determines whether the mode number of the intra prediction mode of the left neighboring block is greater than the mode number of the DC intra prediction mode, and the mode number of the intra prediction mode of the top neighboring block is greater than the mode number of the DC intra prediction mode.

When the mode number of the intra prediction mode of the left neighboring block is greater than the mode number of the DC intra prediction mode and the mode number of the intra prediction mode of the top neighboring block is greater than the mode number of the DC intra prediction mode, the encoding apparatus/decoding apparatus may derive the planar intra prediction mode as MPM candidate 0 of the MPM list, may derive the intra prediction mode of the left neighboring block as MPM candidate 1 of the MPM list, may derive the intra prediction mode of the top neighboring block as MPM candidate 2 of the MPM list, and may derive the DC intra prediction mode as MPM candidate 3 of the MPM list. In addition, the encoding apparatus/decoding apparatus may derive maxCandModeIdx as 1 when the mode number of the MPM candidate 1 is greater than the mode number of the MPM candidate 2, and may derive maxCandModeIdx as 2 when the mode number of the MPM candidate 1 is not greater than the mode number of the MPM candidate 2. In addition, the encoding apparatus/decoding apparatus may derive minCandModeIdx as 2 when the mode number of the MPM candidate 1 is greater than the mode number of the MPM candidate 2, and may derive minCandModeIdx as 1 when the mode number of the MPM candidate 1 is not greater than the mode number of the MPM candidate 2.

Then, if the value obtained by subtracting the mode number of mpm[minCandModeidx] from the mode number of mpm[maxCandModeIdx] is less than 63 and greater than 1, the encoding apparatus/decoding apparatus may derive an intra prediction mode with a mode number of 2+ ((maxAB+61) % 64) as the MPM candidate 4 of the MPM list, an intra prediction mode with a mode number of 2+((maxAB−1) % 64) as the MPM candidate 5 of the MPM list. Here, if the maxCandModeIdx is 1, then mpm[maxCandModeIdx] may be MPM candidate 1, if the maxCandModeIdx is 2, then mpm[maxCandModeIdx] may be MPM candidate 2, if the minCandModeidx is 1, then mpm[minCandModeidx] may be MPM candidate 1, if the minCandModeidx is 2, then [minCandModeidx] may be MPM candidate 2. Also, here, maxAB may be a greater value of the mode number of the intra prediction mode of the left neighboring block and the mode number of the intra prediction mode of the top neighboring block.

Alternatively, if the value obtained by subtracting the mode number of mpm[minCandModeidx] from the mode number of mpm[maxCandModeIdx] is greater than or equal to 63 or less than or equal to 1, the encoding apparatus/decoding apparatus may derive an intra prediction mode with a mode number of 2+((maxAB+60) % 64) as the MPM candidate 4 of the MPM list, and an intra prediction mode with a mode number of 2+(maxAB % 64) as the MPM candidate 5 of the MPM list.

Meanwhile, when the intra prediction mode of the left neighboring block and the intra prediction mode of the top neighboring block of the current block are not the same or when at least one of the mode numbers of the intra prediction mode of the left neighboring block and the intra prediction mode of the top neighboring block is smaller than the mode number of the DC intra prediction mode, the encoding apparatus/decoding apparatus may determine whether the sum of the mode number of the intra prediction mode of the left neighboring block and the mode number of the intra prediction mode of the top neighboring block is equal to or greater than the mode number of the DC intra prediction mode.

When the sum of the mode number of the intra prediction mode of the left neighboring block and the mode number of the intra prediction mode of the top neighboring block is equal to or greater than the mode number of the DC intra prediction mode, the encoding apparatus/decoding apparatus may derive the MPM list of the current block including the derived MPM candidates 0 to 5 as described below.

mpm[0]=PLANAR_IDX
mpm[1]=(leftIntraDir<aboveIntraDir)? aboveIntraDir: leftIntraDir
mpm[2]=DC_IDX
mpm[3]=2+((maxAB+61) % 64)
mpm[4]=2+((maxAB−1) % 64)
mpm[5]=2+((maxAB+60) % 64)

That is, MPM candidate 0 of the MPM list may be derived as the planar intra prediction mode, and MPM candidate 1 may be derived as the intra prediction mode of the top neighboring block when the mode number of the intra prediction mode of the left neighboring block is smaller than the mode number of the intra prediction mode of the top neighboring block and may be derived as the intra prediction mode of the left neighboring block when the mode number of the intra prediction mode of the left neighboring block is greater than or equal to the mode number of the intra prediction mode of the top neighboring block. The MPM candidate 2 of the MPM list may be derived as the DC intra prediction mode. The MPM candidate 3 of the MPM list may be derived as an intra prediction mode with a mode number of 2+((maxAB+61) % 64), that is, the intra prediction mode with the mode number of a value obtained by adding 61 to the larger value of the mode number of the intra-prediction mode of the left neighboring block and the mode number of the intra-prediction mode of the top neighboring block, calculating modular arithmetic by 64 and adding 2. The MPM candidate 4 of the MPM list may be derived as an intra prediction mode with a mode number of 2+((maxAB−1) % 64), that is, the intra prediction mode with the mode number of a value obtained by substracting 1 from the larger value of the mode number of the intra-prediction mode of the left neighboring block and the mode number of the intra-prediction mode of the top neighboring block, calculating modular arithmetic by 64 and adding 2. The MPM candidate 5 of the MPM list may be derived as an intra prediction mode with a mode number of 2+((maxAB+60) % 64), that is, the intra prediction mode with the mode number of a value obtained by adding 60 to the larger value of the mode number of the intra-prediction mode of the left neighboring block and the mode number of the intra-prediction mode of the top neighboring block, calculating modular arithmetic by 64 and adding 2.

On the other hand, if the above-described embodiment of the MPM list generation method is shown as a source code, it may be as shown in the following table.

TABLE 15

Generalized MPM configuration method
I (6 MPM) source code version

```
const int numMPMs = NUM_MOST_PROBABLE_MODES;
int numCand =     −1;
int leftIntraDir = PLANAR_IDX, aboveIntraDir = PLANAR_IDX;
const CompArea &area =
pu.block(getFirstComponentOfChannel(channelType));
const Postion posRT = area.topRight( );
const Postion posLB = area.bottomLeft( );
        // Get intra direction of left PU
const PredictionUnit +puLeft =
pu.cs->getPURestricted(posLB.offset(−1, 0), pu, channelType);
if (puLeft && CU::IsIntra(+puLeft->cu))
{
        leftIntraDir = puLeft->IntraDir[channelType];
}
// Get intra direction of above PU
const PredictionUnit +puAbove =
pu.cs->getPURestricted(posRT.offset(0, −1), pu, channelType);
if (puAbove && CU::IsIntra(+puAbove->cu) &&
CU::IsSameCtu(+pu.cu, puAbove-cu))
{
    aboveIntraDir = puAbove->IntraDir[channelType];
}
const int offset = (int)NUM_LUMA_MODE − 6;
const int mod = offset + 3;
mpm[0] = PLANAR_IDX;
mpm[1] = DC_IDX;
mpm[2] = VER_IDX;
mpm[3] = HOR_IDX;
mpm[4] = VER_IDX − 4;
mpm[5] = VER_IDX + 4;
if (leftIntraDir == aboveIntraDir)
{
    numCand = 1;
    if (leftIntraDir > DC_IDX)
    {
        mpm[0] = PLANAR_IDX;
        mpm[1] = leftIntraDir;
        mpm[2] = ((leftIntraDir + offset) % mod) + 2;
        mpm[3] = ((leftIntraDir − 1) % mod) + 2;
        mpm[4] = DC_IDX;
        mpm[5] = ((leftIntraDir + offset − 1) % mod) + 2;
    }
}
else //L1=A
{
    numCand = 2;
    int maxCandModeIdx = mpm[0] > mpm[1] ? 0 : 1;
    if ((leftIntraDir > DC_IDX) && (aboveIntraDir > DC_IDX))
```

TABLE 16

```
{
    mpm[0] = PLANAR_IDX;
    mpm[1] = left IntraDir;
    mpm[2] = aboveIntraDir;
    maxCandModeIdx = mpm[1] > mpm[2] ? 1 : 2;
    int minCandModeidx = mpm[1] > mpm[2] ? 2 : 1;
    mpm[3] = DC_IDX;
    if ((mpm[maxCandModeIdx] − mpm[minCandModeidx] < 63) && (mpm[maxCandModeIdx] −
mpm[minCandModeidx] >1))
    {
        mpm[4] = ((mpm[maxCandModeIdx] + offset) % mod) + 2;
        mpm[5] = ((mpm[maxCandModeIdx] − 1) % mod) + 2;
    }
```

TABLE 16-continued

```
            else
            {
                mpm[4] = ((mpm[maxCandModeIdx] + offset - 1) % mod) + 2;
                mpm[5] = ((mpm[maxCandModeIdx]) % mod) + 2;
            }
        }
        else if (leftIntraDir + aboveIntraDir >= 2)
        {
            mpm[0] = PLANAR_IDX;
            mpm[1] = (leftIntraDir < aboveIntraDir) ? aboveIntraDir : leftIntraDir;
            maxCandModeIdx = 1;
            mpm[2] = DC_IDX;
            mpm[3] = ((mpm[maxCandModeIdx] + offset) % mod) + 2;
            mpm[4] = ((mpm[maxCandModeIdx] - 1) % mod) + 2;
            mpm[5] = ((mpm[maxCandModeIdx] + offset - 1) % mod) + 2;
        }
    }
}
```

The above Tables 15 to 16 may be examples shown as one continuous source code.

In addition, if the above-described embodiment of the MPM list generation method is shown in a standard format, it may be as shown in the following table.

[Table 17]

| Generalized MPM Configuration Method 1 (6 MPM) spec version |
|---|
| 8.4.2 of VVC spec<br><br>Derivation process for luma intra prediction mode<br><br>Input to this process are:<br><br>– a luma location ( xCb , yCb ) specifying the top-left sample of the current luma coding block relative to the top-left luma sample of the current picture,<br><br>– a variable cbWidth specifying the width of the current coding block in luma samples,<br><br>– a variable cbHeight specifying the height of the current coding block in luma samples.<br><br>In this process, the luma intra prediction mode IntraPredModeY[ xCb ][ yCb ] is derived.<br><br>Table 8-1 specifies the value for the intra prediction mode IntraPredModeY[ xCb ][ yCb ] and the associated names.<br><br>Table 8-1 – Specification of intra prediction mode and associated names<br><br><table><tr><th>Intra prediction mode</th><th>Associated name</th></tr><tr><td>0</td><td>INTRA_PLANAR</td></tr><tr><td>1</td><td>INTRA_DC</td></tr><tr><td>2..66</td><td>INTRA_ANGULAR2..INTRA_ANGULAR66</td></tr><tr><td>81..83</td><td>INTRA_LT_CCLM, INTRA_L_CCLM, INTRA_T_CCLM</td></tr></table><br>NOTE – : The intra prediction modes INTRA_LT_CCLM, INTRA_L_CCLM and INTRA_T_CCLM are only applicable to chroma components.<br><br>IntraPredModeY[ xCb ][ yCb ] is derived by the following ordered steps:<br><br>2. The neighbouring locations ( xNbA, yNbA ) and ( xNbB, yNbB ) are set equal to ( xCb − 1, yCb + cbHeight − 1 ) and ( xCb + cbWidth − 1, yCb − 1 ), respectively.<br><br>3. For X being replaced by either A or B, the variables candIntraPredModeX are derived as follows:<br><br>    – The availability derivation process for a block as specified in clause 6.4.X [Ed. (BB): Neighbouring blocks availability checking process tbd] is invoked with the location ( xCurr, yCurr ) set equal to ( xCb, yCb ) and the neighbouring location ( xNbY, yNbY ) set equal to ( xNbX, yNbX ) as inputs, and the output is assigned to availableX.<br><br>    – The candidate intra prediction mode candIntraPredModeX is derived as follows:<br><br>        –If one or more of the following conditions are true, candIntraPredModeX is set equal to INTRA_PLANAR.<br><br>            – The variable availableX is equal to FALSE. |

- CuPredMode[ xNbX ][ yNbX ] is not equal to MODE_INTRA
- pcm_flag[ xNbX ][ yNbX ] is equal to 1.
- X is equal to B and yCb − 1 is less than ( ( yCb >> CtbLog2SizeY ) << CtbLog2SizeY ).

—Otherwise, candIntraPredModeX is set equal to IntraPredModeY[ xNbX ][ yNbX ].

4. The candModeList[ x ] with x = 0..5 is derived as follows:

–If candIntraPredModeB is equal to candIntraPredModeA and candIntraPredModeA is greater than INTRA_DC, candModeList[ x ] with x = 0..5 is derived as follows:

candModeList[ 0 ] = INTRA_PLANAR (8-9)

candModeList[ 1 ] = candIntraPredModeA (8-10)

TABLE 18

| | |
|---|---|
| candModeList[ 2 ] = 2 + ( ( candIntraPredModeA + 61 ) % 64 ) | (8-12) |
| candModeList[ 3 ] = 2 + ( ( candIntraPredModeA − 1 ) % 64 ) | (8-13) |
| candModeList[ 4 ] = INTRA_DC | (8-11) |
| candModeList[ 5 ] = 2 + ( ( candIntraPredModeA + 60 ) % 64 ) | (8-14) |

-Otherwise if candIntraPredModeB is not equal to candIntraPredModeA and candIntraPredModeA or candIntraPredModeB is greater than INTRA_DC, the following applies:
 -The variables minAB and maxAB are derived as follows:

| | |
|---|---|
| minAB = Min( candIntraPredModeA, candIntraPredModeB ) | (8-24) |
| maxAB = Max( candIntraPredModeA, candIntraPredModeB ) | (8-25) |

-If candIntraPredModeA and candIntraPredModeB are both greater than INTRA_DC, candModeList[ x ] with x = 0..5 is derived as follows:

| | |
|---|---|
| candModeList[ 0 ] = INTRA_PLANAR | (8-26) |
| candModeList[ 1 ] = candIntraPredModeA | (8-27) |
| candModeList[ 2 ] = candIntraPredModeB | |
| candModeList[ 3 ] = INTRA_DC | (8-29) |

- If maxAB − minAB is in the range of 2 to 62, inclusive, the following applies:

| | |
|---|---|
| candModeList[ 4 ] = 2 + ( ( maxAB + 61 ) % 64 ) | (8-30) |
| candModeList[ 5 ] = 2 + ( ( maxAB − 1 ) % 64 ) | (8-31) |

- Otherwise, the following applies:

| | |
|---|---|
| candModeList[ 4 ] = 2 + ( ( maxAB + 60 ) % 64 ) | (8-32) |
| candModeList[ 5 ] = 2 + ( ( maxAB ) % 64 ) | (8-33) |

-Otherwise (candIntraPredModeA or candIntraPredModeB is greater than INTRA_DC), candModeList[ x ] with x = 0..5 is derived as follows:

| | |
|---|---|
| candModeList[ 0 ] = INTRA_PLANAR | (8-64) |
| candModeList[ 1 ] = maxAB | (8-65) |
| candModeList[ 2 ] = INTRA_DC | (8-66) |
| candModeList[ 3 ] = 2 + ( ( maxAB + 61 ) % 64 ) | (8-66) |
| candModeList[ 4 ] = 2 + ( ( maxAB − 1 ) % 64 ) | (8-67) |
| candModeList[ 5 ] = 2 + ( ( maxAB + 60 ) % 64 ) | (8-68) |

-Otherwise, the following applies:

| | |
|---|---|
| candModeList[ 0 ] = INTRA_PLANAR | (8-70) |
| candModeList[ 1 ] = INTRA_DC | (8-71) |

TABLE 19

| | |
|---|---|
| candModeList[ 2 ] = INTRA_ANGULAR50 | (8-72) |
| candModeList[ 3 ] = INTRA_ANGULAR18 | (8-73) |
| candModeList[ 4 ] = INTRA_ANGULAR46 | (8-74) |
| candModeList[ 5 ] = INTRA_ANGULAR54 | (8-75) |
| | (8-81) |

5. IntraPredModeY[ xCb ][ yCb ] is derived by applying the following procedure:
 - If intra_luma_mpm_flag[ xCb ][ yCb ] is equal to 1, the IntraPredModeY[ xCb ][ yCb ] is set equal to candModeList[ intra_luma_mpm_idx[ xCb ][ yCb ] ].
 - Otherwise, IntraPredModeY[ xCb ][ yCb ] is derived by applying the following ordered steps:
  3. When candModeList[ i ] is greater than candModeList[ j ] for i = 0..4 and for each i, j = ( i + 1 )..5, both values are swapped as follows:
   ( candModeList[ i ], candModeList[ j ] ) = Swap( candModeList[ i ], candModeList[ j ] )   (8-94)
  4. IntraPredModeY[ xCb ][ yCb ] is derived by the following ordered steps:
   i. IntraPredModeY[ xCb ][ yCb ] is set equal to intra_luma_mpm_remainder[ xCb ][ yCb ].
   ii. For i equal to 0 to 5, inclusive, when IntraPredModeY[ xCb ][ yCb ] is greater than or equal to candModeList[ i ], the value of IntraPredModeY[ xCb ][ yCb ] is incremented by one.

The variable IntraPredModeY[ x ][ y ] with x = xCb..xCb + cbWidth − 1 and y = yCb..yCb + cbHeight − 1 is set to be equal to IntraPredModeY[ xCb ][ yCb ].

Tables 17 to 19 may be examples shown in one continuous standard format.

On the other hand, if intra prediction according to the intra prediction mode of the current block is expressed in a standard format, it may be as shown in the following table.

TABLE 20

8.4.4.2.1 of VVC spec

The intra sample prediction process according to predModeIntra applies as follows:
- If predModeIntra is equal to INTRA_PLANAR, the corresponding intra prediction mode process specified in clause 8.4.4.2.5 is invoked with the transform block width nTbW, and the transform block height nTbH, the intra prediction reference line index refIdx, and the reference sample array p as inputs, and the output is the predicted sample array predSamples.

| TABLE 20-continued |
|---|
| 8.4.4.2.1 of VVC spec |

- Otherwise, if predModeIntra is equal to INTRA_DC, the corresponding intra prediction mode process specified in clause 8.4.4.2.6 is invoked with the transform block width nTbW, the transform block height nTbH, the intra prediction reference line index refIdx, and the reference sample array p as inputs, and the output is the predicted sample array predSamples.
- Otherwise, if predModeIntra is equal to INTRA_LT_CCLM, INTRA_L_CCLM or INTRA_T_CCLM, the corresponding intra prediction mode process specified in clause 8.4.4.2.8 is invoked with the intra prediction mode predModeIntra, the sample location ( xTbC, yTbC ) set equal to ( xTbCmp, yTbCmp ), the transform block width nTbW and height nTbH, and the reference sample array p as inputs, and the output is the predicted sample array predSamples.
- Otherwise, the corresponding intra prediction mode process specified in clause 8.4.4.2.7 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the colour component index cIdx, and the reference sample array p as inputs, and the modified intra prediction mode predModeIntra and the predicted sample array predSamples as outputs.

In addition, in the above-described document, an embodiment of the planar intra prediction mode-based intra prediction performed when the MRL is applied is shown in the following table in a standard format.

| TABLE 21 |
|---|
| 8.4.4.2.5 of VVC spec |
| Specification of INTRA_PLANAR intra prediction mode |

Inputs to this process are:
- a variable nTbW specifying the transform block width,
- a variable nTbH specifying the transform block height,
- a variable refIdx specifying the intra prediction reference line index,
- the neighbouring samples p[ x ][ y ], with x = −1−refIdx, y = −1−refIdx..nTbH and
  x = −refIdx..nTbW, y = −1−refIdx.
Outputs of this process are the predicted samples predSamples[ x ][ y ], withx = 0..nTbW − 1,y = 0..nTbH − 1.
The variables nW and nH are derived as follows:
    nW = Max( nTbW, 2 )                              (8-116)
    nH = Max( nTbH, 2 )                              (8-117)
    The values of the prediction samples predSamples[ x ][ y ], with x = 0..nTbW − 1 and y = 0..nTbH − 1,
    are derived as follows:predV[ x ][ y ] = ( ( nH − 1 − y ) * p[ x ][ −1 − refIdx] + ( y + 1 ) * p[ −1−
    refIdx][ nTbH − refIdx] ) << Log2 ( nW )
    (8-118)
    predH[ x ][ y ] = (( nW − 1 − x ) * p[ −1− refIdx ][ y ] + ( x + 1 ) * p[ nTbW − refIdx ][ −1−
    refIdx ] ) << Log2 ( nH )                             (8-119)
    predSamples[ x ][ y ] = ( predV[ x ][ y ] + predHf x ][ y ] + nW * nH ) >> (Log2 ( nW ) + Log2 ( nH )
    + 1 )                                                 (8-120)

In addition, in the above-described document, an embodiment of DC intra prediction mode-based intra prediction performed when the MRL is applied is shown in the following table in a standard format.

| TABLE 22 |
|---|
| 8.4.4.2.6 of VVC spec |
| Specification of INTRA DC intra prediction mode |

Inputs to this process are:
        a variable nTbW specifying the transform block width.
-       a variable nTbH specifying the transform block height,
        a variable refIdx specifying the intra prediction reference line index,
-       the neighbouring samples p[x][y], with x = −1−refIdx, y = −1−refIdx..nTbH − 1 and
        x = −refIdx..nTbW − 1 , y = −1−refIdx.
Outputs of this process are the predicted samples predSamples[ x ][ y ], with x = 0..nTbW − 1,
y = 0..nTbH − 1.
The values of the prediction samples predSamples[ x ][ y ], with x = 0..nTbW − 1, y = 0..nTbH − 1, are derived
by the following ordered steps:
    1.    A variable dcVal is derived as follows:
-       When nTbW is equal to nTbH:
            dcVal = ($\Sigma_{x'=-refIdx}^{nTbW-1-refIdx}$p[x'][−1 − refIdx] + $\Sigma_{y'=-refIdx}^{nTbH-1-refIdx}$p[−1 − refIdx][y'] +
            nTbw) >> (Log2(nTbW) + 1)
            (8-121)

TABLE 22-continued 8.4.4.2.6 of VVC spec
Specification of INTRA DC intra prediction mode

- When nTbW is greater than nTbH:
  dcVal = $(\Sigma_{x'=-refIdx}^{nTbW-1-refIdx} p[x'][-1 - refIdx] + (nTbW \gg 1)) \gg Log2(nTbW)$ (8-122)
- When nTbW is less than nTbH:
  dcVal = $(\Sigma_{y'=-refIdx}^{nTbH-1-refIdx} p[-1 - refIdx][y'] + (nTbH \gg 1)) \gg Log2(nTbH)$ (8-123)
2. The prediction samples predSamples[x][y] are derived as follows:
   predSamples[ x ][ y ] = dcVal, with x = 0..nTbW − 1, y = 0..nTbH − 1 (8-124)

In addition, a horizontal transform kernel and a vertical transform kernel derived according to the intra prediction mode may be as follows.

TABLE 23

8.7.4.1 of VVC spec
Table 8-15 - Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbH >= 4 && nTbH <= 16 ) ? 1 : 0 |
| INTRA_DC, INTRA_ANGULAR33, INTRA_ANGULAR35 | 0 | 0 |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5, . . . , INTRA_ANGULAR27, | 0 | ( nTbH >= 4 && nTbH <= 16 ) ? 1 : 0 |
| INTRA_ANGULAR29, INTRA_ANGULAR38, INTRA_ANGULAR40, . . . , INTRA_ANGULAR64, INTRA_ANGULAR66 | | |

For example, when the intra prediction mode of the current block is determined to be the DC intra prediction mode, DCT2 may be used as a vertical transform kernel and DCT2 may be used as the horizontal transform kernel for transform/inverse transform of the residual of the current block.

Meanwhile, according to this document, a first bin among bins of the bin string of the syntax element of the MPM index may be subjected to context-based regular coding, and the remaining bins of the bin string may be bypassed.

In this case, the context index increment ctxInc for indicating the context model of the first bin may be set differently based on at least one of the value of the ISP flag for the current block and/or the value of the reference line index for the current block, as follows.

TABLE 24

9.5.4.2.1 of VVC spec
Table 9-15 - Assignment of ctxInc to syntax elements with context coded bins

| Syntax element | binIdx | | | | | |
|---|---|---|---|---|---|---|
| | 0 | 1 | 2 | 3 | 4 | >=5 |
| end_of_tile_one_bit | terminate | na | na | na | na | na |
| alf_ctb_flag[ ][ ][ ] | 0 . . . 8 (clause 9.5.4.2.2) | na | na | na | na | na |
| sao_merge_left_flag | 0 | na | na | na | na | na |
| sao_merge_up_flag | 0 | na | na | na | na | na |
| sao_type_idx_luma | 0 | bypass | na | na | na | na |
| sao_type_idx_chroma | 0 | bypass | na | na | na | na |
| sao_offset_abs[ ][ ][ ][ ] | bypass | bypass | bypass | bypass | bypass | na |
| sao_offset_sign[ ][ ][ ][ ] | bypass | na | na | na | na | na |
| sao_band_position[ ][ ][ ] | bypass | bypass | bypass | bypass | bypass | bypass |
| sao_eo_class_luma | bypass | bypass | na | na | na | na |
| sao_eo_class_chroma | bypass | bypass | na | na | na | na |
| split_cu_flag | 0 . . . 8 (clause 9.5.4.2.2) | na | na | na | na | na |
| split_qt_flag | 0 . . . 5 (clause 9.5.4.2.2) | na | na | na | na | na |
| mtt_split_cu_vertical_flag | 0 . . . 4 (clause 9.5.4.2.3) | na | na | na | na | na |
| mtt_split_cu_binary_flag | ( 2 * mtt_split_cu_vertical_flag ) + ( mttDepth < = 1 ? 1 : 0 ) | na | na | na | na | na |
| cu_skip_flag[ ][ ] | 0, 1, 2 (clause 9.5.4.2.2) | na | na | na | na | na |

TABLE 24-continued 9.5.4.2.1 of VVC spec
Table 9-15 - Assignment of ctxInc to syntax elements with context coded bins

| Syntax element | binIdx 0 | 1 | 2 | 3 | 4 | >=5 |
|---|---|---|---|---|---|---|
| pred_mode_flag | 0, 1 (clause 9.5.4.2.2) | na | na | na | na | na |
| pred_mode_ibc_flag | 0, 1, 2 (clause 9.5.4.2.2) | na | na | na | na | na |
| pcm-flag[ ][ ] | terminate | na | na | na | na | na |
| intra_luma_ref_idx[ ][ ] | 0 | 1 | na | na | na | na |
| intra_subpartitions_mode_flag | 0 | na | na | na | na | na |
| intra_subpartition_split_flag | 0 | na | na | na | na | na |
| intra_luma_mpm_flag[ ][ ] | 0 | na | na | na | na | na |
| intra_luma_mpm_idx[ ][ ] | intra_luma_ref_idx!=0 ? 2: (intra_subpartitions_mode_flag? 0: 1) | bypass | bypass | bypass | bypass | na |
| intra_luma_mpm_remainder[ ][ ] | bypass | bypass | bypass | bypass | bypass | bypass |
| intra_chroma_pred_mode[ ][ ] sps_cdm_enabled_flag == 0 | 0 | bypass | bypass | na | na | na |

For example, referring to Table 24, when the value of the reference line index is not 0, the ctxInc may be derived as 2, and when the value of the reference line index is 0, if the value of the ISP flag is 1, the ctxInc may be derived as 0, and if the value of the ISP flag is not 1, the ctxInc may be derived as 1.

Figure 15:
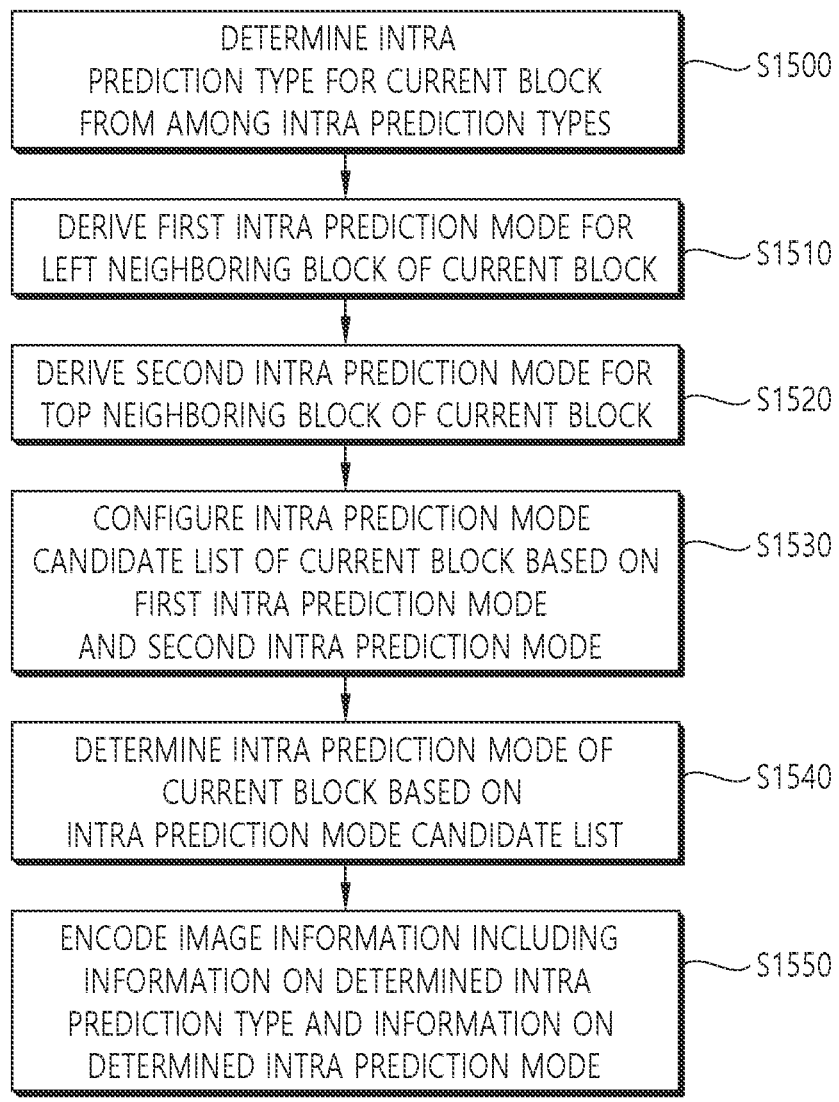
FIG. 15 and FIG. 16 schematically represent an example of a video/image encoding method and related components according to the embodiment(s) of this document.
Figure 16:
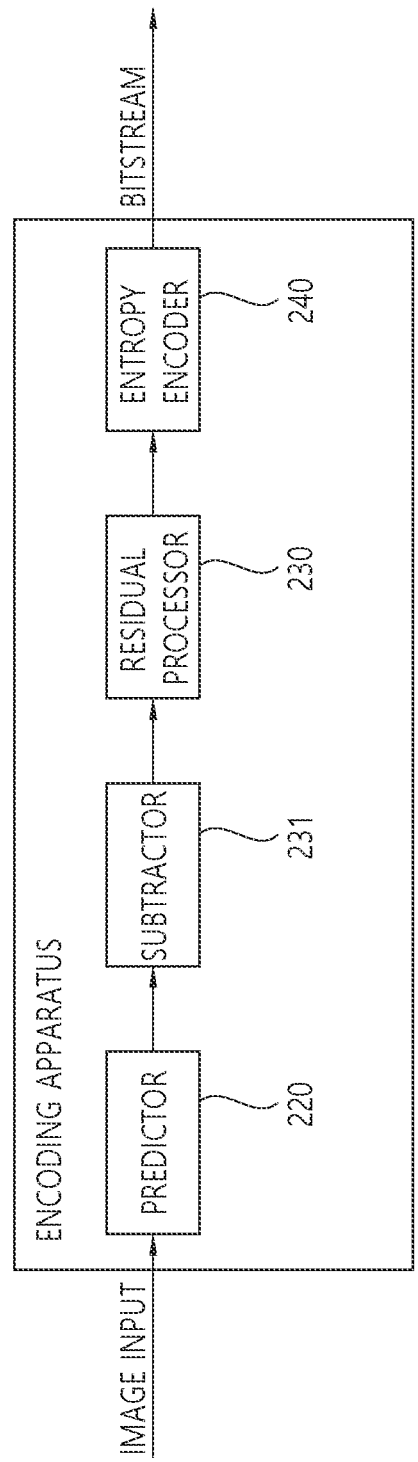

FIG. 15 and FIG. 16 schematically show an example of a video/image encoding method and related components according to embodiment(s) of this document.

The method disclosed in FIG. 15 may be performed by the encoding apparatus disclosed in FIG. 2 or FIG. 16. Specifically, for example, S1500 to S1540 of FIG. 15 may be performed by the predictor 220 of the encoding apparatus of FIGS. 16, and S1550 of FIG. 15 may be performed by the entropy encoder 240 of the encoding apparatus of FIG. 16. In addition, although not shown in FIG. 15, in FIG. 16, prediction samples or prediction-related information may be derived by the predictor 220 of the encoding apparatus, and residual samples may be derived from original samples or predicted samples by the subtractor 231 of the encoding apparatus, and residual information is generated based on the residual samples by the residual processor 230 of the encoding apparatus. The bitstream may be generated from residual information or prediction-related information by the entropy encoder 240 of the encoding apparatus. The method disclosed in FIG. 15 may include the embodiments described above in this document.

The encoding apparatus may determine an intra prediction type for the current block from among the intra prediction types (S1500). For example, the encoding apparatus may determine the intra prediction type for the current block in consideration of rate distortion (RD) cost. The intra prediction types may include a first intra prediction type using an intra prediction reference line adjacent to the current block, a second intra prediction type using an intra prediction reference line not adjacent to the current block, and a third intra prediction type to which is applied Intra Sub-Partitions mode (ISP). The first intra prediction type may indicate the above-described general intra prediction, the second intra prediction type may indicate the above-described MRL, and the third intra prediction type may indicate the above-described ISP.

For example, the encoding apparatus may generate and encode the reference line index indicating an intra prediction reference line of the current block. It may be determined whether the intra prediction type for the current block is the second intra prediction type based on the reference line index. Also, for example, when the intra prediction type for the current block is not the second intra prediction type, the encoding apparatus may generate and encode the ISP flag indicating whether the third intra prediction type is applied to the current block. It may be determined whether the intra prediction type for the current block is the third intra prediction type based on the ISP flag. When the ISP flag indicates that the third intra prediction type is applied to the current block, the intra prediction type for the current block may be derived as the third intra prediction type, and when the ISP flag indicates that the third intra prediction type is not applied to the current block, the intra prediction type for the current block may be derived as the first intra prediction type. For example, the information about the intra prediction type may include the reference line index, the ISP flag, and/or an ISP index. The information about the intra prediction type may include the reference line index, and when the value of the reference line index is 0, the prediction related information may further include the ISP flag. In addition, when the value of the ISP flag is 1, the information on the intra prediction type may further include the ISP index. For example, the prediction-related information may include information about the intra prediction type.

The encoding apparatus may derive the first intra prediction mode for the left neighboring block of the current block (S1510). Also, the encoding apparatus may derive a second intra prediction mode for a top neighboring block of the current block (S1520). Here, the first intra prediction mode may be referred to as a first candidate intra prediction mode, and the second intra prediction mode may be referred to as a second candidate intra prediction mode. For example, the encoding apparatus may derive the first candidate intra prediction mode based on the intra prediction mode of the left neighboring block of the current block and may derive the second candidate intra prediction mode based on the intra prediction mode of an top neighboring block of the current block.

The encoding apparatus may configure an intra prediction mode candidate list of the current block based on the first intra prediction mode and the second intra prediction mode (S1530). For example, the encoding apparatus may configure the intra prediction mode candidate list based on at least some of the above tables, and the intra prediction mode candidate list may indicate the above-described most probable mode (MPM) list.

For example, the encoding apparatus may configure the intra prediction mode candidate list based on the first candidate intra prediction mode and the second candidate intra prediction mode. The encoding apparatus may configure the intra prediction mode candidate list based on whether the first candidate intra prediction mode (mode number of) and the second candidate intra prediction mode (mode number of) are the same, and/or the mode number of the first candidate intra prediction mode and/or the mode number of the second candidate intra prediction mode is greater than the DC intra prediction mode.

For example, the first intra prediction mode or the second intra prediction mode for a neighboring block to which a CHIP (Combined Inter and Intra Prediction) mode is applied among the left neighboring block or the top neighboring block may be determined as a specific intra prediction mode. Here, the specific intra prediction mode may be the planar mode. Alternatively, the specific intra prediction mode may be a DC mode. For example, when the CIIP mode is applied to the left neighboring block, the first candidate intra prediction mode may be derived as a specific intra prediction mode. Or, for example, when the CIIP mode is applied to the top neighboring block, the second candidate intra prediction mode may be derived as a specific intra prediction mode.

For example, the encoding apparatus may configure the intra prediction mode candidate list based on the intra prediction mode of the left neighboring block of the current block and the intra prediction mode of the top neighboring block of the current block. The encoding apparatus determines whether the intra prediction mode of the left neighboring block and the intra prediction mode of the top neighboring block of the current block are the same, and the mode number of the intra prediction mode of the left neighboring block is greater than the mode number of the DC intra prediction mode. The encoding apparatus may configure the intra prediction mode candidate list based on whether the intra prediction mode of the left neighboring block and the intra prediction mode of the top neighboring block of the current block are the same and/or whether the mode number of the intra prediction mode of the left neighboring block is greater than the mode number of the DC intra prediction mode.

When the intra prediction mode of the left neighboring block of the current block and the intra prediction mode of the top neighboring block are the same, and the mode number of the intra prediction mode of the left neighboring block is greater than the mode number of the DC intra prediction mode, the encoding apparatus may derive the intra prediction mode candidate list of the current block including intra prediction mode candidates as described below.

mpm[0]=PLANAR_IDX
mpm[1]=leftIntraDir
mpm[2]=2+((leftIntraDir+61) % 64)
mpm[3]=2+((leftIntraDir−1) % 64)
mpm[4]=DC_IDX
mpm[5]=2+((leftIntraDir+60) % 64)

Here, mpm[0], mpm[1], mpm[2], mpm[3], mpm[4], and mpm[5] are intra prediction mode candidate 0, intra prediction mode candidate 1, intra prediction mode candidate 2, intra prediction mode candidate 3, intra prediction mode candidate 4 and intra prediction mode candidate 5, respectively. leftIntraDir may indicate the first candidate intra prediction mode, PLANAR_IDX may indicate the planar intra prediction mode, and DC_IDX may indicate the DC intra prediction mode.

That is, intra prediction mode candidate 0 of the intra prediction mode candidate list may be derived in the planar intra prediction mode, and intra prediction mode candidate 1 of the intra prediction mode candidate list may be derived as the intra prediction mode of the left neighboring block, the intra prediction mode candidate 2 of the intra prediction mode candidate list may be derived as an intra prediction mode having a mode number of 2+((leftIntraDir+61) % 64), that is, the intra prediction mode with the mode number of a value obtained by adding 61 to the mode number of the intra prediction mode of the left neighboring block, calculating modular arithmetic by 64 and adding 2, the intra prediction mode candidate 3 of the intra prediction mode candidate list may be derived as an intra prediction mode having a mode number of 2+((leftIntraDir−1) % 64), that is, the intra prediction mode with the mode number of a value obtained by subtracting 1 from the mode number of the intra prediction mode of the left neighboring block, calculating modular arithmetic by 64 and adding 2, the intra prediction mode candidate 4 of the intra prediction mode candidate list may be derived as the DC intra prediction mode, and the intra prediction mode candidate 5 of the intra prediction mode candidate list may be derived as an intra prediction mode with a mode number of 2+((leftIntraDir+60) % 64), that is, the intra prediction mode with the mode number of a value obtained by adding 60 to the mode number of the intra prediction mode of the left neighboring block, calculating modular arithmetic by 64 and adding 2. That is, for example, when the intra prediction mode of the left neighboring block and the intra prediction mode of the top neighboring block are the same, and the mode number of the intra prediction mode of the left neighboring block is greater than the mode number of the DC intra prediction mode, the intra prediction mode of the left neighboring block and the intra prediction mode of the top neighboring block are the same, and the mode number of the intra prediction mode of the left neighboring block is greater than the mode number of the DC intra prediction mode, the intra prediction mode candidate list may include the intra prediction mode of the left neighboring block, an intra prediction mode with a mode number of 2+((leftIntraDir+61) % 64), and a mode number of 2+((leftIntraDir−1) % 64), and an intra prediction mode with a mode number of 2+ ((leftIntraDir+60) % 64). Here, leftIntraDir may indicate the mode number of the intra prediction mode of the left neighboring block of the current block.

On the other hand, when the intra prediction mode of the left neighboring block and the intra prediction mode of the top neighboring block of the current block are not the same, for example, the encoding apparatus may determine whether at least one of the mode number of the intra prediction intra prediction mode of the left neighboring block and the mode number of the intra prediction intra prediction mode of the top neighboring block is greater than the mode number of the DC intra prediction mode. When at least one of the mode number of the intra prediction intra prediction mode of the left neighboring block and the mode number of the intra prediction intra prediction mode of the top neighboring block is greater than the mode number of the DC intra prediction mode, a variable minAB and a variable maxAB may be derived as follows.

minAB=Min(candIntraPredModeA, candIntraPredModeB)
maxAB=Max(candIntraPredModeA, candIntraPredModeB)

Here, candIntraPredModeA may indicate the mode number of the intra prediction mode of the left neighboring block of the current block, and candIntraPredModeB may indicate the mode number of the intra prediction mode of the top neighboring block of the current block. That is, the minAB may indicate a smaller value of the mode number of the intra prediction mode of the left neighboring block and the mode number of the intra prediction mode of the top neighboring block, and the maxAB may indicate a larger value of the mode number of the intra prediction mode of the left neighboring block and the mode number of the intra prediction mode of the top neighboring block.

In addition, when the intra prediction mode of the left neighboring block of the current block and the intra prediction mode of the top neighboring block are not the same, the encoding apparatus may determine whether the mode number of the intra prediction mode of the left neighboring block is greater than the mode number of the DC intra prediction mode, and the mode number of the intra prediction mode of the top neighboring block is greater than the mode number of the DC intra prediction mode.

For example, when the mode number of the intra prediction mode of the left neighboring block is greater than the mode number of the DC intra prediction mode, and the mode number of the intra prediction mode of the top neighboring block is greater than the mode number of the DC intra prediction mode, the encoding apparatus may derive intra prediction mode candidate 0 to intra prediction mode candidate 3 as described below.

mpm[0]=PLANAR_IDX
mpm[1]=leftIntraDir
mpm[2]=aboveIntraDir
mpm[3]=DC_IDX

Here, leftIntraDir may indicate the first candidate intra prediction mode, and aboveIntraDir may indicate the second candidate intra prediction mode.

That is, intra prediction mode candidate 0 of the intra prediction mode candidate list may be derived as the planar intra prediction mode, and intra prediction mode candidate 1 of the intra prediction mode candidate list may be derived as an intra prediction mode of a left neighboring block, intra prediction mode candidate 2 of the intra prediction mode candidate list may be derived as an intra prediction mode of an top neighboring block, and intra prediction mode candidate 3 of the intra prediction mode candidate list may be derived as the DC intra prediction mode. That is, for example, when the intra prediction mode of the left neighboring block and the intra prediction mode of the top neighboring block are not the same, the mode number of the intra prediction mode of the left neighboring block and the mode of the intra prediction mode of the top neighboring block are greater than the mode number of the DC intra prediction mode, the intra prediction mode candidate list may include the intra prediction mode of the left neighboring block and the intra prediction mode of the top neighboring block as intra prediction mode candidates.

Thereafter, remaining intra prediction mode candidates (intra prediction mode candidate 4 and intra prediction mode candidate 5) may be derived based on the maxAB and the minAB. Specifically, the remaining intra prediction mode candidates may be derived based on a difference between a larger value and a smaller value among the mode number of the intra prediction mode of the left neighboring block and the mode number of the intra prediction mode of the top neighboring block. Alternatively, the remaining intra prediction mode candidates may be derived based on a difference between the mode number of the intra prediction mode of the left neighboring block and the mode number of the intra prediction mode of the top neighboring block.

For example, when the value obtained by subtracting the minAB from the maxAB is less than 63 and greater than 1 (that is, when the value obtained by subtracting the minAB from the maxAB is one of 2 to 62), the encoding apparatus may derive intra prediction mode candidate 4 and intra prediction mode candidate 5 as described below.

mpm[4]=2+((maxAB+61) % 64)
mpm[5]=2+((maxAB−1) % 64)

That is, the intra prediction mode candidate 4 of the intra prediction mode candidate list may be derived an intra prediction mode with a mode number of 2+((maxAB+61) % 64), that is, the intra prediction mode with the mode number of a value obtained by adding 61 to the maxAB, calculating modular arithmetic by 64 and adding 2 and the intra prediction mode candidate 5 of the intra prediction mode candidate list may be derived an intra prediction mode with a mode number 2+((maxAB−1) % 64), that is, the intra prediction mode with the mode number of a value obtained by subtracting 1 from the maxAB, calculating modular arithmetic by 64 and adding 2. Here, the maxAB may represent a greater value of the mode number of the intra prediction mode of the left neighboring block and the mode number of the intra prediction mode of the top neighboring block.

Alternatively, when the value obtained by subtracting the minAB from the maxAB is equal to or greater than 63 or equal to or less than 1, the encoding apparatus may derive the intra prediction mode candidate 4 and the intra prediction mode candidate 5 as described below.

mpm[4]=2+((maxAB+60) % 64)
mpm[5]=2+(maxAB % 64)

That is, the intra prediction mode candidate 4 of the intra prediction mode candidate list may be derived an intra prediction mode with a mode number of 2+((maxAB+60) % 64), that is, the intra prediction mode with the mode number of a value obtained by adding 60 to the maxAB, calculating modular arithmetic by 64 and adding 2 and the intra prediction mode candidate 5 of the intra prediction mode candidate list may be derived an intra prediction mode with a mode number 2+(maxAB % 64), that is, the intra prediction mode with the mode number of a value obtained by calculating modular arithmetic by 64 to the maxAB and adding 2. Here, the maxAB may represent a greater value of the mode number of the intra prediction mode of the left neighboring block and the mode number of the intra prediction mode of the top neighboring block.

Meanwhile, the intra prediction mode of the left neighboring block and the intra prediction mode of the top neighboring block of the current block are not the same, or at least one of the mode numbers of the intra prediction mode of the left neighboring block and the intra prediction mode of the top neighboring block is smaller than the mode number of the DC intra prediction mode, the encoding apparatus may determine whether the sum of the mode number of the intra prediction mode of the left neighboring block and the mode number of the intra prediction mode of the top neighboring block is equal to or greater than the mode number of the DC intra prediction mode.

For example, when the sum of the mode number of the intra prediction mode of the left neighboring block and the mode number of the intra prediction mode of the top neighboring block is equal to or greater than the mode number of the DC intra prediction mode, the encoding apparatus may derive the intra prediction mode candidate list of the current block including intra prediction mode candidates as described below.

mpm[0]=PLANAR_IDX
mpm[1]=maxAB
mpm[2]=DC_IDX
mpm[3]=2+((maxAB+61) % 64)
mpm[4]=2+((maxAB−1) % 64)
mpm[5]=2+((maxAB+60) % 64)

Where maxAB can also be expressed as (leftIntraDir<aboveIntraDir)? aboveIntraDir: leftIntraDir. That is, intra prediction mode candidate 0 of the intra prediction mode candidate list may be derived as the planar intra prediction mode, intra prediction mode candidate 1 may be derived as maxAB, that is, intra prediction mode candidate 1 may be derived as the intra prediction mode of the top neighboring block when the mode number of the intra prediction mode of the left neighboring block is smaller than the mode number of the intra prediction mode of the top neighboring block, as the intra prediction mode of the left neighboring block when the mode number of the intra prediction mode of the left neighboring block is greater than or equal to the mode number of the intra prediction mode of the top neighboring block. Intra prediction mode candidate 2 of the intra prediction mode candidate list may be derived as the DC intra prediction mode, and the intra prediction mode candidate 3 of the intra prediction mode candidate list may be derived an intra prediction mode with a mode number of 2+((maxAB+61) % 64), that is, the intra prediction mode with the mode number of a value obtained by adding 61 to the maxAB, calculating modular arithmetic by 64 and adding 2 and the intra prediction mode candidate 4 of the intra prediction mode candidate list may be derived an intra prediction mode with a mode number 2+((maxAB−1) % 64), that is, the intra prediction mode with the mode number of a value obtained by subtracting 1 from the maxAB, calculating modular arithmetic by 64 and adding 2. The intra prediction mode candidate 5 of the intra prediction mode candidate list may be derived an intra prediction mode with a mode number of 2+((maxAB+60) % 64), that is, the intra prediction mode with the mode number of a value obtained by adding 60 to the maxAB, calculating modular arithmetic by 64 and adding 2.

Or, for example, if the above conditions are not met, the encoding apparatus may derive the intra prediction mode candidate list of the current block including intra prediction mode candidates as described below.

mpm[0]=PLANAR_IDX
mpm[1]=DC_IDX
mpm[2]=VER_IDX
mpm[3]=HOR_IDX
mpm[4]=VER_IDX−4
mpm[5]=VER_IDX+4

Here, VER_IDX may indicate an intra prediction mode having a mode number of 50 (INTRA_ANGULAR50), HOR_IDX may indicate an intra prediction mode having a mode number of 18 (INTRA_ANGULAR18), VER_IDX−4 may indicate an intra prediction mode (INTRA_ANGULAR46) having a mode number of 46, and VER_IDX+4 may indicate an intra prediction mode (INTRA_ANGULAR54) having a mode number of 54.

That is, intra prediction mode candidate 0 of the intra prediction mode candidate list may be derived as the planar intra prediction mode, intra prediction mode candidate 1 of the intra prediction mode candidate list may be derived as the DC intra prediction mode, intra prediction mode candidate 2 of the intra prediction mode candidate list may be derived as the vertical intra prediction mode (ie, intra prediction mode No. 50), intra prediction mode candidate 3 of the intra prediction mode candidate list may be derived in the horizontal intra prediction mode (ie, intra prediction mode No. 18), intra prediction mode candidate 4 of the intra prediction mode candidate list may be derived as an intra prediction mode of a mode number obtained by subtracting 4 from the mode number of the vertical intra prediction mode, that is, intra prediction mode No. 46, and intra prediction mode candidate 5 of the intra prediction mode candidate list may be derived as the intra prediction mode of the mode number obtained by adding 4 to the mode number of the vertical intra prediction mode, that is, the intra prediction mode No. 54. That is, for example, when the above conditions are not met, the intra prediction mode candidate list may include the DC intra prediction mode, an intra prediction mode No. 50, an intra prediction mode No. 18, an intra prediction mode No. 46, and an intra prediction No. 54 mode as intra prediction mode candidates.

Meanwhile, the intra prediction mode candidate list generated when the intra prediction type is the first intra prediction type, the intra prediction mode candidate list generated when the intra prediction type is the second intra prediction type, and the intra prediction mode candidate list generated when the prediction type is the third intra prediction type may be the same. That is, the same intra prediction mode candidate list may be configured regardless of the intra prediction type for the current block. The intra prediction mode candidate list may be configured through the same intra prediction mode configuration process regardless of the intra prediction type for the current block. The intra prediction mode configuration process may be the same as one of the above-described embodiments.

The encoding apparatus may determine the intra prediction mode of the current block based on the intra prediction mode candidate list (S1540). For example, the encoding apparatus may apply various intra prediction modes to derive an intra prediction mode having an optimal RD cost as the intra prediction mode for the current block. For example, the encoding apparatus may derive an intra prediction mode having an optimal RD cost among intra prediction mode candidates in the intra prediction mode candidate list as the intra prediction mode for the current block. The intra prediction mode may be one of 2 non-directional intra prediction modes and 65 intra directional prediction modes. As described above, the 2 non-directional intra prediction modes may include an intra DC mode and an intra planar mode.

For example, the encoding apparatus may generate an MPM flag indicating whether the determined intra prediction mode is included in the intra prediction mode candidates of the intra prediction mode candidate list. The MPM flag may be referred to an intra prediction mode candidate flag. When the determined intra prediction mode is included in the intra prediction mode candidates of the intra prediction mode candidate list, the encoding apparatus may generate an MPM index indicating the determined intra prediction mode among the intra prediction mode candidates. The MPM index may be referred to as an intra prediction mode candidate index. When the determined intra prediction mode is not included in the intra prediction mode candidates of the intra prediction mode candidate list, the encoding apparatus may generate remaining intra prediction mode information indicating the determined intra prediction mode among the remaining intra prediction modes not included in the intra prediction mode candidates. On the other hand, when the determined intra prediction mode is included in the intra prediction mode candidates of the intra prediction mode candidate list, the encoding apparatus may not signal the MPM flag, and the value of the MPM flag may be derived as 1. The prediction-related information on the current block may include the MPM flag, the MPM index, and/or the re-maintenance intra prediction mode information.

For example, the encoding apparatus may generate prediction samples of the current block based on the intra prediction type and the intra prediction mode. For example, when the intra prediction type is derived as the first intra prediction type, the encoding apparatus may select at least one reference sample among reference samples in an intra prediction reference line adjacent to the current block based on the intra prediction mode and may generates prediction samples of the current block based on the reference sample. The reference samples may include top left corner reference sample, top reference samples, and left reference samples of the current block. For example, when the size of the current block is W×H, and the x component of the top-left sample position of the current block is xN and the y component is yN, the left reference samples are p[xN−1][yN] top[xN−1][2H+yN−1], the top left corner reference sample is p [xN−1][yN−1], and the top reference samples arep[xN][yN−1] top[2W+xN−1][yN−1].

Or, for example, when the intra prediction type is derived as the second intra prediction type, the encoding apparatus may derive at least one reference sample from among reference samples in an intra prediction reference line that is not adjacent to the current block based on the intra prediction mode and may generates prediction samples of the current block based on the reference sample. Here, the intra prediction reference line may be a reference line separated by a distance of 1, 2, or 3 samples from a top boundary and/or a left boundary of the current block.

Or, for example, when the intra prediction type is derived as the third intra prediction type, the encoding apparatus may determine the ISP partition type of the current block, and can derive sub blocks by dividing the current block according to the ISP partition type. The partition type may be a horizontal split type or a vertical split type. For example, when the size of the current block is 4×4, the current block may not be divided. Also, for example, when the size of the current block is a 4×8 size and the partition type is the horizontal split type, the current block may be divided into two 4×4 sub-blocks. Also, for example, when the size of the current block is a 4×8 size and the partition type is the vertical split type, the current block may be divided into two 2×8 sub-blocks. Also, for example, when the size of the current block is an 8×4 size and the partition type is the horizontal split type, the current block may be divided into two 8×2 sub-blocks. Also, for example, when the size of the current block is an 8×4 size and the partition type is the vertical split type, the current block may be divided into two 4×4 sub-blocks. Also, for example, if the size of the current block is W×H size (here, the size of the current block is a size other than 4×8 size, 8×4 size, or 4×4 size) and the partition type is the horizontal split type, the current block may be divided into four W×H/4 sub-blocks. Also, for example, when the size of the current block is a W×H size and the partition type is the vertical split type, the current block may be divided into four W/4xH sub-blocks. Thereafter, the encoding apparatus may generate a prediction sample by performing intra prediction on each of the sub-blocks. That is, the encoding apparatus may derive at least one reference sample among reference samples in an intra prediction reference line of each subblock of the current block based on the intra prediction mode, and generate the prediction samples based on the reference sample. The intra prediction reference line of each subblock may be a reference line adjacent to each subblock. Meanwhile, the encoding apparatus may generate and encode an ISP partition flag indicating the ISP partition type. The prediction-related information may include the ISP partition flag.

Alternatively, for example, based on the intra prediction mode of the current block being the DC intra prediction mode, the prediction samples may be derived based on a DC value. For example, when the current block is a square block and the x and y components of the top-left position of the current block are 0, the DC value may be derived based on reference samples from (0, −refIdx−1) to (W−1, −refIdx−1) within an intra prediction reference line indicated by the reference line index of the current block and reference samples from (−refIdx−1, 0) to (−refIdx−1, H−1) within the intra prediction reference line. Or, the DC value may be derived based on reference samples from (−refIdx, −refIdx−1) to (W−1−refIdx, −refIdx−1) within an intra prediction reference line indicated by the reference line index of the current block and reference samples from (−refIdx−1, −refIdx) to (−refIdx−1, H−1−refIdx) within the intra prediction reference line. Here, W and H may represent the width and height of the current block, and the refIdx may represent the value of the reference line index.

Alternatively, for example, based on the intra prediction mode of the current block being the DC intra prediction mode, the prediction samples may be derived based on a DC value. For example, when the current block is the non-square block having a width greater than a height, an x component and a y component of the top-left position of the current block are 0, the DC value may be derived based on reference samples from (0, −refIdx−1) to (W−1, −refIdx−1) within the prediction reference line indicated by the reference line index of the current block. Or, the DC value may be derived based on reference samples from (−refIdx, −refIdx−1) to (W−1−refIdx, −refIdx−1) within the prediction reference line indicated by the reference line index of the current block. For example, when the current block is the non-square block having a height greater than a width, an x component and a y component of the top-left position of the current block are 0, the DC value may be derived based on reference samples from (−refIdx−1, 0) to (−refIdx−1, H−1) within the prediction reference line indicated by the reference line index of the current block. Or, the DC value may be derived based on reference samples from (−refIdx−1, −refIdx) to (−refIdx−1, H−1−refIdx) within the prediction reference line indicated by the reference line index of the current block. Here, the W and the H may represent the width and height of the current block, and the refIdx may represent the value of the reference line index.

Or, for example, based on the intra prediction mode of the current block being the planar intra prediction mode, the prediction samples may be derived based on reference samples. For example, when the current block is the square block and an x component and a y component of the top-left position of the current block are 0, the reference samples are a reference sample of (−refIdx−1, H) in the intra prediction reference line indicated by the reference line index of the current block and a reference sample of (W, −refIdx−1) in the intra prediction reference line. Or, the reference samples are a reference sample of (−refIdx−1, H−refIdx) in the intra prediction reference line indicated by the reference line index of the current block and a reference sample of (W−refIdx, −refIdx−1) in the intra prediction reference line. Here, the W and the H may represent the width and height of the current block, and the refIdx may represent the value of the reference line index.

The encoding apparatus may encode image information including information on the determined intra prediction type and information on the determined intra prediction mode (S1550). For example, the encoding apparatus may encode image information including the prediction-related information for the current block, and may output the image information in the form of a bitstream. The prediction-related information may include information about the determined intra prediction type and information about the determined intra prediction mode. For example, the information on the determined intra prediction type may include the reference line index, the ISP flag, and/or the ISP index. In addition, for example, the determined intra prediction type may include the MPM flag, the MPM index, and/or the remanding intra prediction mode information. In addition, although not shown, the encoding apparatus may derive residual samples for the current block based on original samples and prediction samples for the current block, and generate information about the residual for the current block based on the residual samples, and encode the image information including the information about the residual and output in the form of the bitstream. Meanwhile, the bitstream may be transmitted to a decoding apparatus through a network or a (digital) storage medium. Here, the network may include a broadcasting network and/or a communication network, and the digital storage medium may include various storage media such as USB, SD, CD, DVD, Blu-ray, HDD, and SSD.

For example, the encoding apparatus may generate the bitstream or encoded information by encoding image information including all or part of the above-described information (or syntax elements). Alternatively, it can be output in the form of the bitstream. In addition, the bitstream or encoded information may be transmitted to the decoding apparatus through a network or a storage medium. Alternatively, the bitstream or the encoded information may be stored in a computer-readable storage medium, and the bitstream or the encoded information may be generated by the above-described image encoding method.

Figure 17:
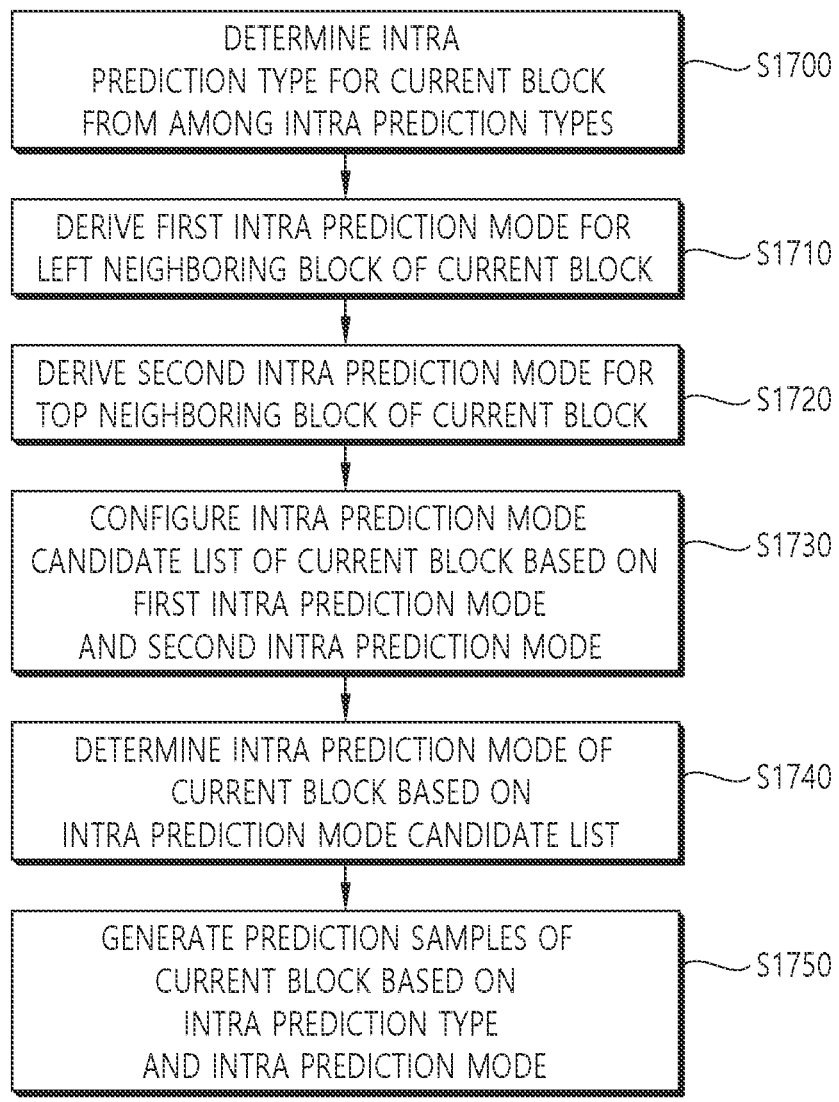
FIG. 17 and FIG. 18 schematically represent an example of a video/image decoding method and related components according to the embodiment(s) of this document.
Figure 18:
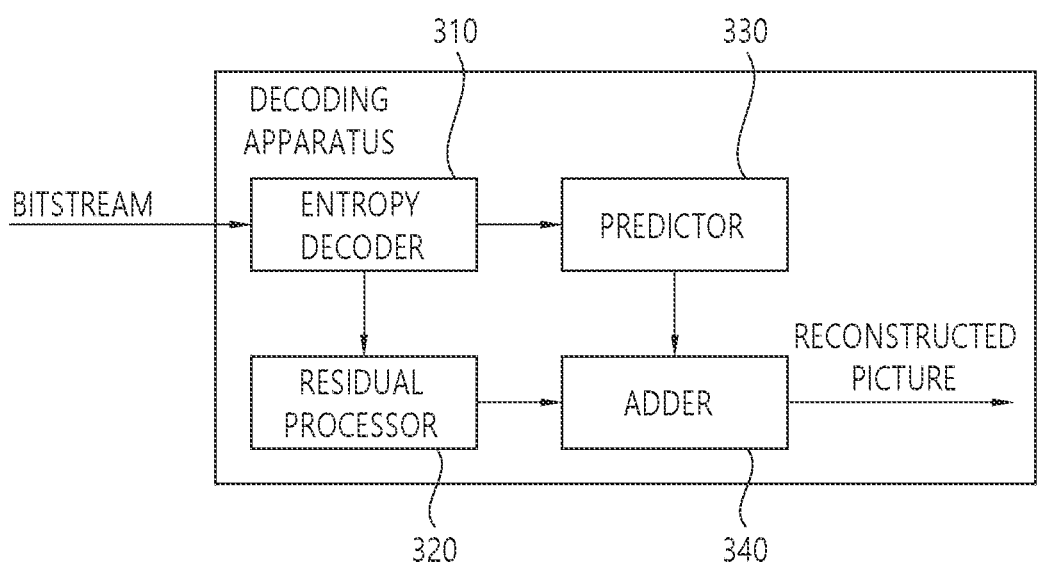

FIG. 17 and FIG. 18 schematically show an example of a video/image decoding method and related components according to embodiment(s) of this document.

The method disclosed in FIG. 17 may be performed by the decoding apparatus disclosed in FIG. 3 or FIG. 18. Specifically, for example, steps S1700 to S1750 of FIG. 17 may be performed by the predictor 330 of the decoding apparatus in FIG. 18. In addition, although not shown in FIG. 17, the prediction-related information or the residual information may be derived from the bitstream by the entropy decoder 310 of the decoding apparatus in FIG. 18, residual samples may be derived from the residual information by the residual processor 320 of the decoding apparatus, the prediction samples may be derived from the prediction-related information by the predictor 330 of the decoding apparatus, and a reconstructed block or a reconstructed picture may be derived from the residual samples or the prediction samples by the adder 340 of the decoding apparatus. The method disclosed in FIG. 17 may include the embodiments described above in this document.

The decoding apparatus may derive an intra prediction type for the current block from among the intra prediction types (S1700). For example, the decoding apparatus may receive and parse prediction-related information on the current block. For example, the decoding apparatus may obtain the prediction-related information based on the bitstream. For example, the prediction-related information may include information about an intra prediction type and/or information about an intra prediction mode. For example, the decoding apparatus may derive the intra prediction type for the current block based on the prediction-related information. Here, the intra prediction types may include a first intra prediction type using an intra prediction reference line adjacent to the current block, a second intra prediction type using an intra prediction reference line not adjacent to the current block, and a third intra prediction type to which the Intra Sub-Partitions mode (ISP) is applied. The first intra prediction type may indicate the above-described general intra prediction, the second intra prediction type may indicate the above-described MRL, and the third intra prediction type may indicate the above-described ISP.

For example, the decoding apparatus may derive the intra prediction type for the current block based on the information about the intra prediction type shown in at least some of the above tables. For example, the decoding apparatus may determine whether the intra prediction type for the current block is the second intra prediction type based on the reference line index of the current block. The information about the intra prediction type may include the reference line index. The reference line index may indicate an intra prediction reference line of the current block. For example, when the reference line index has a value of 0, the reference line index may indicate a reference line adjacent to the top boundary and/or a left boundary of the current block, when the value of the reference line index is 1, the reference line index may indicate a reference line separated by 1 sample distance from the top boundary and/or the left boundary of the current block, when the value of the reference line index is 2, the reference line index may indicate a reference line separated by 2 sample distance from the top boundary and/or the left boundary of the current block, and when the value of the reference line index is 3, the reference line index may indicate a reference line separated by 3 sample distance from the top boundary and/or the left boundary of the current block. When the reference line index indicates a reference line adjacent to the current block, the decoding apparatus may derive the reference line adjacent to the current block as an intra prediction reference line of the current block and may determine that the intra prediction type for the current block is not the second intra prediction type. In addition, when the reference line index indicates a reference line not adjacent to the current block, the decoding apparatus may derive the reference line not adjacent to the current block as an intra prediction reference line of the current block and may derive the second intra prediction type as the intra prediction type for the current block. Here, the reference line not adjacent to the current block may be a reference line separated by 1, 2, or 3 sample distances from the top boundary and/or the left boundary of the current block.

In addition, when the reference line index indicates a reference line adjacent to the current block, that is, when the intra prediction type for the current block is not the second intra prediction type, the decoding apparatus may determine whether the intra prediction type for the current block is the third intra prediction type based on an Intra Sub-Partitions mode (ISP) flag. The information about the intra prediction type may include the ISP flag. The ISP flag may indicate whether the third intra prediction type to which the ISP is applied is applied to the current block. That is, the ISP flag may indicate whether the ISP is applied to the current block. For example, when the value of the IPS flag is 1, the ISP flag may indicate that the third intra prediction type is applied to the current block and when the value of the IPS flag is 0, the ISP flag may indicate that the third intra prediction type is not applied to the current block. When the ISP flag indicates that the third intra prediction type is applied, the decoding apparatus may derive the third intra prediction type as the intra prediction type for the current block, and when the ISP flag indicates that the third intra prediction type is not applied, the decoding apparatus may derive the first intra prediction type as the intra prediction type for the current block.

The decoding apparatus may derive the first intra prediction mode for the left neighboring block of the current block (S1710). Also, the decoding apparatus may derive a second intra prediction mode for a top neighboring block of the current block (S1720). Here, the first intra prediction mode may be referred to as a first candidate intra prediction mode, and the second intra prediction mode may be referred to as a second candidate intra prediction mode. For example, the decoding apparatus may derive the first candidate intra prediction mode based on the intra prediction mode of the left neighboring block of the current block and may derive the second candidate intra prediction mode based on the intra prediction mode of an top neighboring block of the current block.

The decoding apparatus may configure an intra prediction mode candidate list of the current block based on the first intra prediction mode and the second intra prediction mode (S1730). For example, the decoding apparatus may configure the intra prediction mode candidate list based on at least some of the above tables, and the intra prediction mode candidate list may indicate the above-described most probable mode (MPM) list.

For example, the decoding apparatus may configure the intra prediction mode candidate list based on the first candidate intra prediction mode and the second candidate intra prediction mode. The decoding apparatus may configure the intra prediction mode candidate list based on whether the first candidate intra prediction mode and the second candidate intra prediction mode are the same, and/or the mode number of the first candidate intra prediction mode and/or the mode number of the second candidate intra prediction mode is greater than the DC intra prediction mode.

For example, the first intra prediction mode or the second intra prediction mode for a neighboring block to which a CIIP (Combined Inter and Intra Prediction) mode is applied among the left neighboring block or the top neighboring block may be determined as a specific intra prediction mode. Here, the specific intra prediction mode may be the planar mode. Alternatively, the specific intra prediction mode may be a DC mode. For example, when the CIIP mode is applied to the left neighboring block, the first candidate intra prediction mode may be derived as a specific intra prediction mode. Or, for example, when the CIIP mode is applied to the top neighboring block, the second candidate intra prediction mode may be derived as a specific intra prediction mode.

For example, the decoding apparatus may configure the intra prediction mode candidate list based on the intra prediction mode of the left neighboring block of the current block and the intra prediction mode of the top neighboring block of the current block. The decoding apparatus determines whether the intra prediction mode of the left neighboring block and the intra prediction mode of the top neighboring block of the current block are the same, and the mode number of the intra prediction mode of the left neighboring block is greater than the mode number of the DC intra prediction mode. The decoding apparatus may configure the intra prediction mode candidate list based on whether the intra prediction mode of the left neighboring block and the intra prediction mode of the top neighboring block of the current block are the same and/or whether the mode number of the intra prediction mode of the left neighboring block is greater than the mode number of the DC intra prediction mode.

When the intra prediction mode of the left neighboring block of the current block and the intra prediction mode of the top neighboring block are the same, and the mode number of the intra prediction mode of the left neighboring block is greater than the mode number of the DC intra prediction mode, the decoding apparatus may derive the intra prediction mode candidate list of the current block including intra prediction mode candidates as described below.

mpm[0]=PLANAR_IDX
mpm[1]=leftIntraDir
mpm[2]=2+((leftIntraDir+61) % 64)
mpm[3]=2+((leftIntraDir−1) % 64)
mpm[4]=DC_IDX
mpm[5]=2+((leftIntraDir+60) % 64)

Here, mpm[0], mpm[1], mpm[2], mpm[3], mpm[4], and mpm[5] are intra prediction mode candidate 0, intra prediction mode candidate 1, intra prediction mode candidate 2, intra prediction mode candidate 3, intra prediction mode candidate 4 and intra prediction mode candidate 5, respectively. leftIntraDir may indicate the first candidate intra prediction mode, PLANAR_IDX may indicate the planar intra prediction mode, and DC_IDX may indicate the DC intra prediction mode.

That is, intra prediction mode candidate 0 of the intra prediction mode candidate list may be derived in the planar intra prediction mode, and intra prediction mode candidate 1 of the intra prediction mode candidate list may be derived as the intra prediction mode of the left neighboring block, the intra prediction mode candidate 2 of the intra prediction mode candidate list may be derived as an intra prediction mode having a mode number of 2+((leftIntraDir+61) % 64), that is, the intra prediction mode with the mode number of a value obtained by adding 61 to the mode number of the intra prediction mode of the left neighboring block, calculating modular arithmetic by 64 and adding 2, the intra prediction mode candidate 3 of the intra prediction mode candidate list may be derived as an intra prediction mode having a mode number of 2+((leftIntraDir−1) % 64), that is, the intra prediction mode with the mode number of a value obtained by subtracting 1 from the mode number of the intra prediction mode of the left neighboring block, calculating modular arithmetic by 64 and adding 2, the intra prediction mode candidate 4 of the intra prediction mode candidate list may be derived as the DC intra prediction mode, and the intra prediction mode candidate 5 of the intra prediction mode candidate list may be derived as an intra prediction mode with a mode number of 2+((leftIntraDir+60) % 64), that is, the intra prediction mode with the mode number of a value obtained by adding 60 to the mode number of the intra prediction mode of the left neighboring block, calculating modular arithmetic by 64 and adding 2. That is, for example, when the intra prediction mode of the left neighboring block and the intra prediction mode of the top neighboring block are the same, and the mode number of the intra prediction mode of the left neighboring block is greater than the mode number of the DC intra prediction mode, the intra prediction mode of the left neighboring block and the intra prediction mode of the top neighboring block are the same, and the mode number of the intra prediction mode of the left neighboring block is greater than the mode number of the DC intra prediction mode, the intra prediction mode candidate list may include the intra prediction mode of the left neighboring block, an intra prediction mode with a mode number of 2+((leftIntraDir+61) % 64), and a mode number of 2+((leftIntraDir−1) % 64), and an intra prediction mode with a mode number of 2+ ((leftIntraDir+60) % 64). Here, leftIntraDir may indicate the mode number of the intra prediction mode of the left neighboring block of the current block.

On the other hand, when the intra prediction mode of the left neighboring block and the intra prediction mode of the top neighboring block of the current block are not the same, for example, the decoding apparatus may determine whether at least one of the mode number of the intra prediction intra prediction mode of the left neighboring block and the mode number of the intra prediction intra prediction mode of the top neighboring block is greater than the mode number of the DC intra prediction mode. When at least one of the mode number of the intra prediction intra prediction mode of the left neighboring block and the mode number of the intra prediction intra prediction mode of the top neighboring block is greater than the mode number of the DC intra prediction mode, a variable minAB and a variable maxAB may be derived as follows.

minAB=Min (candIntraPredModeA, candIntraPredModeB)
maxAB=Max (candIntraPredModeA, candIntraPredModeB)

Here, candIntraPredModeA may indicate the mode number of the intra prediction mode of the left neighboring block of the current block, and candIntraPredModeB may indicate the mode number of the intra prediction mode of the top neighboring block of the current block. That is, the minAB may indicate a smaller value of the mode number of the intra prediction mode of the left neighboring block and the mode number of the intra prediction mode of the top neighboring block, and the maxAB may indicate a larger value of the mode number of the intra prediction mode of the left neighboring block and the mode number of the intra prediction mode of the top neighboring block.

In addition, when the intra prediction mode of the left neighboring block of the current block and the intra prediction mode of the top neighboring block are not the same, the decoding apparatus may determine whether the mode number of the intra prediction mode of the left neighboring block is greater than the mode number of the DC intra prediction mode, and the mode number of the intra prediction mode of the top neighboring block is greater than the mode number of the DC intra prediction mode.

For example, when the mode number of the intra prediction mode of the left neighboring block is greater than the mode number of the DC intra prediction mode, and the mode number of the intra prediction mode of the top neighboring block is greater than the mode number of the DC intra prediction mode, the decoding apparatus may derive intra prediction mode candidate 0 to intra prediction mode candidate 3 as described below.

mpm[0]=PLANAR_IDX
mpm[1]=leftIntraDir
mpm[2]=aboveIntraDir
mpm[3]=DC_IDX

Here, leftIntraDir may indicate the first candidate intra prediction mode, and aboveIntraDir may indicate the second candidate intra prediction mode.

That is, intra prediction mode candidate 0 of the intra prediction mode candidate list may be derived as the planar intra prediction mode, and intra prediction mode candidate 1 of the intra prediction mode candidate list may be derived as an intra prediction mode of a left neighboring block, intra prediction mode candidate 2 of the intra prediction mode candidate list may be derived as an intra prediction mode of an top neighboring block, and intra prediction mode candidate 3 of the intra prediction mode candidate list may be derived as the DC intra prediction mode. That is, for example, when the intra prediction mode of the left neighboring block and the intra prediction mode of the top neighboring block are not the same, the mode number of the intra prediction mode of the left neighboring block and the mode of the intra prediction mode of the top neighboring block are greater than the mode number of the DC intra prediction mode, the intra prediction mode candidate list may include the intra prediction mode of the left neighboring block and the intra prediction mode of the top neighboring block as intra prediction mode candidates.

Thereafter, the remaining intra prediction mode candidates (intra prediction mode candidate 4 and intra prediction mode candidate 5) may be derived based on the maxAB and the minAB. Specifically, the remaining intra prediction mode candidates may be derived based on a difference between a larger value and a smaller value among the mode number of the intra prediction mode of the left neighboring block and the mode number of the intra prediction mode of the top neighboring block. Alternatively, the remaining intra prediction mode candidates may be derived based on a difference between the mode number of the intra prediction mode of the left neighboring block and the mode number of the intra prediction mode of the top neighboring block.

For example, when the value obtained by subtracting the minAB from the maxAB is less than 63 and greater than 1 (that is, when the value obtained by subtracting the minAB from the maxAB is one of 2 to 62), the decoding apparatus may derive intra prediction mode candidate 4 and intra prediction mode candidate 5 as described below.

mpm[4]=2+((maxAB+61) % 64)
mpm[5]=2+((maxAB−1) % 64)

That is, the intra prediction mode candidate 4 of the intra prediction mode candidate list may be derived an intra prediction mode with a mode number of 2+((maxAB+61) % 64), that is, the intra prediction mode with the mode number of a value obtained by adding 61 to the maxAB, calculating modular arithmetic by 64 and adding 2 and the intra prediction mode candidate 5 of the intra prediction mode candidate list may be derived an intra prediction mode with a mode number 2+((maxAB−1) % 64), that is, the intra prediction mode with the mode number of a value obtained by subtracting 1 from the maxAB, calculating modular arithmetic by 64 and adding 2. Here, the maxAB may represent a greater value of the mode number of the intra prediction mode of the left neighboring block and the mode number of the intra prediction mode of the top neighboring block.

Alternatively, when the value obtained by subtracting the minAB from the maxAB is equal to or greater than 63 or equal to or less than 1, the decoding apparatus may derive the intra prediction mode candidate 4 and the intra prediction mode candidate 5 as described below.

mpm[4]=2+((maxAB+60) % 64)
mpm[5]=2+(maxAB % 64)

That is, the intra prediction mode candidate 4 of the intra prediction mode candidate list may be derived an intra prediction mode with a mode number of 2+((maxAB+60) % 64), that is, the intra prediction mode with the mode number of a value obtained by adding 60 to the maxAB, calculating modular arithmetic by 64 and adding 2 and the intra prediction mode candidate 5 of the intra prediction mode candidate list may be derived an intra prediction mode with a mode number 2+(maxAB % 64), that is, the intra prediction mode with the mode number of a value obtained by calculating modular arithmetic by 64 to the maxAB and adding 2. Here, the maxAB may represent a greater value of the mode number of the intra prediction mode of the left neighboring block and the mode number of the intra prediction mode of the top neighboring block.

Meanwhile, the intra prediction mode of the left neighboring block and the intra prediction mode of the top neighboring block of the current block are not the same, or at least one of the mode numbers of the intra prediction mode of the left neighboring block and the intra prediction mode of the top neighboring block is smaller than the mode number of the DC intra prediction mode, the decoding apparatus may determine whether the sum of the mode number of the intra prediction mode of the left neighboring block and the mode number of the intra prediction mode of the top neighboring block is equal to or greater than the mode number of the DC intra prediction mode.

For example, when the sum of the mode number of the intra prediction mode of the left neighboring block and the mode number of the intra prediction mode of the top neighboring block is equal to or greater than the mode number of the DC intra prediction mode, the decoding apparatus may derive the intra prediction mode candidate list of the current block including intra prediction mode candidates as described below.

mpm[0]=PLANAR_IDX
mpm[1]=maxAB
mpm[2]=DC_IDX
mpm[3]=2+((maxAB+61) % 64)
mpm[4]=2+((maxAB−1) % 64)
mpm[5]=2+((maxAB+60) % 64)

Where maxAB can also be expressed as (leftintraDir<aboveIntraDir)? aboveIntraDir: leftIntraDir. That is, intra prediction mode candidate 0 of the intra prediction mode candidate list may be derived as the planar intra prediction mode, intra prediction mode candidate 1 may be derived as maxAB, that is, intra prediction mode candidate 1 may be derived as the intra prediction mode of the top neighboring block when the mode number of the intra prediction mode of the left neighboring block is smaller than the mode number of the intra prediction mode of the top neighboring block, as the intra prediction mode of the left neighboring block when the mode number of the intra prediction mode of the left neighboring block is greater than or equal to the mode number of the intra prediction mode of the top neighboring block. Intra prediction mode candidate 2 of the intra prediction mode candidate list may be derived as the DC intra prediction mode, and the intra prediction mode candidate 3 of the intra prediction mode candidate list may be derived an intra prediction mode with a mode number of 2+((maxAB+61) % 64), that is, the intra prediction mode with the mode number of a value obtained by adding 61 to the maxAB, calculating modular arithmetic by 64 and adding 2 and the intra prediction mode candidate 4 of the intra prediction mode candidate list may be derived an intra prediction mode with a mode number 2+((maxAB−1) % 64), that is, the intra prediction mode with the mode number of a value obtained by subtracting 1 from the maxAB, calculating modular arithmetic by 64 and adding 2. The intra prediction mode candidate 5 of the intra prediction mode candidate list may be derived an intra prediction mode with a mode number of 2+((maxAB+60) % 64), that is, the intra prediction mode with the mode number of a value obtained by adding 60 to the maxAB, calculating modular arithmetic by 64 and adding 2.

Or, for example, if the above conditions are not met, the decoding apparatus may derive the intra prediction mode candidate list of the current block including intra prediction mode candidates as described below.

mpm[0]=PLANAR_IDX
mpm[1]=DC_IDX
mpm[2]=VER_IDX
mpm[3]=HOR_IDX
mpm[4]=VER_IDX−4
mpm[5]=VER_IDX+4

Here, VER_IDX may indicate an intra prediction mode having a mode number of 50 (INTRA_ANGULAR50), HOR_IDX may indicate an intra prediction mode having a mode number of 18 (INTRA_ANGULAR18), VER_IDX−4 may indicate an intra prediction mode (INTRA_ANGULAR46) having a mode number of 46, and VER_IDX+4 may indicate an intra prediction mode (INTRA_ANGULAR54) having a mode number of 54.

That is, intra prediction mode candidate 0 of the intra prediction mode candidate list may be derived as the planar intra prediction mode, intra prediction mode candidate 1 of the intra prediction mode candidate list may be derived as the DC intra prediction mode, intra prediction mode candidate 2 of the intra prediction mode candidate list may be derived as the vertical intra prediction mode (ie, intra prediction mode No. 50), intra prediction mode candidate 3 of the intra prediction mode candidate list may be derived in the horizontal intra prediction mode (ie, intra prediction mode No. 18), intra prediction mode candidate 4 of the intra prediction mode candidate list may be derived as an intra prediction mode of a mode number obtained by subtracting 4 from the mode number of the vertical intra prediction mode, that is, intra prediction mode No. 46, and intra prediction mode candidate 5 of the intra prediction mode candidate list may be derived as the intra prediction mode of the mode number obtained by adding 4 to the mode number of the vertical intra prediction mode, that is, the intra prediction mode No. 54. That is, for example, when the above conditions are not met, the intra prediction mode candidate list may include the DC intra prediction mode, an intra prediction mode No. 50, an intra prediction mode No. 18, an intra prediction mode No. 46, and an intra prediction No. 54 mode as intra prediction mode candidates.

Meanwhile, the intra prediction mode candidate list generated when the intra prediction type is the first intra prediction type, the intra prediction mode candidate list generated when the intra prediction type is the second intra prediction type, and the intra prediction mode candidate list generated when the prediction type is the third intra prediction type may be the same. That is, the same intra prediction mode candidate list may be configured regardless of the intra prediction type for the current block. The intra prediction mode candidate list may be configured through the same intra prediction mode configuration process regardless of the intra prediction type for the current block. The intra prediction mode configuration process may be the same as one of the above-described embodiments.

The decoding apparatus derives the intra prediction mode of the current block based on the intra prediction mode candidate list (S1740). For example, the decoding apparatus may derive the MPM flag for the current block. The information on the intra prediction mode may include the MPM flag. For example, the decoding apparatus may receive the information on the intra prediction mode for the current block, and the information on the intra prediction mode may include the MPM flag for the current block. Alternatively, the information on the intra prediction mode may not include the MPM flag. In this case, the decoding apparatus may derive the value of the MPM flag as 1. The MPM flag may indicate whether the intra prediction mode of the current block is one of intra prediction mode candidates of the intra prediction mode candidate list. The MPM flag may be referred to an intra prediction mode candidate flag.

When the value of the MPM flag is 1, the decoding apparatus may derive the intra prediction mode candidate indicated by the MPM index among the intra prediction mode candidates of the intra prediction mode candidate list as the intra prediction mode for the current block. The prediction-related information may include the MPM index. The MPM index may be signaled in the form of an mpm_idx or intra_luma_mpm_idx syntax element. The MPM index may be referred to as an intra prediction mode candidate index.

When the value of the MPM flag is 0, the decoding apparatus may derive the intra prediction mode indicated by the remaining intra prediction mode information among the remaining intra prediction modes as the intra prediction mode for the current block. The remaining intra prediction modes may indicate remaining intra prediction modes not included in the intra prediction mode candidates of the intra prediction mode candidate list. The prediction-related information may include the remaining intra prediction mode information. The remaining intra prediction mode information may be signaled in the form of a rem_intra_luma_pred_mode or intra_luma_mpm_remainder syntax element.

The decoding apparatus may generate prediction samples of the current block based on the intra prediction type and the intra prediction mode (S1750). For example, when the intra prediction type is derived as the first intra prediction type, the decoding apparatus may derive at least one reference sample from among reference samples in an intra prediction reference line adjacent to the current block based on the intra prediction mode and may generate a prediction sample of the current block based on the reference sample. The reference samples may include top left corner reference sample, top reference samples, and left reference samples of the current block. For example, when the size of the current block is W×H and the x component of the top-left sample position of the current block is xN and the y component is yN, the left reference samples arep[xN−1][yN] top[xN−1][2H+yN−1], the top left corner reference sample isp[xN−1][yN−1], and the top reference samples arep[xN][yN−1] top[2W+xN−1][yN−1].

Or, for example, when the intra prediction type is derived as the second intra prediction type, the decoding apparatus may derive at least one reference sample from among reference samples in an intra prediction reference line that is not adjacent to the current block based on the intra prediction mode and may generates prediction samples of the current block based on the reference sample. Here, the intra prediction reference line may be a reference line separated by a distance of 1, 2, or 3 samples from the top boundary and/or a left boundary of the current block.

Or, for example, when the intra prediction type is derived as the third intra prediction type, the decoding apparatus may derive the ISP partition type of the current block based on the ISP partition flag indicating the ISP partition type and can derive sub blocks by dividing the current block according to the ISP partition type. The partition type may be a horizontal split type or a vertical split type. For example, when the size of the current block is 4×4, the current block may not be divided. Also, for example, when the size of the current block is a 4×8 size and the partition type is the horizontal split type, the current block may be divided into two 4×4 sub-blocks. Also, for example, when the size of the current block is a 4×8 size and the partition type is the vertical split type, the current block may be divided into two 2×8 sub-blocks. Also, for example, when the size of the current block is an 8×4 size and the partition type is the horizontal split type, the current block may be divided into two 8×2 sub-blocks. Also, for example, when the size of the current block is an 8×4 size and the partition type is the vertical split type, the current block may be divided into two 4×4 sub-blocks. Also, for example, if the size of the current block is W×H size (here, the size of the current block is a size other than 4×8 size, 8×4 size, or 4×4 size) and the partition type is the horizontal split type, the current block may be divided into four W×H/4 sub-blocks. Also, for example, when the size of the current block is a W×H size and the partition type is the vertical split type, the current block may be divided into four W/4xH sub-blocks. Thereafter, the decoding apparatus may generate a prediction sample by performing intra prediction on each of the sub-blocks. That is, the decoding apparatus may derive at least one reference sample among reference samples in an intra prediction reference line of each subblock of the current block based on the intra prediction mode, and generate the prediction samples based on the reference sample. The intra prediction reference line of each subblock may be a reference line adjacent to each subblock.

Alternatively, for example, based on the intra prediction mode of the current block being the DC intra prediction mode, the prediction samples may be derived based on a DC value. For example, when the current block is a square block and the x and y components of the top-left position of the current block are 0, the DC value may be derived based on reference samples from (0, −refIdx−1) to (W−1, −refIdx−1) within an intra prediction reference line indicated by the reference line index of the current block and reference samples from (−refIdx−1, 0) to (−refIdx−1, H−1) within the intra prediction reference line. Or, the DC value may be derived based on reference samples from (−refIdx, −refIdx−1) to (W−1−refIdx, −refIdx−1) within an intra prediction reference line indicated by the reference line index of the current block and f reference samples from (−refIdx−1, −refIdx) to (−refIdx−1, H−1−refIdx) within the intra prediction reference line. Here, W and H may represent the width and height of the current block, and the refIdx may represent the value of the reference line index.

Alternatively, for example, based on the intra prediction mode of the current block being the DC intra prediction mode, the prediction samples may be derived based on a DC value. For example, when the current block is a non-square block having a width greater than a height, an x component and a y component of the top-left position of the current block are 0, the DC value may be derived based on reference samples from (0, −refIdx−1) to (W−1, −refIdx−1) within the prediction reference line indicated by the reference line index of the current block. Or, the DC value may be derived based on reference samples from (−refIdx, −refIdx−1) to (W−1−refIdx, −refIdx−1) within the prediction reference line indicated by the reference line index of the current block. For example, when the current block is the non-square block having a height greater than a width, an x component and a y component of the top-left position of the current block are 0, the DC value may be derived based on reference samples from (−refIdx−1, 0) to (−refIdx−1, H−1) within the prediction reference line indicated by the reference line index of the current block. Or, the DC value may be derived based on reference samples from (−refIdx−1, −refIdx) to (−refIdx−1, H−1−refIdx) within the prediction reference line indicated by the reference line index of the current block. Here, the W and the H may represent the width and height of the current block, and the refIdx may represent the value of the reference line index.

Or, for example, based on the intra prediction mode of the current block being the planar intra prediction mode, the prediction samples may be derived based on reference samples. For example, when the current block is the square block and an x component and a y component of the top-left position of the current block are 0, the reference samples are a reference sample of (−refIdx−1, H) in the intra prediction reference line indicated by the reference line index of the current block and a reference sample of (W, −refIdx−1) in the intra prediction reference line. Or, the reference samples are a reference sample of (−refIdx−1, H−refIdx) in the intra prediction reference line indicated by the reference line index of the current block and a reference sample of (W−refIdx, −refIdx−1) in the intra prediction reference line. Here, the W and the H may represent the width and height of the current block, and the refIdx may represent the value of the reference line index.

Meanwhile, although not shown in the drawing, the decoding apparatus may directly use the prediction samples as reconstructed samples according to a prediction mode, or may generate reconstructed samples by adding residual samples to the prediction samples. When there are residual samples for the current block, the decoding apparatus may receive residual information on the current block, and the residual information may include transform coefficients on the residual sample. The decoding apparatus may derive the residual samples (or residual sample array) for the current block based on the residual information. The decoding apparatus may generate reconstructed samples based on the prediction samples and the residual samples, and may derive a reconstructed block or a reconstructed picture based on the reconstructed samples. Thereafter, as described above, the decoding apparatus may apply an in-loop filtering process such as deblocking filtering and/or SAO process to the reconstructed picture in order to improve subjective/objective picture quality, if necessary.

For example, the decoding apparatus may obtain image information including all or a part of the above-described information (or syntax elements) by decoding the bitstream or encoded information. In addition, the bitstream or the encoded information may be stored in a computer-readable storage medium, and may cause the above-described decoding method to be performed.

According to this document described above, hardware and software implementation complexity can be reduced by using a unified intra prediction mode list configuration process for intra prediction types.

In addition, according to this document, it is possible to improve the coding efficiency of intra prediction by reducing the dependency according to the intra prediction type by using a unified intra prediction mode list configuration process for the intra prediction types.

In addition, according to this document, it is possible to improve the coding efficiency of intra prediction by deriving reference samples, which are used when the MRL is applied and the intra prediction mode is derived as the DC intra prediction mode, based on the reference picture index.

In the above embodiment, the methods are described on the basis of a flowchart as a series of steps or blocks, but this document is not limited to the order of the steps, and some steps may occur in a different order or concurrently with other steps as described above. In addition, those skilled in the art will understand that the steps shown in the flowchart are not exhaustive and that other steps may be included or that one or more steps of the flowchart may be deleted without affecting the scope of this document.

Embodiments described in this document may be implemented and performed on a processor, microprocessor, controller, or chip. For example, the functional units shown in each figure may be implemented and performed in a computer, a processor, a microprocessor, a controller, or a chip. In this case, information for implementation (information on instructions) or an algorithm for implementation may be stored in a digital storage medium.

In addition, the decoding device and the encoding device to which the embodiments of this document are applied may be included a multimedia broadcasting transceiver, a mobile communication terminal, a home cinema video device, a digital cinema video device, a surveillance camera, a video conversation device, and a real-time communication device such as a video communication device., mobile streaming device, storage medium, camcorder, video on demand (VOD) service providing device, OTT video (Over the top video) device, internet streaming service providing device, three-dimensional (3D) video device, video telephony video device, means of transport Terminals (ex. vehicle terminals, airplane terminals, ship terminals, etc.) and medical video devices, etc., and can be used to process a video signal or a data signal. For example, the OTT video (Over the top video) device may include a game console, a Blu-ray player, an Internet-connected TV, a home theater system, a smart phone, a tablet PC, a digital video recorder (DVR), and the like.

Further, the processing method to which the embodiments of the present document is applied may be produced in the form of a program executed by a computer, and stored in a computer-readable recording medium. The multimedia data having the data structure according to the present document may also be stored in the computer-readable recording medium. The computer-readable recording medium includes all kinds of storage devices and distribution storage devices in which the computer-readable data are stored. The computer-readable recording medium may include, for example, a Blue-ray disc (BD), a universal serial bus (USB), a ROM, a PROM, an EPROM, an EEPROM, a RAM, a CD-ROM, a magnetic tape, a floppy disc, and an optical data storage device. Further, the computer-readable recording medium includes a media implemented in the form of a carrier (e.g., transmission through the Internet). Further, the bitstream generated by the encoding method may be stored in the computer-readable recording medium or transmitted through a wired/wireless communication network.

Further, the exemplary embodiment of the present document may be implemented by a computer program product by program codes, and the program codes may be performed by the computer according to the exemplary embodiment of the present document. The program codes may be stored on the computer-readable carrier.

Figure 19:
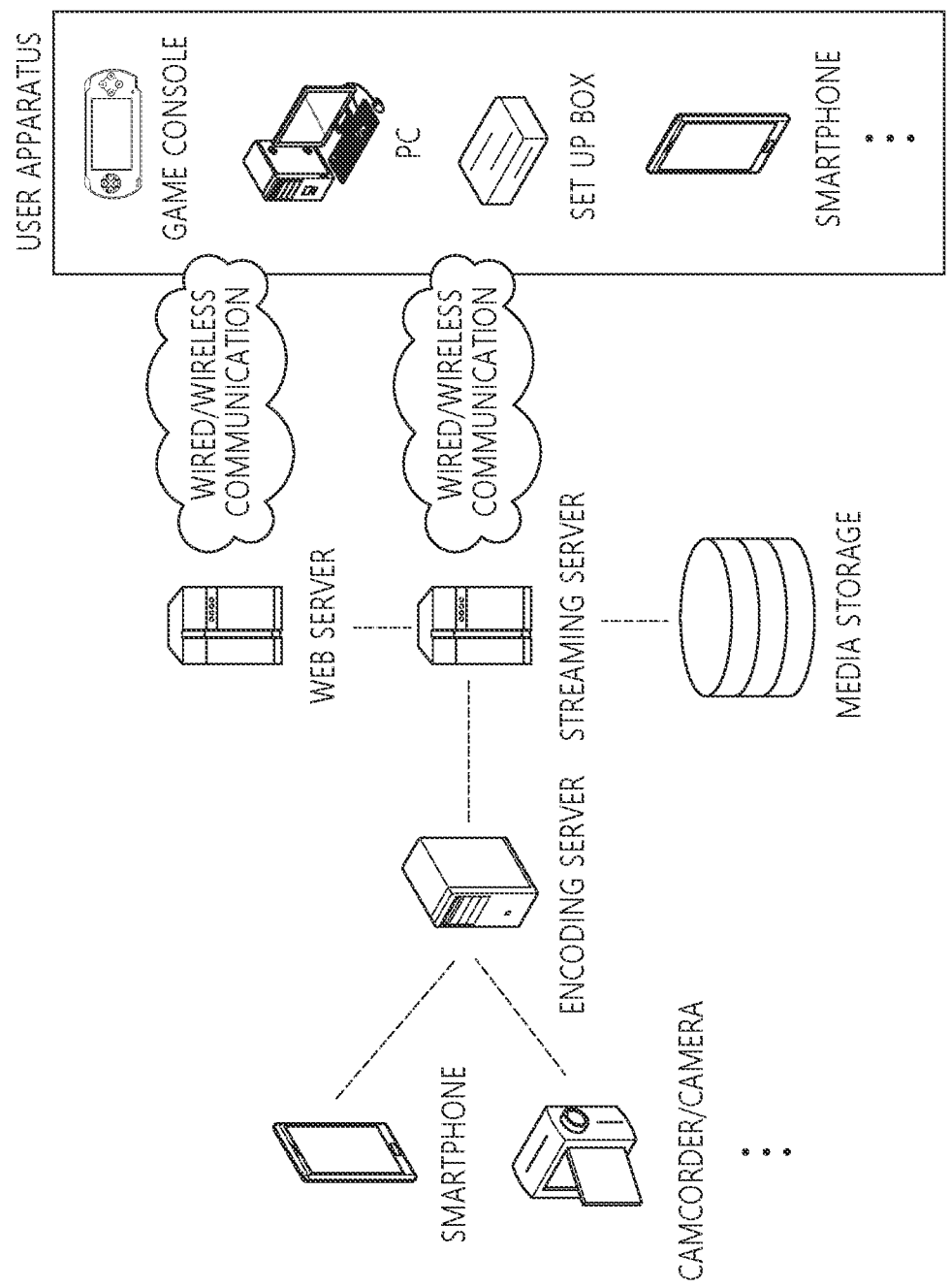
FIG. 19 illustratively represents a content streaming system structure diagram to which the present disclosure is applied.

FIG. 19 exemplarily shows a structural diagram of a content streaming system to which embodiments of this document are applied.

the content streaming system to which the embodiments of the present document is applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the embodiments of the present document is applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smartwatch, a smart glass, a head mounted display (HMD)), a digital TV, a desktop computer, a digital signage, or the like. The respective servers within the content streaming system may be operated by a distribution server, and in this case, the data received by each server may be distributed and processed.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. An image decoding method performed by a decoding apparatus, the method comprising:
   deriving an intra prediction type for a current block among intra prediction types;
   deriving a first intra prediction mode for a left neighboring block of the current block;
   deriving a second intra prediction mode for a top neighboring block of the current block;
   configuring an intra prediction mode candidate list of the current block based on the first intra prediction mode and the second intra prediction mode;
   deriving an intra prediction mode of the current block based on the intra prediction mode candidate list; and
   generating prediction samples of the current block based on the intra prediction type and the intra prediction mode,
   wherein the intra prediction types include a first intra prediction type using an intra prediction reference line adjacent to the current block, a second intra prediction type using an intra prediction reference line not adjacent to the current block, and a third intra prediction type to which an Intra Sub-Partitions mode (ISP) is applied,
   wherein the intra prediction mode candidate list configured based on that the intra prediction type is the first intra prediction type, the intra prediction mode candidate list configured based on that the intra prediction type is the second intra prediction type, and the intra prediction mode candidate list configured based on that the intra prediction type is the third intra prediction type are the same,
   wherein, based on a CIIP (Combined Inter and Intra Prediction) mode being applied to the left neighboring block of the current block, the first intra prediction mode is determined as a planar mode, and
   wherein, based on the CIIP mode being applied to the top neighboring block of the current block, the second intra prediction mode is determined as the for a neighboring planar mode.

2. An image encoding method performed by an image encoding apparatus, the method comprising:
   determining an intra prediction type for a current block among intra prediction types;
   deriving a first intra prediction mode for a left neighboring block of the current block;
   deriving a second intra prediction mode for a top neighboring block of the current block;
   configuring an intra prediction mode candidate list of the current block based on the first intra prediction mode and the second intra prediction mode;
   determining an intra prediction mode of the current block based on the intra prediction mode candidate list; and
   encoding image information including information on the determined intra prediction type and information on the determined intra prediction mode,
   wherein the intra prediction types include a first intra prediction type using an intra prediction reference line adjacent to the current block, a second intra prediction type using an intra prediction reference line not adjacent to the current block, and a third intra prediction type to which an Intra Sub-Partitions mode (ISP) is applied,
   wherein the intra prediction mode candidate list configured based on that the intra prediction type is the first intra prediction type, the intra prediction mode candidate list configured based on that the intra prediction type is the second intra prediction type, and the intra prediction mode candidate list configured based on that the intra prediction type is the third intra prediction type are the same,
   wherein, based on a CIIP (Combined Inter and Intra Prediction) mode being applied to the left neighboring block of the current block, the first intra prediction mode is determined as a planar mode, and
   wherein, based on the CIIP mode being applied to the top neighboring block of the current block, the second intra prediction mode is determined as the planar mode.

3. A non-transitory computer-readable storage medium storing a bitstream generated by the method of claim 2.

4. A data transmission method for an image, the method comprising:
- obtaining a bitstream for an image, wherein the bitstream is generated based on determining an intra prediction type for a current block among intra prediction types, deriving a first intra prediction mode for a left neighboring block of the current block, deriving a second intra prediction mode for a top neighboring block of the current block, configuring an intra prediction mode candidate list of the current block based on the first intra prediction mode and the second intra prediction mode, determining an intra prediction mode of the current block based on the intra prediction mode candidate list, and encoding image information to generate the bitstream, wherein the image information includes information on the determined intra prediction type and information on the determined intra prediction mode; and
- transmitting the data comprising the bitstream,
- wherein the intra prediction types include a first intra prediction type using an intra prediction reference line adjacent to the current block, a second intra prediction type using an intra prediction reference line not adjacent to the current block, and a third intra prediction type to which an Intra Sub-Partitions mode (ISP) is applied,
- wherein the intra prediction mode candidate list configured based on that the intra prediction type is the first intra prediction type, the intra prediction mode candidate list configured based on that the intra prediction type is the second intra prediction type, and the intra prediction mode candidate list configured based on that the intra prediction type is the third intra prediction type are the same,
- wherein, based on a CIIP (Combined Inter and Intra Prediction) mode being applied to the left neighboring block of the current block, the first intra prediction mode is determined as a planar mode, and
- wherein, based on the CIIP mode being applied to the top neighboring block of the current block, the second intra prediction mode is determined as the planar mode.

* * * * *

UNITED STATES PATENT AND TRADEMARK OFFICE
CERTIFICATE OF CORRECTION

PATENT NO. : 12,301,788 B2
APPLICATION NO. : 17/442270
DATED : May 13, 2025
INVENTOR(S) : Jangwon Choi et al.

Page 1 of 1

It is certified that error appears in the above-identified patent and that said Letters Patent is hereby corrected as shown below:

In the Claims

Column 86, Line 26; In Claim 1, after "determined as the" delete "for a neighboring".

Signed and Sealed this
Twenty-fourth Day of June, 2025

Coke Morgan Stewart
*Acting Director of the United States Patent and Trademark Office*